(12) United States Patent
Park

(10) Patent No.: US 11,172,135 B2
(45) Date of Patent: Nov. 9, 2021

(54) APPARATUS AND METHOD FOR PROCESSING IMAGE

(71) Applicant: Samsung Electronics Co., Ltd., Gyeonggi-do (KR)

(72) Inventor: Ilkwon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/645,635

(22) PCT Filed: Aug. 27, 2018

(86) PCT No.: PCT/KR2018/009851
§ 371 (c)(1),
(2) Date: Mar. 9, 2020

(87) PCT Pub. No.: WO2019/050200
PCT Pub. Date: Mar. 14, 2019

(65) Prior Publication Data
US 2020/0275031 A1  Aug. 27, 2020

(30) Foreign Application Priority Data

Sep. 11, 2017  (KR) .......................... 10-2017-0116211

(51) Int. Cl.
*H04N 5/232*  (2006.01)
(52) U.S. Cl.
CPC ..... *H04N 5/23299* (2018.08); *H04N 5/23238* (2013.01); *H04N 5/23296* (2013.01)

(58) Field of Classification Search
CPC ........... H04N 5/23299; H04N 5/23238; H04N 5/23296; H04N 13/111; H04N 13/243; H04N 5/232411; H04N 5/23287; H04N 5/23258; H04N 5/2252; H04N 5/23245; H04N 5/2258; H04N 5/225; G06T 7/80
See application file for complete search history.

(56) References Cited

U.S. PATENT DOCUMENTS

2004/0066449 A1  4/2004 Givon
2004/0246333 A1  12/2004 Steuart, III
(Continued)

FOREIGN PATENT DOCUMENTS

EP  3 190 566 A1  7/2017
JP  2005-027154 A  1/2005
(Continued)

*Primary Examiner* — Yogesh K Aggarwal
(74) *Attorney, Agent, or Firm* — Cha & Reiter, LLC

(57) ABSTRACT

An apparatus according to various embodiments can include: a plurality of cameras including at least one camera having a field of view (FOV) different from the designated FOV; a communication interface; and at least one processor, wherein the at least one processor can be configured to acquire a plurality of images, including at least one image including a scene from the FOV different from the designated FOV, through the plurality of cameras, and transmit information about the plurality of images and information for changing the scene from the FOV included in the at least one image to a scene for the designated FOV to another device through the communication interface so that the other device generates another image on the basis of the plurality of images.

15 Claims, 45 Drawing Sheets

(56) References Cited

U.S. PATENT DOCUMENTS

2017/0134620 A1* 5/2017 Stern .................. H04N 5/23212
2017/0289448 A1   10/2017 Song
2018/0300898 A1* 10/2018 Eshima ................... G01C 3/18

FOREIGN PATENT DOCUMENTS

| JP | 2014-089168 A | 5/2014 | | |
|---|---|---|---|---|
| KR | 10-1675567 B1 | 11/2016 | | |
| WO | WO-2017057043 A1 | * | 4/2017 | ............... G06T 7/74 |

* cited by examiner

APPARATUS AND METHOD FOR PROCESSING IMAGE

CLAIM OF PRIORITY

This application is a National Phase Entry of PCT International Application No. PCT/KR2018/009851, which was filed on Aug. 27, 2018 and claims a priority to Korean Patent Application No. 10-2017-0116211, which was filed on Sep. 11, 2017, the contents of which are incorporated herein by reference.

TECHNICAL FIELD

Various embodiments relate to an apparatus and a method for processing an image.

BACKGROUND ART

With the development of technology, the distribution of virtual reality contents is increasing. In order to generate such contents, apparatuses for processing images such as panoramic images and omnidirectional images are being developed. Such apparatuses may acquire a plurality of images for the above-mentioned images or may generate an omnidirectional image based on the plurality of acquired images.

DISCLOSURE OF INVENTION

Technical Problem

The apparatus used for generating the image may include a plurality of cameras. At least one of the plurality of cameras may have a different field of view than the designated field of view (FOV). An image acquired through the at least one camera having a different FOV from the designated FOV may include a scene for the FOV different from the scene for the designated FOV. Therefore, a method for changing the scene for the FOV to the scene for the designated FOV may be required.

Various embodiments may provide an apparatus and a method for changing a scene for an FOV included in an image acquired through the at least one camera having a different FOV from a designated FOV to a scene for a designated FOV.
The technical problem to be achieved in this document is not limited to the technical problem mentioned above, and other technical problems not mentioned above may be clearly understood by those skilled in the art from the following description.

Solution to Problem

An electronic device (e.g., the apparatus 300) according to various embodiments of the present disclosure may include a first camera disposed in a first optical axis direction, a second camera disposed in a second optical axis direction, a third camera disposed in a third optical axis direction that is substantially perpendicular to the first optical axis direction and the second optical axis direction, a communication interface, and a processor. The processor is configured to: acquire a first image of a first object using the first camera, acquire a second image of the first object using the second camera, and acquire a third image of the first object using the third camera; identify, by comparing a position of the first object in the second image with a position of the first object in the first image based on the position of the first object in the third image, at least one of a value for correcting the first optical axis direction or a value for correcting the second optical axis direction; and transmit, to an external electronic device through the communication interface, at least one of a first corrected image and a second corrected image generated based on at least one of the value for correcting the first optical axis direction and the value for correcting the second optical axis direction, or transmit, to the external electronic device through the communication interface, information regarding at least one of the value for correcting the first optical direction and the value for correcting the second optical axis direction with the first image and the second image.

An apparatus according to various embodiments may include a plurality of cameras including at least one camera that has a field of view (FOV) different from a designated FOV, a communication interface, and at least one processor. The at least one processor may be configured to: acquire, through the plurality of cameras, a plurality of images including at least one image that includes a scene based on the FOV different from the designated FOV; and transmit, in order to enable another apparatus to generate an omnidirectional image based on the plurality of images, information on the plurality of images and information for changing the scene, based on the FOV included in the at least one image, to a scene, based on the designated FOV, to the other apparatus through the communication interface.

A method of an apparatus according to various embodiments may include: acquiring, through a plurality of cameras including at least one camera having a field of view (FOV) different from a designated FOV, a plurality of images including at least one image that includes a scene based on an FOV different from the designated FOV; and transmitting, in order to enable another apparatus to generate an omnidirectional image based on the plurality of images, information on the plurality of images and information for changing the scene, based on the FOV included in the at least one image, to a scene, based on the designated FOV, to the other apparatus through the communication interface.

Advantageous Effects of Invention

An apparatus and method according to various embodiments improves the quality of the image by changing the scene for the field of view included in the image acquired through the at least one camera having a field of view different from the field of view to the scene for the designated field of view.

Effects obtained in the present disclosure are not limited to the above-mentioned effects, and other effects not mentioned above may be clearly understood by those skilled in the art from the following description.

BEST MODE FOR CARRYING OUT THE INVENTION

Figure 1:
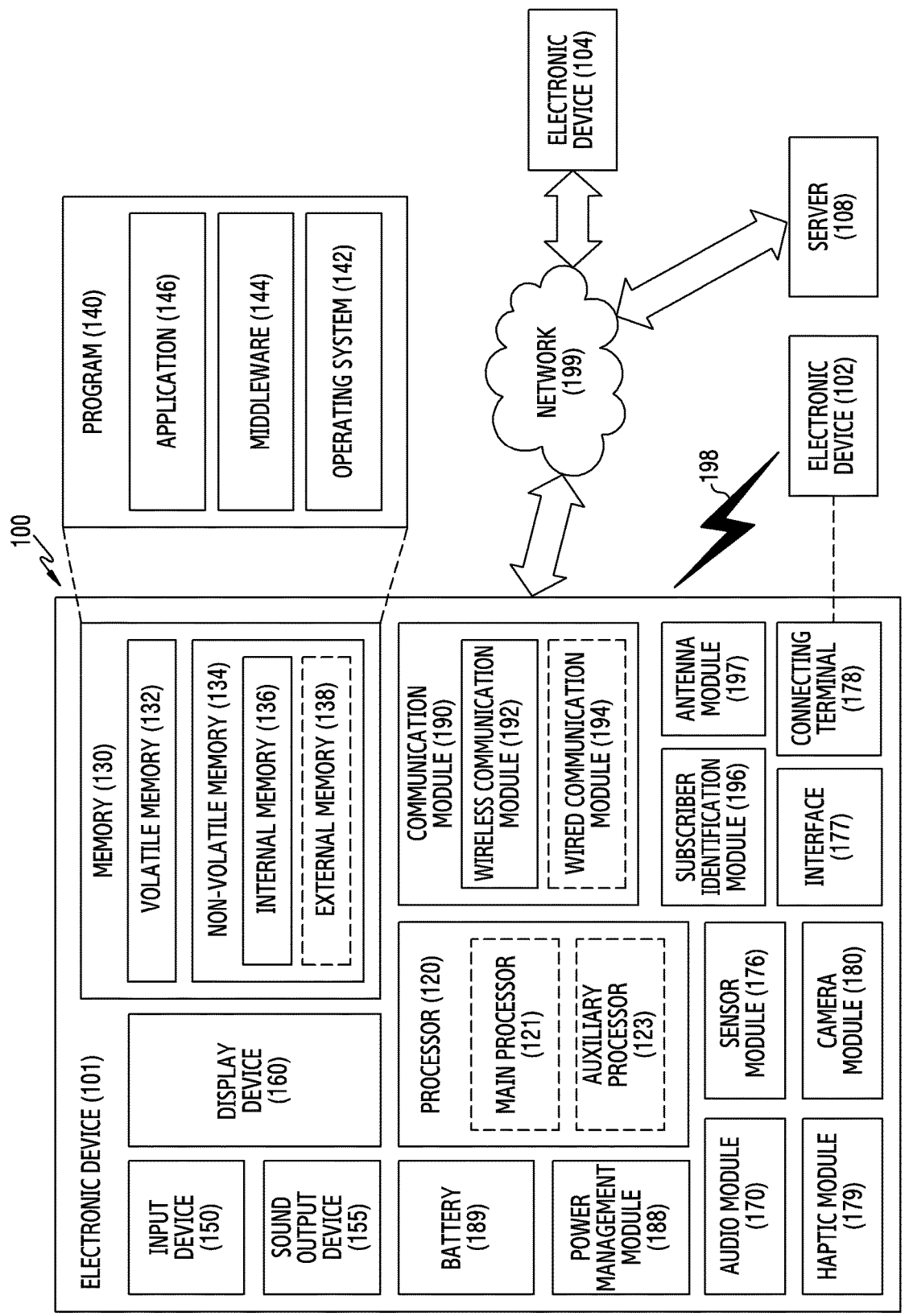
FIG. 1 illustrates a procedure for processing a plurality of images for generating an omnidirectional image according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
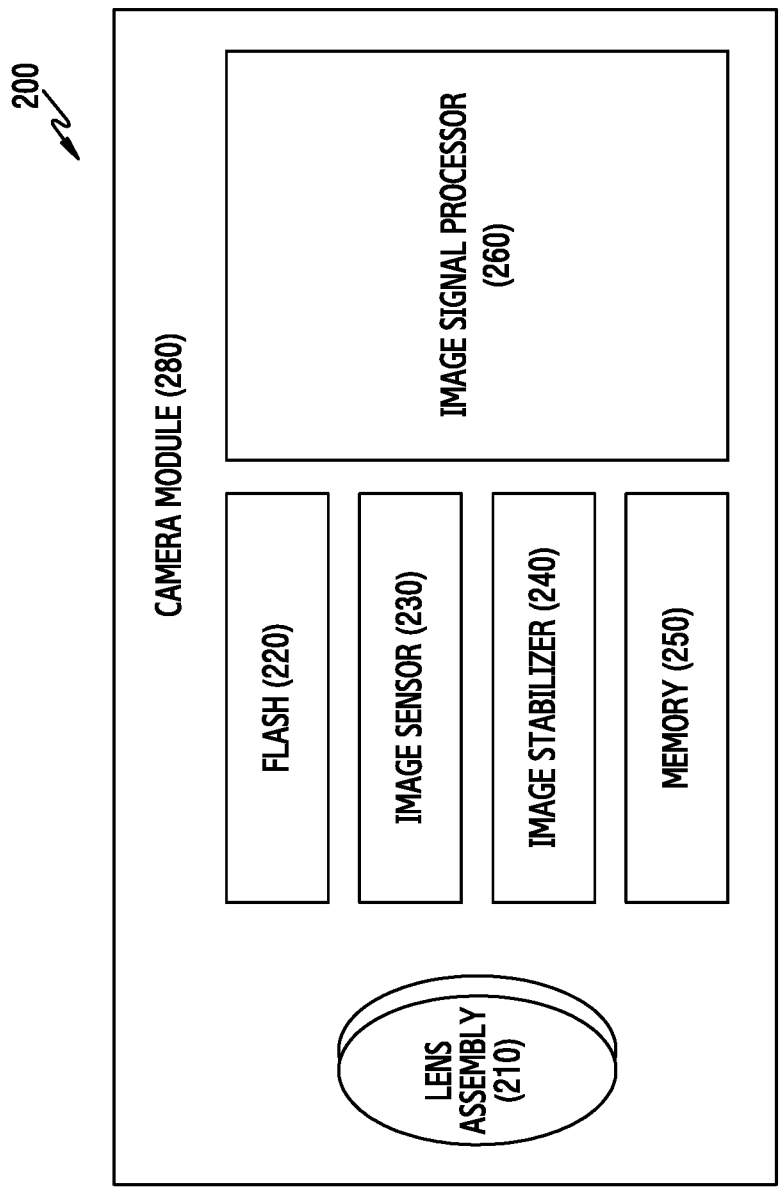
FIG. 2 illustrates an example of a functional configuration of an apparatus that acquires a plurality of images according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
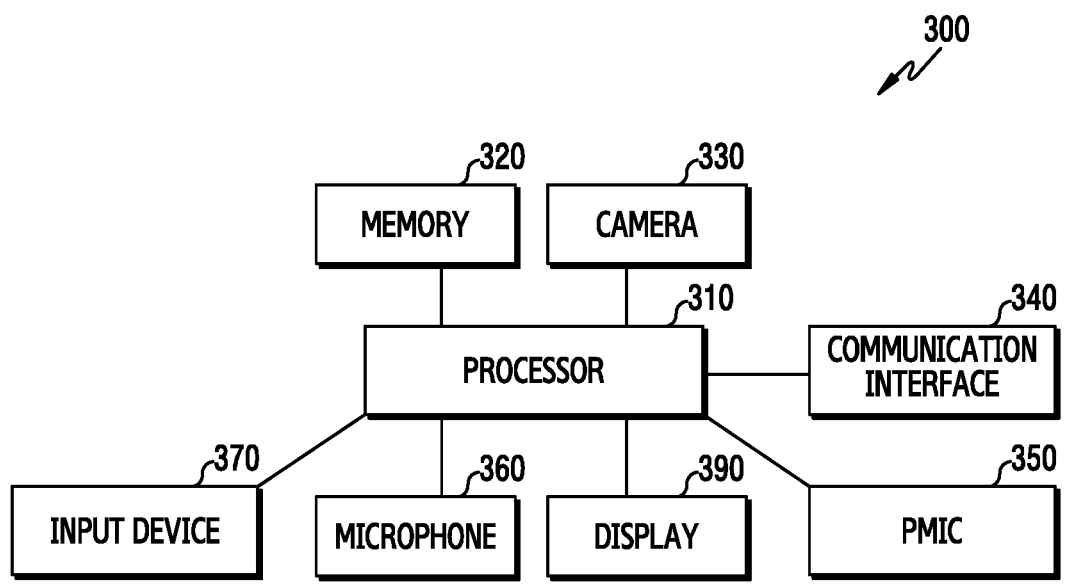
FIG. 3 illustrates an example of a functional configuration of an apparatus connected to an apparatus that acquires an image according to various embodiments.

FIG. 3 illustrates an example of the functional configuration of an apparatus that acquires a plurality of images according to various embodiments.

Referring to FIG. 3, the apparatus 300 may include a processor 310, a memory 320, a camera 330, a communication interface 340, a Power Management Integrated Circuit (PMIC) 350, a microphone 360, an input device 370, and/or a display 390.

The processor 310 may control one or more other components (e.g., a hardware or software component) of the apparatus 300, which are connected to the processor 310, and may perform various data processing and arithmetic operations by driving, for example, software (e.g., a program or an instruction word). The processor 310 may load instructions or data, which are received from the other components (e.g., the camera 330 or the communication interface 340), into a volatile memory 320 so as to process the instructions or data, and may store the resulting data into a non-volatile memory (e.g., the memory 320). In various embodiments, the processor 310 may include a main processor (e.g., a Central Processing Unit (CPU), an Application Processor (AP), an Image Signal Processor (ISP), and a Digital Signal Processor (DSP). Additionally or alternatively, the processor 310 may include an auxiliary processor that is operated independently from the above-mentioned components and that uses lower power than the main processor or is specific to a designated function. The auxiliary may be operated separately from the main processor or in the state of being embedded in the main processor.

In this case, the auxiliary processor may be used, in place of the main processor while the main processor is in an inactive (e.g., sleep) state or together with the main processor while the main processor is in an active (e.g., functioning), so as to control at least some of the functions or states associated with at least one component (e.g., the camera 330 or the communication interface 340) among the components of the apparatus. In various embodiments, the auxiliary processor may be implemented as a component of some other functionally associated components (e.g., the camera 330 or the communication interface 340). In various embodiments, when a plurality of processors 310 are provided, the processors 310 may include a processor configured to control the overall operation of the apparatus 300 and a processor configured to control the operation of the camera 330 or to process an image acquired through the camera 330. The number of processors 310 may vary depending on the number of cameras 330 or the size of the image acquired through the camera. For example, when the number of cameras 330 is 17, the number of processors 310 may be five. For example, the processor 310 may include a first processor connected to one camera and controlling the overall operation of the apparatus 300, and second to fourth processors respectively connected to four cameras. Each of the first to fifth processors may control at least one camera connected to each of the first to fifth processors. Each of the first to fifth processors may encode an image acquired through at least one camera connected to each of the first to fifth processors.

The memory 320 may include a plurality of programs (or instruction words). The plurality of programs may be executed by the processor 310. The plurality of programs may include an operating system, middleware, a device driver, or an application. The memory 320 may include a volatile memory, a non-volatile memory, and/or a non-volatile medium. In various embodiments, the volatile memory may include a Dynamic RAM (DRAM), a Static RAM (SRAM, a Synchronous DRAM (SDRAM), a Phase-change RAM (PRAM), a Magnetic RAM (MRAM), a Resistive RAM (RAM), a Ferroelectric RANI (FeRAM), or the like. In various embodiments, the non-volatile memory may include a Read Only Memory (ROM), a Programmable ROM (PROM), an Electrically Programmable ROM (EPROM), an Electrically Erasable ROM (EEPROM), a flash memory, or the like. In various embodiments, the non-volatile medium may include a Hard Disk Drive (HDD), a Solid-State Disk (SSD), an embedded Multi-Media card (eMMC), a Universal Flash Storage (UFS), a Secure Digital (SD) card, or the like.

The camera 330 may capture a still image and a moving image. In various embodiments, the camera 330 may include one or more lenses, one or more image sensors, or one or more flashes. In various embodiments, the camera 330 may include a camera for acquiring an image of a scene of an upper portion of the apparatus 300 and a camera for acquiring an image of a scene of a side portion of the apparatus 300. In various embodiments, when the camera 330 includes a plurality of cameras, at least some of the plurality of cameras may be configured as pairs of cameras. In various embodiments, the FOV of each of the plurality of cameras may partially overlap of the FOVs of the other cameras. With such an overlap, the camera 330 is capable of acquiring a plurality of images for generating an omnidirectional image. The camera 330 may provide information on the acquired plurality of images to the processor 310.

The communication interface 340 may support establishing a wired or wireless communication channel between the apparatus 300 and another apparatus (e.g., the apparatus 300 illustrated in FIG. 3), and performing a communication over the established communication channel. In various embodiments, the communication interface 340 may be a wireless communication module (e.g., a cellular communication module, a short range wireless communication module, or a Global Navigation Satellite System (GNSS) communication module) or a wired communication module (e.g., a Universal Serial Bus (USB) communication module, a Universal Asynchronous Receiver/transmitter (UART) communication module, a Local Area Network (LAN) communication module, or a power line communication module), and the apparatus may communicate with other apparatuses using a corresponding communication module among the above-mentioned communication modules through a short range communication network, a long range communication network, or a computer network. The communication modules may be implemented as a single chip or may be implemented as separate chips, respectively.

The communication interface 340 may include an I/O interface provided for communication between one or more I/O devices and the apparatus 300. The one or more I/O devices may be a keyboard, a keypad, an external microphone, an external monitor, a mouse, a printer, a scanner, a speaker, a still camera, a stylus, a tablet, a touch screen, a track ball, a video camera, etc. The I/O interface may support a designated protocol that may be connected to the one or more I/O devices in a wired or wireless manner. In various embodiments, the I/O interface 380 may include a High Definition Multimedia Interface (HDMI), a USB interface, an SD card interface, or an audio interface.

The PMIC 350 may be used to supply power to at least one component of the apparatus 300 (e.g., the processor 310 or the communication interface 340). The PMIC 350 may be configured with a switching regulator or a linear regulator. There may be provided a plurality of PMICs 350 in order to supply power to each of the plurality of cameras or to supply power to each of the plurality of processors. For example, the plurality of PMICs 350 may include a first PMIC connected to the first processor, a second PMIC connected to the second processor, a third PMIC connected to the third processor, a fourth PMIC connected to the fourth processor, and a fifth PMIC connected to the fifth processor. Each of the first to fifth processors may independently operates by being individually connected to the PMICs. For example, while the first processor is supplied with power through the first PMIC, the supply of power to the second processor may be interrupted.

In various embodiments, the apparatus 300 may include a first PMIC for supplying power to a camera associated with a first FOV and a processor associated with (connected to) the camera associated with the first FOV and a second PMIC for supplying power to a camera associated with a second FOV and a processor associated with (or connected to) the camera associated with the second FOV.

The microphone 360 may be used for acquiring audio. The microphone 360 may acquire audio while acquiring a plurality of images through the camera 330. There may be provide a plurality of microphones 360 in order to provide sound (e.g., stereo sound or 5.1-channel sound) in reproducing the omnidirectional image. According to various embodiments, when the plurality of microphones 360 are provided, the plurality of microphones may be configured to have directivity. For example, each of the plurality of microphones may be directionally distributed in the apparatus 300 in order to distinguish the directions of received audio. As another example, each of the plurality of microphones may provide a higher gain to a predetermined component of the received audio based on the direction of the received audio. According to various embodiments, a plurality of microphones 360 may be provided and the input direction of the audio signals may be identified by processing the signals received from the plurality of microphones. In various embodiments, the electronic device 101 or the processor 310 may distinguish the input directions of the audio signals based at least on the input time difference of the received signals.

The input device 370 may be a device for receiving instructions or data from the outside (e.g., the user) of the apparatus 300 for use in a component (e.g., the processor 310) of the apparatus 300. For example, the input device 370 may be configured with a touch screen capable of receiving a user's touch input. As another example, the input device 370 may be configured with at least one physical key capable of receiving a user input.

The display 390 may be a device for visually presenting information to the user of the apparatus 300. When the input device 370 is implemented with a touch screen, the display 390 and the input device 370 may be implemented as a single device.

The electronic device 101 or the apparatus 300 according to various embodiments may perform the following procedures.

The apparatus (e.g., the apparatus 300 shown in FIG. 3) may acquire a plurality of images using a plurality of cameras. In various embodiments, the apparatus may use a plurality of cameras so as to obtain a plurality of images for generating a composite image, such as a panoramic image or an omnidirectional image.

In various embodiments, at least some of the plurality of cameras may be configured as pairs of cameras. For example, a first one of the plurality of cameras and a second one of the plurality of cameras may be included in a first pair among the pairs of cameras. The first camera is configured to be oriented in a first direction and may have a first field of view (FOV) or a first angle of view (AOV). The second camera may be configured to be oriented in a second direction corresponding to the first direction, and may have a second FOV (or AOV) partially overlapping the first FOV. The FOV may indicate a range of a view in which a camera is capable of capturing an image. The FOV may be changed in accordance with the change of the focus of a lens or the like. The FOV may be associated with an optical axis.

In various embodiments, at least one of the plurality of images may partially overlap at least one of the other images among the plurality of images. The apparatus may acquire an image having a portion overlapping another image in order to generate the omnidirectional image. In order to acquire some overlapped images, the FOV of at least one of the plurality of cameras may partially overlap the FOV of at least one of the other cameras among the plurality of cameras.

In various embodiments, the apparatus may control the plurality of cameras such that the plurality of images are synchronized in starting or ending. The apparatus may acquire the plurality of images, which are synchronized, by controlling the plurality of cameras.

In various embodiments, the apparatus may encode the plurality of images. The apparatus may include one or more processors for encoding the plurality of images. The number of the one or more processors may be identified based on the number of the plurality of images or the size of each of the plurality of images. For example, when the number of the plurality of images is 17, the number of the one or more processors may be 5.

In various embodiments, each of the one or more processors may generate encoded data by encoding at least a part of the plurality of images. The encoded data may be independently decodable.

A device that encodes the plurality of images may be a device, which is the same as a device that acquires the plurality of images, or may be a device distinct from the device that acquires the plurality of images.

The apparatus may generate an omnidirectional image by stitching the plurality of images based on the encoded data. In various embodiments, the apparatus may generate a plurality of decoded images by decoding the encoded data. The apparatus may generate the omnidirectional image by stitching (or compositing) the plurality of decoded images. The apparatus may generate the omnidirectional image by stitching the plurality of decoded images based on an alignment of the plurality of decoded images.

The device that generates the omnidirectional image may be a device, which is the same as the device that acquires the plurality of images or the device, which is the device that encodes the plurality of images, or may be a device, which is distinct from the device that acquires the plurality of images or the device that encodes the plurality of images.

As described above, an omnidirectional image may be generated through a procedure of acquiring the plurality of images, a procedure of encoding the acquired plurality of images, and a procedure of performing image stitching based on the encoded data. Various embodiments described below may be associated with such procedures.

Figure 4:
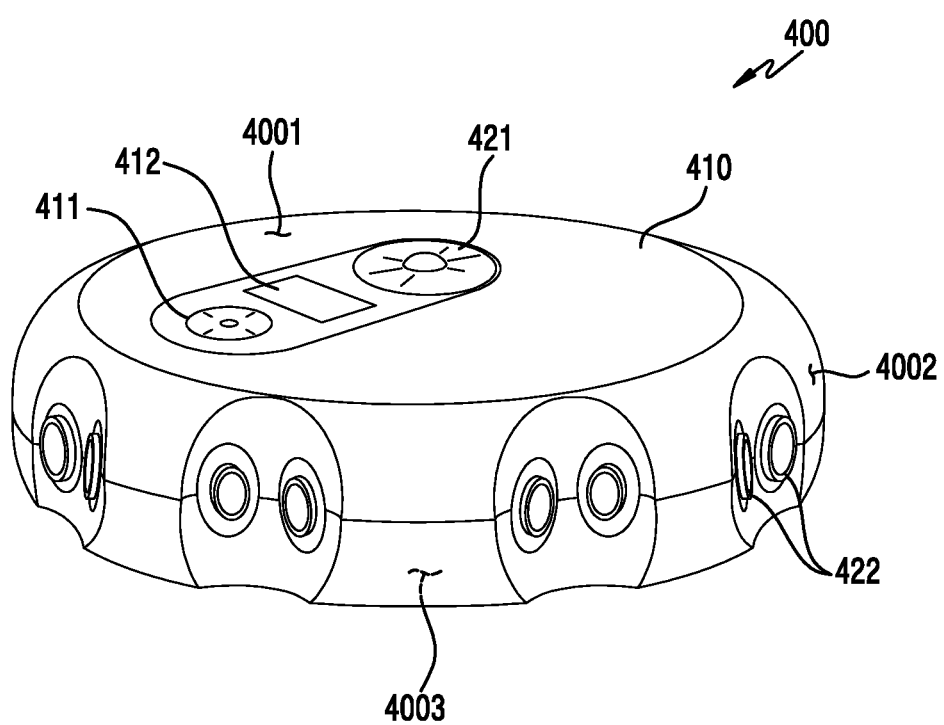
FIG. 4 is a perspective view of an electronic device according to various embodiments.

FIG. 4 is a perspective view of an electronic device according to various embodiments. Referring to FIG. 4, an electronic device 400 may include a housing 410 that defines an external appearance and an inner space for mounting internal components. The electronic device 400 may include a first face (or a top face) 4001 oriented in a first direction (e.g., the z-axis direction), a second face (or a bottom face) 4003 disposed to be opposite the first surface 4001, and a third face (or a side face) 4002 that surrounds the space defined by the first face 4001 and the second surface 4003.

According to various embodiments, the electronic device 400 may include a display 412 (e.g., display 390 of FIG. 3) and a navigation 411 (e.g., the input device 370 of FIG. 3) disposed on the first face 4001 of the housing 410. The display 412 may include a Graphic User Interface (GUI) of the electronic device 500. The user interface may display a menu for determining the mode of the electronic device 400 or the state of the electronic device 400 (e.g., battery residual quantity information). The navigation 411 may be provided to the user as an input means for navigating the GUI displayed on the display 412. Alternatively, the navigation 411 may function as a button for turning on/off the power of the electronic device 400. According to one embodiment, the electronic device 400 may further include an indicator, a speaker, or the like disposed on the first face 4001 of the housing 410. The indicator may include, for example, an LED device and may visually provide the state information of the electronic device 500 to the user, and the speaker may audibly provide the state information of the electronic device 500 to the user.

According to various embodiments, the electronic device 400 may include a plurality of cameras. For example, the electronic device 400 may include a first camera 421 disposed on the top face 4001 of the housing 410 and a plurality of second cameras 422 disposed on the side face 4002. The first camera 421 may be disposed substantially at the center of the top face 4001 of the electronic device 400 so as to capture an upward view of the electronic device 400. The side cameras 422 may be mounted along the side face 4002 of the electronic device 400 in any suitable number and configuration (or an arrangement) that is capable of capturing all views along the horizontal face of the electronic device 400. According to one embodiment, the electronic device 400 may provide an omnidirectional image (or a full 360° view) of 2D and/or 3D using the images captured through the first camera 421 and the second cameras 422.

Figure 5:
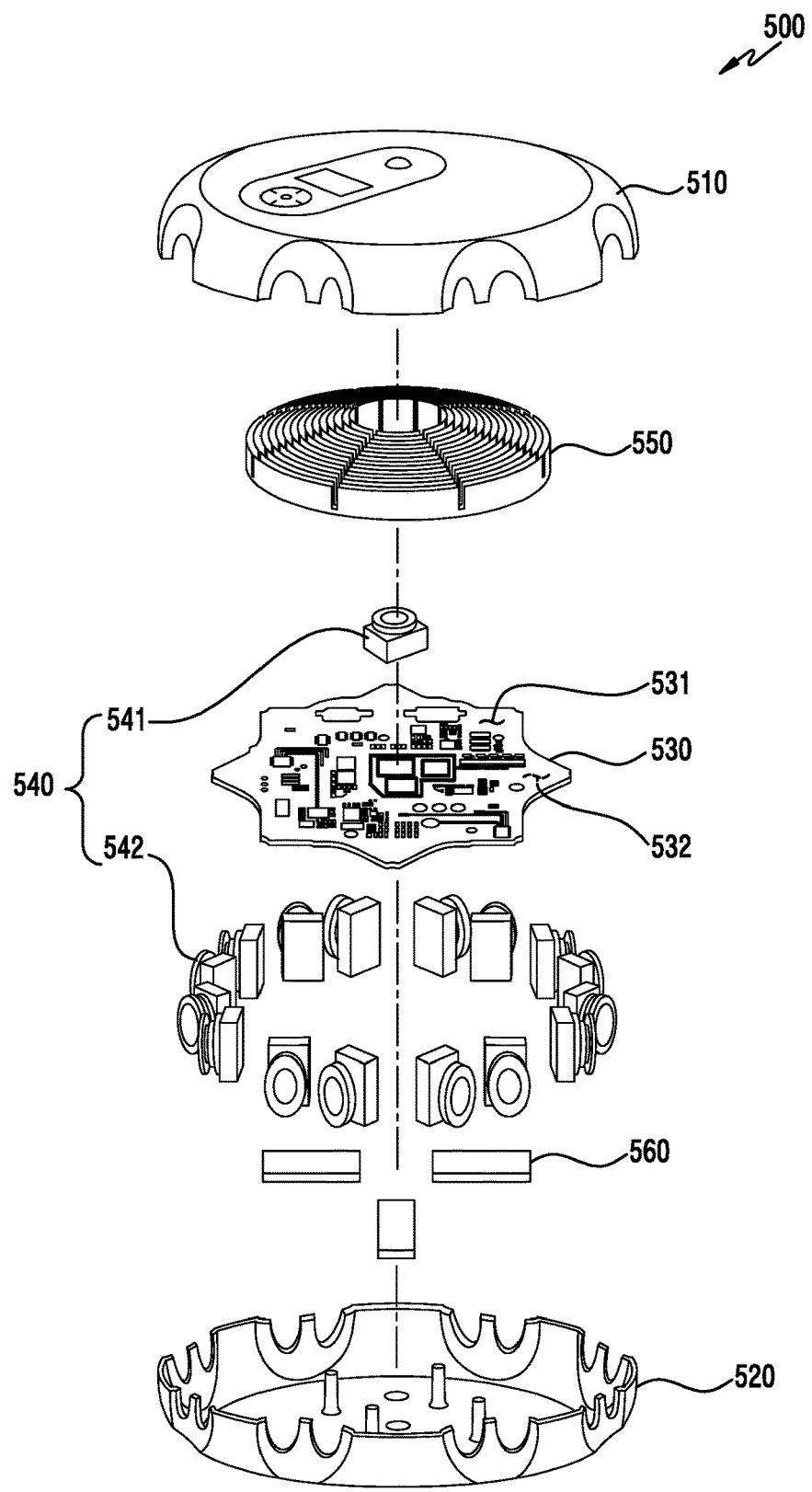
FIG. 5 is an exploded perspective view of an electronic device according to various embodiments.

FIG. 5 is an exploded perspective view of an electronic device according to various embodiments. An electronic device 500 of FIG. 5 may be the same as or similar to the electronic device 200 or 400 of FIGS. 2 and 4 in terms of at least one of the components, and redundant descriptions are omitted below.

Referring to FIG. 5, the electronic device 500 may include an upper housing 510, a lower housing 520, a printed circuit board (PCB) 530, a plurality of cameras 540, a heat sink 550, and a battery 560.

According to various embodiments, the electronic device 400 may include a display 412 (e.g., display 390 of FIG. 3) and a navigation 411 (e.g., the input device 370 of FIG. 3) disposed on the first face 4001 of the housing 410. The display 412 may include a Graphic User Interface (GUI) of the electronic device 400. The user interface may display a menu for determining the mode of the electronic device 400 or the state of the electronic device 400 (e.g., battery residual quantity information). The navigation 411 may be provided to the user as an input means for navigating the GUI displayed on the display 412. Alternatively, the navigation 411 may function as a button for turning on/off the power of the electronic device 400. According to one embodiment, the electronic device 400 may further include an indicator, a speaker, or the like disposed on the first face 4001 of the housing 410. The indicator may include, for example, an LED device and may visually provide the state information of the electronic device 400 to the user, and the speaker may audibly provide the state information of the electronic device 400 to the user.

According to one embodiment, the printed circuit board 530, the plurality of cameras 540, the heat sink 550, and the battery 560 may be disposed in the inner space between the upper housing 510 and the lower housing 520.

On the printed circuit board 530, a processor, a memory, and/or an interface may be mounted (or arranged). A processor may include one or more of, for example, a central processing unit, at least one graphic processor, an image signal processor, a sensor hub processor, or a communication processor. The memory may include, for example, a volatile memory or a non-volatile memory. The interface may include, for example, an HDMI, a USB interface, an SD card interface, and/or an audio interface. The interface may electrically or physically connect, for example, the electronic device 500 to an external electronic device, and may include a USB connector, an SD card/an MMC connector, or an audio connector.

The plurality of cameras 540 may include a top camera 541 and a plurality of side cameras 542. The top camera 541 may be disposed to capture the upward FOV of the electronic device 500 through the top face of the electronic device 500. The plurality of side cameras 542 may be arranged along the edge or periphery of the electronic device 500 according to a predetermined rule. The plurality of side cameras 542 may be disposed such that the optical axis of each side camera is directed to the side face of the electronic device 500. For example, the plurality of side cameras 542 may be arranged on the printed circuit board 430 such that the optical axis of each side camera is parallel to the plane of the printed circuit board. The plurality of side cameras 542 may be arranged such that all of the optical axes thereof are in the same plane. Thus, the plurality of side cameras 542 are capable of capturing images in all directions along the horizontal face of the electronic device 500. The optical axes of the plurality of side cameras 542 and the top camera 541 may be orthogonal to each other. According to one embodiment, the top camera 541 may be fixedly coupled to the upper housing 510 and/or the printed circuit board 530. According to one embodiment, the plurality of cameras 540 may be stably mounted by the structural support of the housings 510 and 520. The plurality of cameras 540 may be electrically connected to at least one processor disposed on the printed circuit board 530. According to one embodiment, the plurality of side cameras 542 may be fixedly coupled or connected to the upper housing 510, the lower housing 520, and/or the printed circuit board 530. According to one embodiment, the top camera 541 may be connected or fixedly coupled to approximately the center of the first face 531 of the printed circuit board 530, and the plurality of side cameras 542 may be fixedly coupled or connected in the state of being arranged along the edge or periphery of the second face 532 of the printed circuit board 530, which is opposite the first face 531. However, embodiments are not limited thereto, and the plurality of cameras 540 may be coupled to the first face 531 and/or the second face 532 of the printed circuit board 530 in any suitable configuration.

The heat sink 550 is capable of cooling the heat of the electronic device 500 by receiving heat from various heat generation components as heat sources included in the electronic device 500 and dissipating the heat to the air. The heat sink 550 may be made of a material having a high thermal conductivity, such as copper or aluminum. According to one embodiment, the heat sink 550 may be configured to receive heat by being in contact with a processor or memory mounted on the printed circuit board 530. According to another embodiment, the electronic device 500 may further include a separate device for heat dissipation, such as a heat pipe or a cooler.

The battery 560 is a device for supplying power to at least one component of the electronic device 500 and may include, for example, a non-rechargeable primary battery, a rechargeable secondary battery, or a fuel cell. The battery 560 may be disposed under the printed circuit board 530, for example. As another example, there may be provided a plurality of batteries 560, which may be disposed on substantially the same plane. The battery 560 may be disposed integrally within the electronic device 500, or may be configured to be detachable from the electronic device 500.

According to some embodiments, the electronic device 500 may further include a plurality of microphones (not illustrated). The plurality of microphones may be configured to receive audio associated with at least one of images acquired through the plurality of cameras 420.

Figure 6:
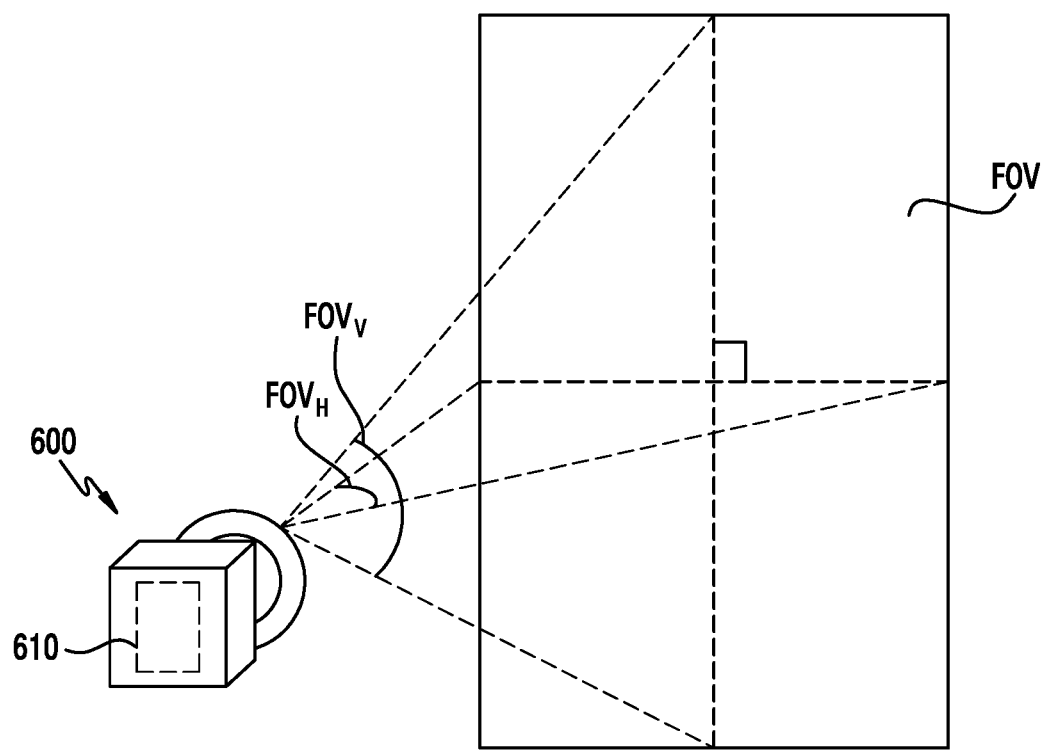
FIG. 6 shows the FOV of a camera according to various embodiments.

FIG. 6 shows the FOV of a camera according to various embodiments. The following description of the camera 600 illustrated in FIG. 6 below may be a description of each of the plurality of cameras 540 described above. Referring to FIG. 6, the camera 600 may include an image sensor 610 configured to capture a series of images as unique photographic images or a video image. For example, the camera 600 may include a Charge-Coupled Device (CCD) image sensor or a Complementary Metal-Oxide-Semiconductor (CMOS) active pixel image sensor.

In various embodiments, the image sensor 610 of the camera 600 may have an aspect ratio of approximately 16:9, 4:3, or 3:2, or any other suitable aspect ratio. The aspect ratio may be a ratio of the width to the height of the sensor. According to various embodiments, the image sensor 610 may have a width longer than the height thereof. In other embodiments, the image sensor 610 may have height longer than the width thereof. According to various embodiments, the width and height of the image sensor 610 may be expressed in the form of the number of pixels on two axes of the image sensor 610. For example, the image sensor 610 may have a width or height of 500 to 8000 pixels. As another example, an image sensor 610 having a width of 1920 pixels and a height of 1080 pixels can be said to have an aspect ratio of 16:9.

According to various embodiments, the camera 600 may include a lens or lens assembly that collects incoming light and focuses the collected light to the focal area of the image sensor 610. The lens or lens assembly of the camera 600 may include a fisheye lens, a wide-angle lens, and a telephoto lens having various FOVs based on various focal lengths.

According to various embodiments, the camera 600 may have an FOV that is at least partially based on the position or focal length of the camera 600, or a magnification of the lens assembly and the position or size of the image sensor 610. In various embodiments, the FOV of the camera 600 may indicate a horizontal, vertical, or diagonal range of a specific scene that is capable of being captured through a camera 600. Objects (or subjects) inside the FOV of the camera 600 may be captured by the image sensor 610 of the camera 600 and objects outside the FOV may not appear on the image sensor 610. In various embodiments, the FOV may be referred to as an angle of view (AOV).

In various embodiments, the FOV or AOV may indicate an angular range of a specific scene that can be captured (or imaged) by the camera 600. For example, the camera 600 may have a horizontal field of view ($FOV_H$) and a vertical field of view ($FOV_V$) that are oriented approximately perpendicular to each other. For example, the camera 600 may have an $FOV_H$ in the range of 30 degrees to 100 degrees and a vertical field of view $FOV_V$ in the range of 90 degrees to 200 degrees. In various embodiments, the $FOV_H$ of the camera 600 may be wider than the $FOV_V$ of the camera 600. For example, the camera 600 may have an $FOV_V$ in the range of 30 degrees to 80 degrees and a $FOV_H$ in the range of 90 degrees to 200 degrees. In various embodiments, the camera 600 having different $FOV_H$ and $FOV_V$ may correspond to the aspect ratio of the image sensor 610. Hereinafter, descriptions will be made assuming specific cameras each having a specific FOV, but an electronic device according to various embodiments (e.g., the electronic device 400 in FIG. 4) may include any suitable image sensors and any suitable lenses.

Figure 7:
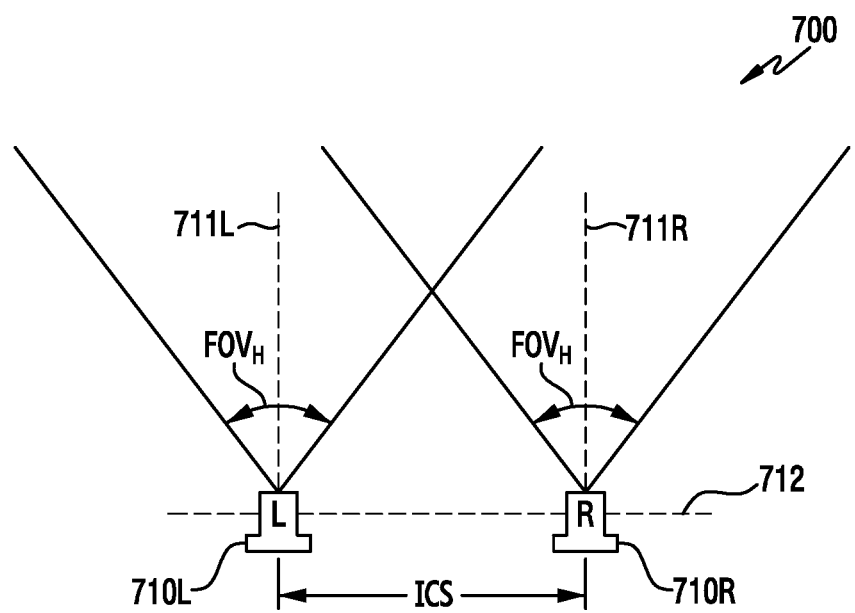
FIG. 7 illustrates an exemplary stereoscopic pair of cameras according to various embodiments.

FIG. 7 illustrates an exemplary stereoscopic pair 700 of cameras according to various embodiments.

The stereoscopic pair 700 according to various embodiments may include two cameras, referred to as a left camera 710L and a right camera 710R, respectively. The left camera 710L and the right camera 710R are capable of acquiring (or capturing) images corresponding to the left and right eyes of a person, respectively.

According to one embodiment, each of the left camera 710L and the right camera 710R of the stereoscopic pair 700 may have an orientation 711 (or optical axis) corresponding to the pointing direction or angle thereof. In one embodiment, the orientation 711 may be represented by a line oriented to the center of the FOV of the camera 710. In one embodiment, the orientation 711 of the camera 710 may be oriented substantially perpendicular to the camera 710 and may be oriented in a direction approximately orthogonal to the surface of the camera lens assembly or image sensor. Alternatively, the orientation 711 may be the same as the optical axis (or the central axis) of the camera lens. For example, the orientation 711 may be oriented in a direction generally orthogonal to an axis 712 corresponding to the line between cameras 710L and 710R of the stereoscopic pair 700. Referring to FIG. 7, each of the orientation 711L of the left camera 710L and the orientation 711R of the right camera 710R is approximately orthogonal to the axis 712, and may mean the optical axis of the $FOV_H$ of each of the cameras 710L and 710R. The orientations 711L and 711R may be horizontal to each other. In other words, the $FOV_H$ of the orientation 711L and the $FOV_H$ of the orientation 711R may be in substantially the same face. The orientations 711L and 711R may be substantially parallel to each other. In other words, the left camera 710L and the right camera 710R may correspond to cameras oriented in the same direction, and these cameras 710L and 710R may be defined as having the same orientation.

According to various embodiments, the left camera 710L and the right camera 710R may have orientations which are not parallel to each other, i.e. have a predetermined included (non-zero) angle therebetween. For example, the left camera 710L and the right camera 710R, which have the same orientation, may have orientations 711L and 711R directed toward or away from each other with ±0.1°, ±0.5°, ±1°, ±3°, or any appropriate angle value. Although an embodiment of the present disclosure will now be described on the assumption of a specific stereoscopic pair having orientations pointing in the same direction, the electronic device (e.g., the electronic device 400) of the present disclosure includes any stereoscopic pairs having any suitable orientations.

According to various embodiments, the stereoscopic pair 700 may have a predetermined spaced distance between the left camera 710L and the right camera 710R. The distance may be referred to as Inter-Camera Spacing (ICS). Here, the ICS may be measured based on two points of corresponding to the left and right cameras 710L and 710R or specifications of the left and right cameras 710L and 710R. For example, the ICS may correspond to the distance between the midpoints of the two cameras 710, the distance between the longitudinal axes of the two cameras 710, or the distance between the orientations 711 of the two cameras 710. According to one embodiment, the cameras 710L and 710R of the stereoscopic pair 700 may be spaced apart from each other by the ICS along the axis 712, which corresponds to the line, which connects the cameras 710L and 710R and is generally perpendicular to the orientations 711L and 711R.

According to one embodiment, the ICS may correspond to an approximate average distance between both pupils of a human or an Inter-Pupillary Distance (IPD). The stereoscopic pair 700 may have an ICS of 6 cm to 11 cm. Corresponding to the approximate average IPD of a human being about 6.5 cm, the stereoscopic pair 700 according to various embodiments may be assumed to have an ICS of 6 cm to 7 cm. However, the embodiment is not limited thereto, and the stereoscopic pair may have an ICS that is larger or smaller than the average IPD. An image captured using such a stereoscopic pair having a larger ICS value is capable of providing a viewer with an image having an improved 3D characteristic when reproduced. According to one embodiment, the stereoscopic pair may have an ICS of any suitable length designed according to factors such as the size of an entire imaging device, or the FOV of a camera lens.

Figure 8:
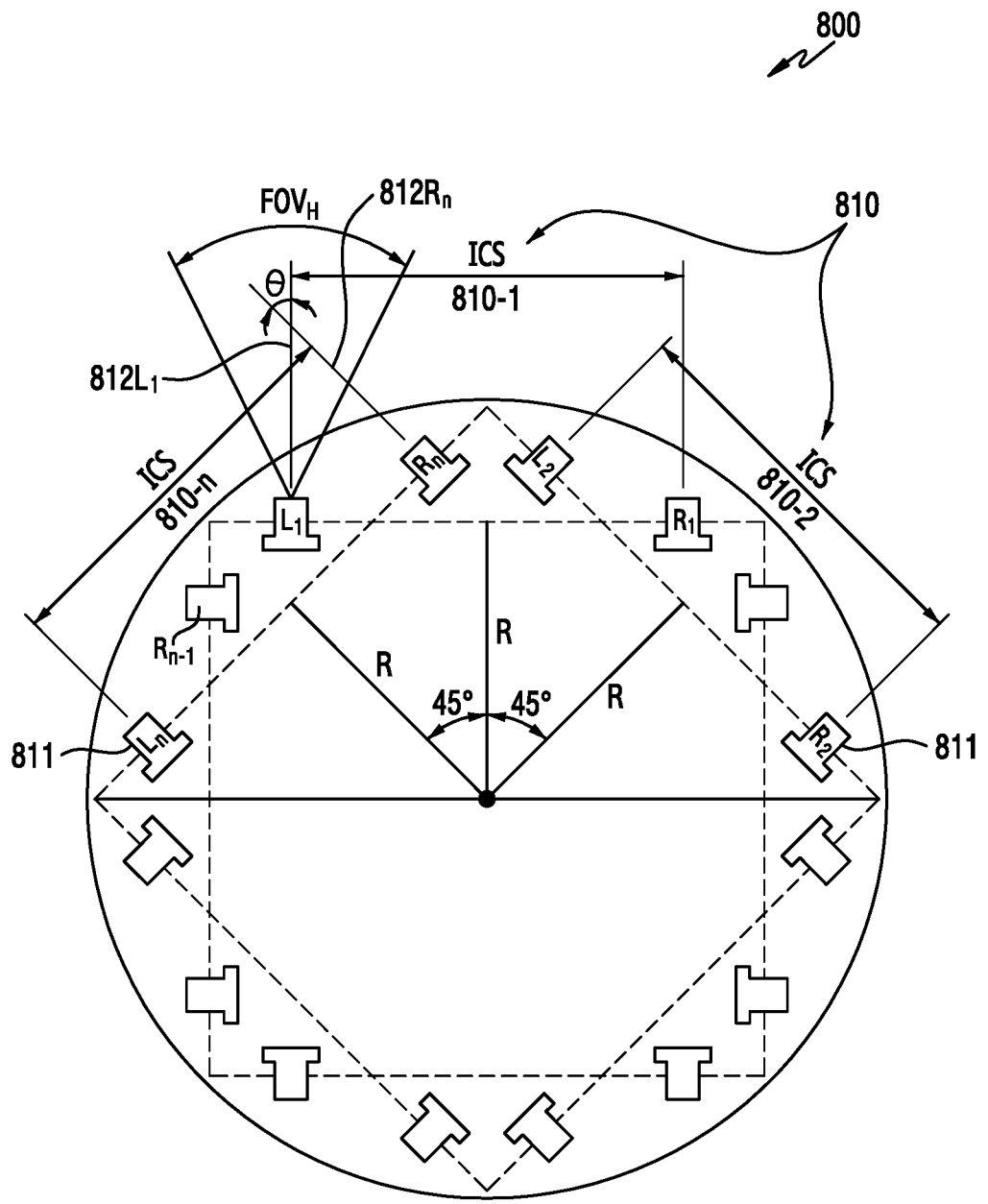
FIG. 8 illustrates a portion of a plan view of an exemplary camera arrangement of a camera system according to various embodiments.

FIG. 8 illustrates a portion of a plan view of an exemplary camera arrangement of a camera system according to various embodiments. Referring to FIG. 8, the camera system 800 includes a plurality of $n^{th}$ camera pairs 810 (or stereoscopic pairs) each constituted with a left camera 811-$L_n$ and a right camera 811-$R_n$. For example, a first left camera 811-$L_1$ and a first right camera 811-$R_1$ may constitute a first camera pair 810-1, and a second left camera 811-$L_2$ and a second right camera 811-$L_2$ may constitute a second camera pair 810-2. According to one embodiment, the camera system 800 may further include additional camera pairs such as a $n^{th}$ camera pair 810-$n$.

According to various embodiments, respective cameras 811 may be located on a horizontal face or on the same face. For example, the cameras 811 of the camera system 800 may be arranged along a rim (or an edge) in the form of a straight line, a curve, an ellipse (or a portion of an ellipse), a circle (or a portion of a circle), or any suitable shape (a portion of the shape). According to one embodiment, the cameras 811 of the camera system 800 may be arranged along the edge or periphery of a printed circuit board (e.g., the printed circuit board 530 of FIG. 5) having a specific shape under a predetermined rule. Referring to FIG. 8, in one embodiment, the camera system 800 having cameras 811 arranged along a circle (dashed line) may be configured to capture images over a panoramic view of 360 degrees (or a cylindrical side view). For example, the cameras 811 may be oriented towards the side face of the camera system 800 (or the electronic device). Respective cameras 811 of the camera system 800 may be located on the same face and each of the cameras 811 may have an $FOV_H$ that is oriented along the same face and an $FOV_V$ that is oriented to be perpendicular to the horizontal face. In other words, each of the cameras 811 of the camera system 800 may be located on the same face and the orientation 812 of each of the cameras 811 may also be located on the same face. The cameras 811 may be arranged so as to be substantially parallel to an arrangement face (e.g., the first face 531 in FIG. 5) on the printed circuit board on which the cameras 811 are mounted. For example, the cameras 811 including the first left camera 811-$L_1$ and the first right camera 811-$R_1$, the second left camera 811-$L_2$, the second right camera 811-$R_2$, the $n^{th}$ left camera 811-$L_n$, and the $n^{th}$ right camera 811-$R_n$ may be located along a circle (dashed line) on the same face, and the orientations of respective cameras 811 may also be located on the same face of the cameras 811. That is, the orientations 812 of respective cameras 811 may indicate the horizontal directions of the same face.

According to one embodiment, the camera system 800 may include a plurality of camera pairs 810 interleaved with each other. For example, one camera of the first camera pair 810-1 may be located between the cameras of the second camera pair 810-2 adjacent thereto. As another example, one camera of the second camera pairs 810-2 may also be located between the cameras of the first camera pair 810-1. In one embodiment, camera pairs, which are located adjacent to each other or in contact with each other, may mean camera pairs positioned side by side, or may mean camera pairs in which one camera of one camera pair is disposed to be located between the two cameras another camera pair. In other words, one camera of the camera pair 810-2 may be interleaved between the two cameras of the camera pairs 810-1 and vice versa. For example, as the camera pairs are interleaved with each other, the second right camera 811-$R_2$ is located between the first cameras 811-$L_1$ and 811-$R_1$, and the first left camera 811-$L_1$ may be located between the second cameras 811-$L_2$ and 811-$R_2$.

According to various embodiments, the cameras 811 of each camera pair 810 may be uniformly arranged such that adjacent pairs of cameras 810 may be oriented with an angle θ with respect to each other. According to one embodiment, the angle θ may correspond to the difference in orientation or the angular spacing of respective camera pairs 810 that are adjacent to each other. The first camera pair 810-1 in which the first left camera 811-L1 is included and the second camera pair 810-2 in which the second right camera 811-R2 may be located to have a difference of angle θ. According to one embodiment, the angle θ between adjacent camera pairs Ln-Rn may be approximately the same for adjacent camera pairs 810 of camera system 800. For example, respective adjacent camera pairs 810 of the camera system 800 may be oriented with an angle of 26 degrees, 30 degrees, 36 degrees, 45 degrees, 60 degrees, 90 degrees, or any suitable angle with respect to each other. According to one embodiment, in a camera system 800 having camera pairs 810 arranged along a circle at m uniform intervals, the angle θ between respective adjacent camera pairs may be expressed as θ=360 degrees/m. For example, in a camera system including eight camera pairs arranged along a circle at uniform intervals with m=8, the angle θ may be approximately 360 degrees/8=45 degrees. As another example, in a camera system including twelve camera pairs arranged along a circle at uniform intervals with m=12, the angle θ may be approximately 360 degrees/12=30 degrees.

Figure 9:
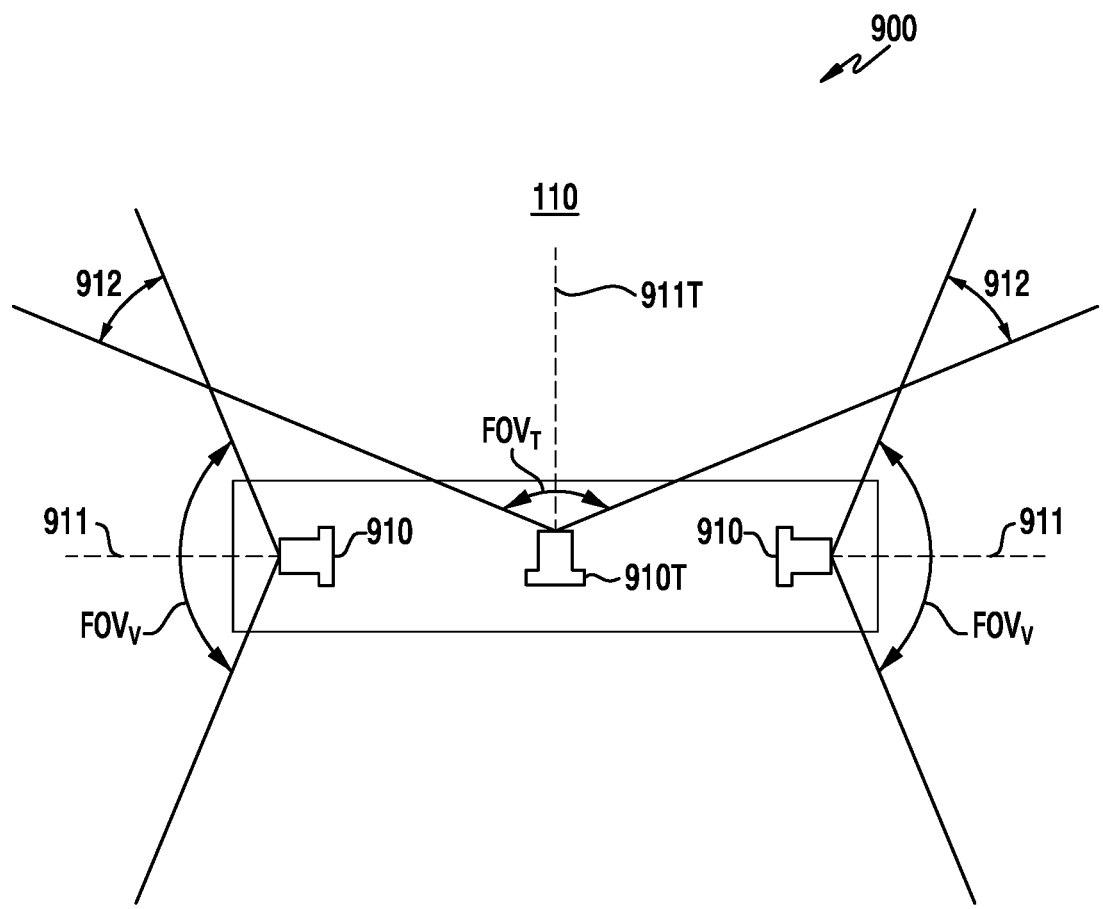
FIG. 9 is a side view of a camera system according to various embodiments.

FIG. 9 is a side view of a camera system according to various embodiments. According to one embodiment, a camera system 900 may include side cameras 910 arranged along the edge or periphery of the camera system 900, and a top camera 910T that is oriented upward with respect to the camera system 900. The side cameras 910 are capable of capturing a cylindrical side view and the top camera 910T is capable of capturing a top view that forms a roof on the cylindrical side view. The cylindrical side view and the top view may be combined so as to provide the user with an "omnidirectional image" or a "full 360° view" of 2D and/or 3D. According to another embodiment, the camera system 900 may further include a bottom camera (not illustrated) that is oriented downward. According to another embodiment, the camera system 900 may further include at least two top cameras 910T (e.g., a left top camera and a right top camera capable of configuring a stereoscopic pair). According to another embodiment, the camera system 900 may be configured with side cameras 910 having an $FOV_V$ of 180° or more without a top camera 910T and/or a bottom camera, and thus it is possible to capture a full 360° view only using the side cameras 910.

Referring to FIG. 9, the camera system 900 may include side cameras 910 arranged along the periphery of the camera system 900 and a top camera 910T located at the center. Each of the side cameras 910 and the top camera 910T may be at least partially the same as or similar to the camera 600 illustrated in FIG. 6. The side cameras 910 may be the same as or similar to the cameras (e.g., the cameras 811) illustrated in FIG. 8 and may be arranged to form stereoscopic pairs on the same face as described above. According to one embodiment, the top camera 910T may be disposed to be substantially orthogonal to the side cameras 910. The orientations 911 of the side cameras 910 may be parallel to the horizontal face on which the side cameras 910 are arranged. The orientation 911T of the top camera 910T may be substantially orthogonal to the orientations 911 of the side cameras 910. However, the embodiment is not limited thereto, and the camera system 900 according to various embodiments may have any suitable arrangement of side cameras 910 and any suitable configuration and arrangement of a top camera 910T.

According to one embodiment, the top camera 910T may have a $FOV_T$ that at least partially overlaps or shares the $FOV_V$ of the one or more side cameras 910. According to one embodiment, the top camera 910T may have an edge portion of the image captured by the top camera 910T (e.g., a top view) and a top overlap 921 between the top portions of the images captured by the side cameras 910 (e.g., the cylindrical side views). The top overlap 921 may overlap 10% to 30% of the $FOV_V$ of the side cameras 910 and/or the $FOV_T$ of the $FOV_H$ of the top camera 910T. According to one embodiment, the top camera 910T may have a relatively larger FOV than that of the side cameras 910. For example, the $FOV_T$ of the top camera 910T may have 140° to 185°.

Figure 10:
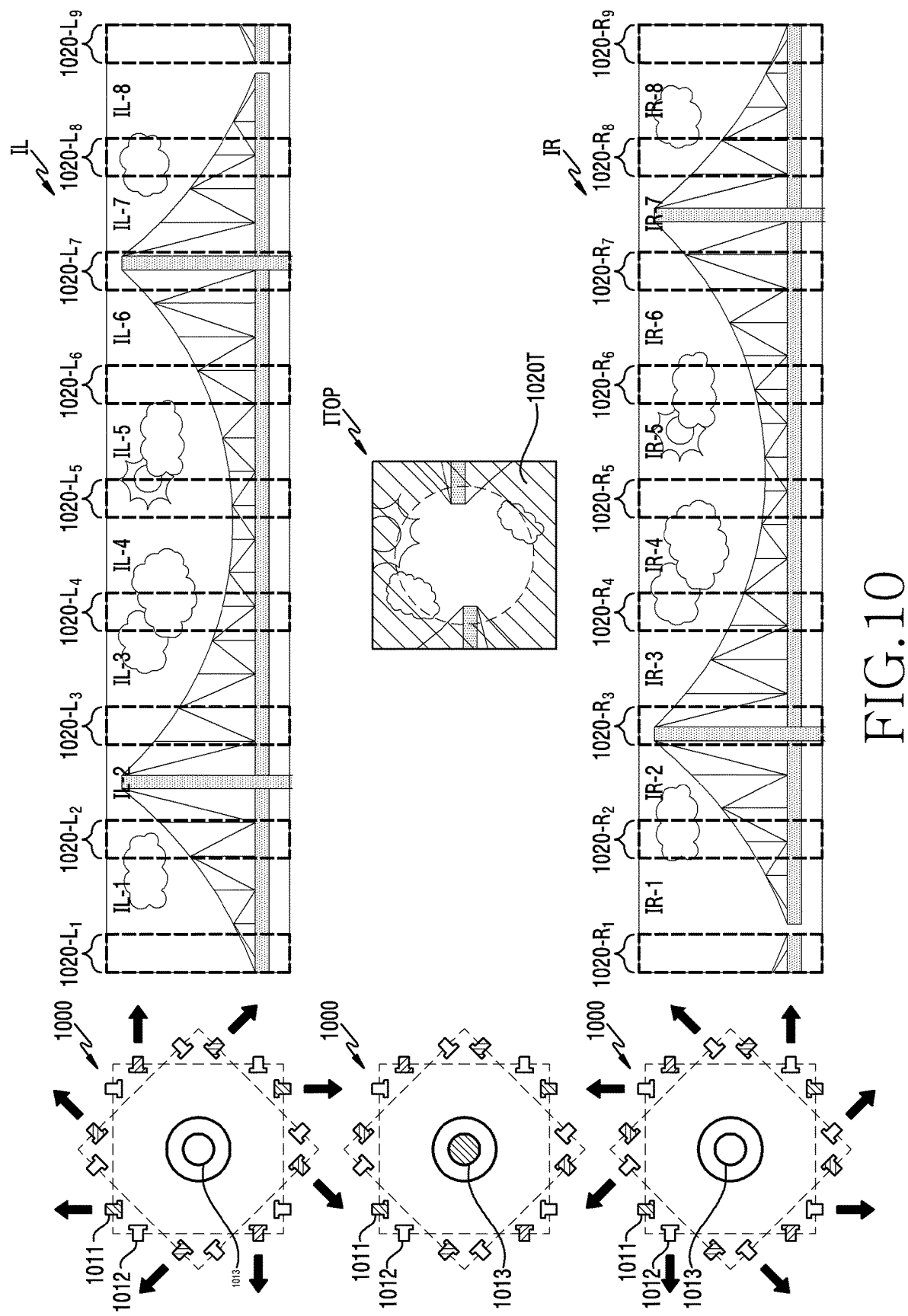
FIG. 10 illustrates an exemplary set of overlapped images captured by the camera system according to various embodiments.

FIG. 10 illustrates an exemplary set of overlapped images captured by the camera system according to various embodiments.

In the embodiment of FIG. 10, a camera system 1000 may include a plurality of left cameras 1011 and a plurality of right cameras 1012, which constitute stereoscopic pairs, respectively, and at least one top camera 1013. The side cameras 1011 and 1012 may be the same or similar to the cameras illustrated in FIG. 8 (e.g., the side cameras 811) and may be disposed on the same face. The top camera 1013 may be the same as or similar to the top camera 910T illustrated in FIG. 9, and the side cameras 1011 and 1012 may be disposed to be oriented to be orthogonal to the side cameras 1011 and 1012. However, the embodiment is not limited thereto, and the camera system 1000 according to various embodiments may have any suitable configuration and arrangement of side cameras and a top camera.

Referring to FIG. 10, the camera system 1000 according to various embodiments may have eight left stereoscopic pairs, and thus may include eight left cameras 1011 and eight right cameras 1012. Left camera images IL can be captured or obtained from the left cameras 1011. Right camera images IR can be captured or obtained from the right cameras 1012. A top image ITOP can be captured or obtained from the top camera 1013. According to one embodiment, the camera system 1000 may combine the left camera images IL and the top image ITOP so as to provide a 2D omnidirectional image (or a 2D full 360° view). According to another embodiment, the camera system 1000 may combine the right camera images IR and the top image ITOP so as to provide a 2D omnidirectional image. According to another embodiment, the left camera images IL are images corresponding to the left eye of a person, and the right camera images IR may be images corresponding to the right eye of a person. Thus, the camera system 1000 may provide a 3D omnidirectional image (or a 3D full 360° view) using the left camera images IL, the right camera images IR, and the top image ITOP. The camera system 1000 may use only any one of the left camera images IL and the right camera images IR in order to provide a 2D omnidirectional image.

According to one embodiment, the left cameras 1011 and the right cameras 1012 included in the camera system 1000 may be arranged in a paired and interleaved manner, as described above. Thus, the images captured from respective cameras may partially overlap each other so as to generate the left camera images IL and the right camera images IR.

According to one embodiment, the left camera images IL may include first to eighth left camera images IL-1 to IL-8. Overlapped areas 1020-Ln may correspond to overlapped or shared portions of the images IL of neighboring left cameras 1011. For example, the first overlapped area 1021-L1 may be an overlapped area of the first left camera image IL-1 and the second left camera image IL-2, and the eighth overlapped area 1021-L8 may be an overlapped area of the first left camera image IL-1 and the eighth left camera image IL-8. Similarly, the right camera images IR may include first to eighth right camera images IRL-1 to IRL-8. Overlapped areas 1020-Rn may correspond to overlapped or shared portions of the images IR of neighboring right cameras 1011. An overlapped area 1020-T of the top image ITOP may partially overlap the top portions of the side camera images, e.g., the upper portions of the left camera images IL and/or the right camera images IR. The overlapped area 1021-T may correspond to the edge area of the top image ITOP. According to one embodiment, the overlapped area 1020-T may be used to stitch the top image ITOP with the images obtained from one or more side cameras 1011 and 1012.

Figure 11A:
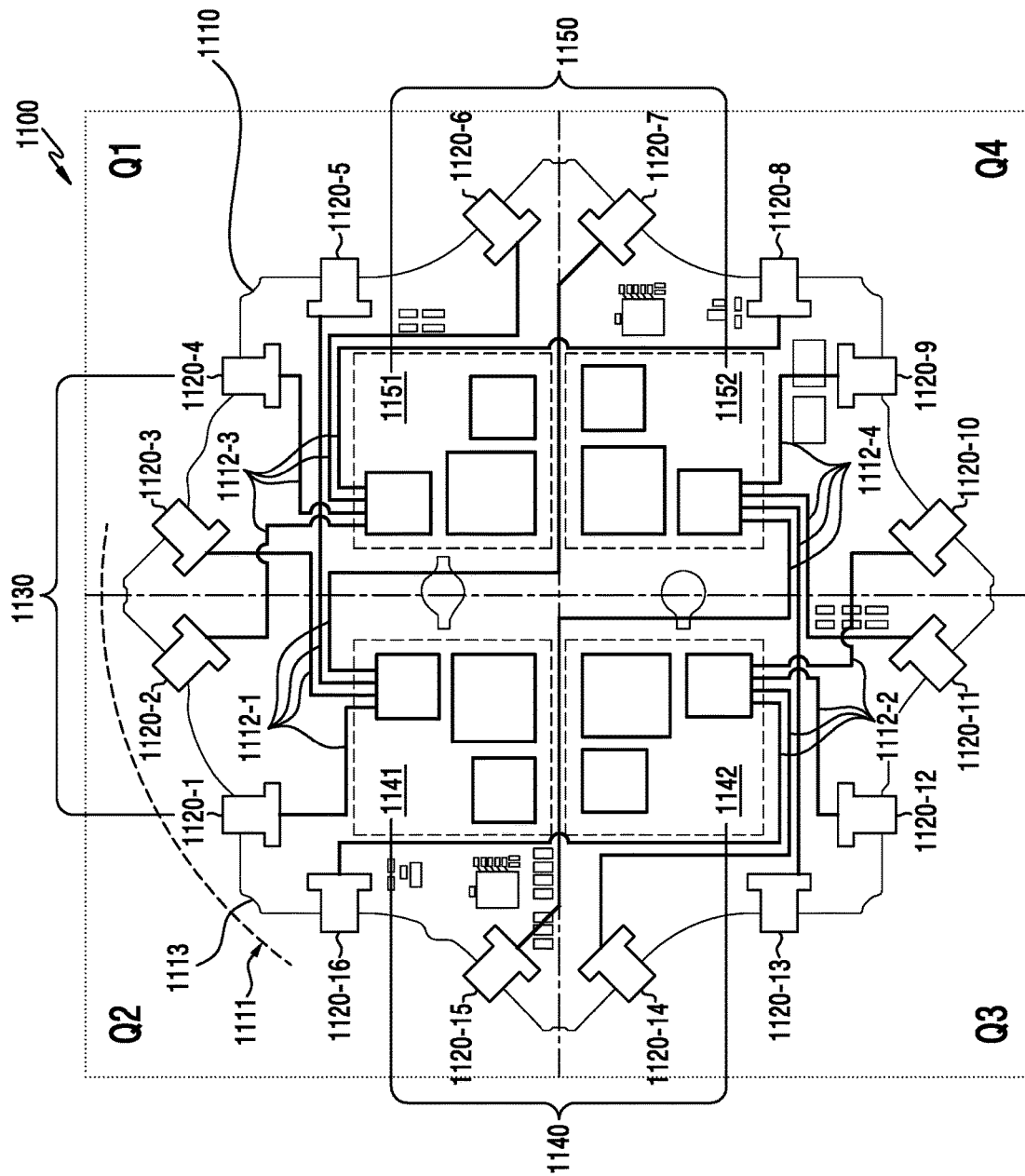
FIG. 11 is a plan view illustrating an example of a PCB according to various embodiments.
Figure 11B:
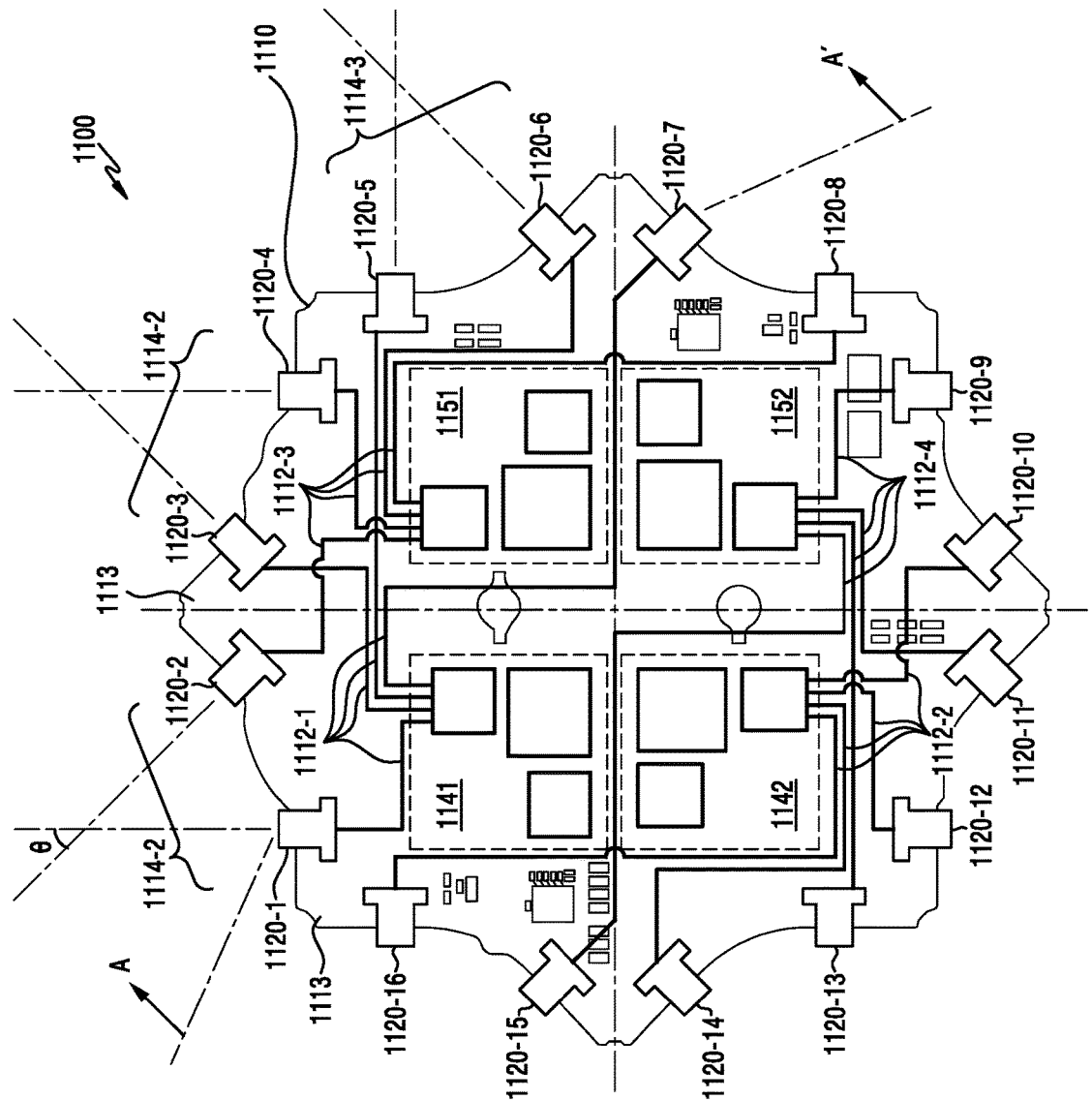

FIGS. 11A and 11B are plan views illustrating an example of a printed circuit board according to various embodiments.

Referring to FIGS. 11A and 11B, a camera system 1100 may include a printed circuit board 1110 and a plurality of cameras 1110 that are uniformly disposed along the edges or periphery of the printed circuit board 1110. The printed circuit board 1110 of FIGS. 11A and 11B may be at least partially identical or similar to the printed circuit board 530 illustrated in FIG. 5, and the camera system 1100 configured with the plurality of cameras 1120 may be at least partially identical or similar to the camera systems 800, 900, and 1000 illustrated in FIGS. 8 to 10.

Referring to FIGS. 11A and 11B, the first to sixteenth cameras 1120-1 to 1120-16 according to one embodiment may be sequentially arranged in a clockwise direction along the periphery of the printed circuit board 1100. The first to sixteenth cameras 1120-1 to 1120-16 may be disposed on the same face of the printed circuit board 1100. The orientation (e.g., the $FOV_H$) of each of the first to the sixteenth cameras 1120-1 to 1120-16 may be parallel to the mounting face of the printed circuit board 1100 (e.g., the first face 531 in FIG. 5). The first to sixteenth cameras 1120-1 to 1120-16 may be configured to form respective eight stereoscopic pairs. For example, the first camera 1120-1 and the fourth camera 1120-4 may form a first stereoscopic pair 1130. Accordingly, the first camera 1120-1 may be referred to as a first left camera, and the fourth camera 1120-4 may be referred to as a first right camera. Thus, in the embodiment of FIG. 8, the plurality of cameras 1110 (i.e., the first to sixteenth cameras 1120-1 to 1120-16) are include a left camera set of eight cameras and a right camera set of eight cameras that form eight stereoscopic pairs. For example, the left camera set may include the first camera 1120-1, the third camera 1120-3, the fifth camera 1120-5, the seventh camera 1120-7, the ninth camera 1120-9, the eleventh camera 1120-11, the thirteenth camera 1120-13, and the fifteenth camera 1120-15. In addition, the right camera set may include the second camera 1120-2, the fourth camera 1120-4, the sixth camera 1120-6, the eighth camera 1120-8, the tenth camera 1120-10, the twelfth camera 1120-12, the fourteenth camera 1120-14, and the sixteenth camera 1120-16. According to one embodiment, the eight cameras of the left camera set and the eight cameras of the right camera set may be interleaved with each other. For example, the first camera 1120-1 corresponding to the first left camera may be arranged adjacent to the second camera 1120-2 and the sixteenth camera 1120-16 between the second camera 1120-2 corresponding to the first right camera and the sixteenth camera 1120-16 corresponding to the eighth right camera.

According to one embodiment, the printed circuit board 1110 may be configured such that the plurality of cameras 1120 do not protrude beyond the outermost edge 1111 (or a housing (e.g., the housing 410 of FIG. 4)) of the printed circuit board 1110. For example, the printed circuit board 1110 may include at least one protrusion 1113 formed along the periphery thereof. The plurality of cameras 1120 are optical devices that are sensitive to an external impact, and thus, in the plurality of cameras 1120, malfunction or an error due to an external with respect to the camera system 1100) (or the electronic device), or quality deterioration of captured images may be caused due to scratches or the like on the lenses. Accordingly, the printed circuit board 1110 has a shape having a configuration or arrangement in which the plurality of cameras 1120 are disposed inside the outermost portion 1111 thereof without protruding from the outermost portion 1111, so that the cameras 1120 can be protected from external shocks.

The camera system 1100 according to various embodiments of the present disclosure will be described in one aspect with reference to FIG. 11A. According to one embodiment, the plurality of cameras 1110 may be operatively and electrically connected to a plurality of processors 1140 and 1150, respectively. Each of the plurality of processors 1140 and 1150 is capable of encoding (or image-processing) an electrical brightness signal obtained from a camera (or an image sensor) connected thereto into a digital image. Thus, each of the plurality of processors 1140 and 1150 may be referred to as an image processor. According to one embodiment, each of the plurality of processors 1140 and 1150 may include a Field Programmable Gate Array (FPGA), and may be operatively and electrically connected to each of the plurality of cameras 1110 through the FPGA.

For example, the left camera set may be connected to the left processor 1140. For example, the first camera 1120-1, the third camera 1120-3, the fifth camera 1120-5, the seventh camera 1120-7, the ninth camera 1120-9, the eleventh camera 1120-11, the thirteenth camera 1120-13, and the fifteenth camera 1120-15 may be connected to the left processor 1140.

For example, the right camera set may be connected to the right processor 1150. For example, the second camera 1120-2, the fourth camera 1120-4, the sixth camera 1120-6, the eighth camera 1120-8, the tenth camera 1120-10, the twelfth camera 1120-12, the fourteenth camera 1120-14, and the sixteenth camera 1120-16 may be connected to the right processor 1150.

The plurality of electrical connections between the plurality of cameras 1120 and processors 1140 and 1150 may be formed by a plurality of conductive patterns formed on the printed circuit board 1110. According to one embodiment, the printed circuit board 1110 may be implemented as a multilayer printed circuit board in order to prevent interference between the plurality of conductive patterns. According to another embodiment, the plurality of electrical connections may also be formed of at least one or a combination of two or more of a conductive pattern formed on the printed circuit board 1110, a Flexible Printed Circuit Board (FPCB), and wiring.

In the above-described embodiment, the electrical connection between the left camera set and the left processor 1140 and the electrical connection between the right camera set and the right processor 1150 may be defined as a first configuration. With the first configuration, the left processor 1140 may provide left camera images (e.g., left camera images IL in FIG. 10) based on images acquired from the left camera set, and the right processor 1150 may provide right camera images (e.g., the right camera images IR in FIG. 10) based on the images acquired from the right camera set. As an example, the camera system 1100 may provide a 2D omnidirectional image based on the left camera images, through control and/or power supply with respect to the left processor 1140. As another example, the camera system 1100 may provide a 2D omnidirectional image based on the right camera images, through control and/or power supply with respect to the right processor 1150. As still another example, the camera system 1100 may provide a 3D omnidirectional image based on the left and right camera images, through control and/or power supply with respect to the left processor 1140 and the right processor 150. Accordingly, according various embodiments of the present disclosure, the camera system 1100 may provide a 2D omnidirectional image through control and/or power supply to any one of the left processor 1140 and the right processor 1150.

Processors (e.g., the processors 1140 and 1150) according to various embodiments of the present disclosure may be include a plurality of processors. For example, the left processors 1140 may be constituted with a first left processor 1141 and a second left processor 1142, and the right processors 1150 may be constituted with a first right processor 1151 and a second right processor 1152. According to one embodiment, each of the plurality of processors 1141, 1142, 1151, and 1152 may further include an FPGA. According to one embodiment, the first camera 1120-1, the third camera 1120-3, the fifth camera 1120-5, and the seventh camera 1120-7 may be electrically connected to the first left processor 1141. The ninth camera 1120-9, the eleventh camera 1120-11, the thirteenth camera 1120-13, and the fifteenth camera 1120-15 may be electrically connected to the second right processor 1142. In addition, the second camera 1120-2, the fourth camera 1120-4, the sixth camera 1120-6, and the eighth camera 1120-8 may be electrically connected to the first right processor 1151. The tenth camera 1120-10, the twelfth camera 1120-12, the fourteenth camera 1120-14, and the sixteenth camera 1120-16 may be electrically connected to the second right processor 1152. The plurality of electrical connections between the plurality of cameras 1120 and processors 1141, 1142, 1151, and 1152 may be formed by a plurality of interfaces (or signal lines or a conductive pattern) formed on the printed circuit board 1110. For example, the first left processor 1141 may be connected to a plurality of cameras (e.g., the cameras 1120-1, 1120-3, 1120-5, and 1120-7) by first interfaces 1112-1 For example, the second left processor 1142 may be connected to a plurality of cameras (e.g., the cameras 1120-9, 1120-11, 1120-13, and 1120-15) by second interfaces 1112-2 For example, the first right processor 1151 may be connected to a plurality of cameras (e.g., the cameras 1120-2, 1120-4, 1120-6, and 1120-8) by third interfaces 1112-3 For example, the second right processor 1152 may be connected to a plurality of cameras (e.g., the cameras 1120-10, 1120-12, 1120-14, and 1120-16) by fourth interfaces 1112-4.

According to one embodiment, the printed circuit board 1110 may be implemented as a multilayer printed circuit board in order to prevent interference between the plurality of interfaces. According to another embodiment, the electrical connections between the cameras and the processors may also be formed of at least one or a combination of two or more of a conductive pattern formed on the printed circuit board 1110, an FPCB, and wiring.

In the above-described embodiment, the electrical connections between the left camera set and the first and second left processors 1141 and 1142 and the electrical connections between the right camera set and the first and second right processors 1151 and 1152 may be defined as a second configuration. With the second configuration, the camera system 1100 may provide a 2D or 3D omnidirectional image based on left camera images and/or right camera images, through control and/or power supply with respect to at least one or a combination of two or more of the left and right processors 1141, 1142, 1151, and 1152. In addition, the camera system 1100 may provide a 2D panoramic image through control and/or power supply with respect to one of the left and right processors 1141, 1142, 1151, and 1152.

According to the first and second configurations described above, each of the plurality of cameras 1120 may be configured to be electrically connected to a functionally associated processor, rather than a processor disposed adjacent thereto on the printed circuit board 1110. For example, assuming that the printed circuit board 1110 is divided into quadrants, the first camera 1120-1, the second camera 1120-2, the fifteenth camera 1120-15, and the sixteenth camera included in the second quadrant Q2 may be connected to different processors, respectively, rather than being connected to the nearest first left processor 1141. That is, the printed circuit board 1110 may include interfaces to which the processors, with which the cameras 1120 are respectively functionally associated, can be electrically connected, regardless of the complexity of the interfaces and hence difficulties in design/process.

Accordingly, the camera system 1100 according to various embodiments of the present disclosure may only require control with respect to an associated processor (e.g., the processor 1141, 1142, 1151, or 1152) depending on the type of an image (e.g., a 2D panoramic view, or a 2D or 3D omnidirectional image). That is, the camera system 1100, which includes connection configurations (e.g., the first configuration and the second configuration) between the plurality of cameras 1120 and the processors 1140 and 1150 according to various embodiments of the present disclosure, may be efficiently operated in terms of calculation for image processing and power management.

However, the embodiment is not limited thereto, and the connections between the plurality of cameras 1120 and the processors may be reconfigured based on various design factors such the number of the plurality of cameras 1120, the type of images obtained from the plurality of cameras 1120, the number of processors, the arrangement of the processors, and the like.

Hereinafter, the camera system 1100 according to various embodiments of the present disclosure will be described in another aspect with reference to FIG. 11B. According to one embodiment, the printed circuit board 1110 may include a plurality of protrusions 1113 at regular intervals along the circumference thereof. The plurality of cameras 1120 may be arranged to have a pair of adjacent cameras in each of the areas between the protrusions 1113. Each of the areas between the projections 1113 may be defined by a concave portion 1114. For example, the first camera 1120-1 and the second camera 1120-2 may be arranged in a first concave portion 1114-1. The third camera 1120-3 and the fourth camera 1120-4 may be disposed in a second concave portion 1114-2 adjacent to the first concave portion 1114-1. The fifth camera 1120-5 and the sixth camera 1120-6 may be disposed in a third concave portion 1114-2 adjacent to the second concave portion 1114-2.

The first camera 1120-1 and the second camera 1120-2 may be arranged such that the optical axes (or orientations) cross each other at an interval of a specific angle (Θ). In other words, the first camera 1120-1 and the second camera 1120-2 may capture FOVs, substantially almost all areas of which overlap each other, at different angles. The first camera 1120-1 and the fourth camera 1120-4 may be arranged such that the optical axes thereof are substantially parallel to each other. The first camera 1120-1 and the fourth camera 1120-4 may constitute a stereoscopic pair for acquiring images corresponding to the left eye and the right eye, respectively. According to one embodiment, when the specific angle (Θ) is 45°, the optical axes of the first camera 1120-1 and the fifth camera 1120-5 may be substantially orthogonal (90°) to each other. The remaining sixth to sixteenth cameras 1120-6 to 1120-16 may be disposed on the printed circuit board 1110 according to the above-described arrangement relationship.

According to one embodiment, the camera system 1100 may include a plurality of processors 1141, 1142, 1151, and 1152 disposed on the printed circuit board 1110. The plurality of processors may be disposed on one face of the printed circuit board 1110 together with the plurality of cameras 1120. According to one embodiment, the first processor 1141 may be disposed on the printed circuit board 1110 in an area adjacent to the first camera 1120-1 and the second camera 1120-2. The second processor 1151 may be disposed on the printed circuit board 1110 in an area adjacent to the third camera 1120-3 and the fourth camera 1120-4.

According to one embodiment, the first camera 1120-1 may be electrically connected to the first processor 1141 and the fourth camera 1120-4 may be electrically connected to the second processor 1151. The second camera 1120-2 may be electrically connected to the second processor 1151, rather than to the adjacent first processor 1141 adjacent thereto. In addition, the third camera 1120-3 may be electrically connected to the first processor 1141, rather than to the second processor 1151 adjacent thereto. The fifth camera 1120-5 and the seventh camera 1120-7 may be electrically connected to the first processor 1141, rather than to the processors 1151 and 1152 adjacent thereto. For example, the first processor 1141 may be connected to a plurality of cameras (e.g., the cameras 1120-1, 1120-3, 1120-5, and 1120-7) by first designated interfaces 1112-1 The second processor 1151 may be connected to a plurality of cameras (e.g., the cameras 1120-2, 1120-4, 1120-6, and 1120-8) by second designated interfaces 1112-3 The third processor 1142 may be connected to a plurality of cameras (e.g., the cameras 1120-9, 1120-11, 1120-13, and 1120-15) by third designated interfaces 1112-2 The fourth processor 1152 may be connected to a plurality of cameras (e.g., the cameras 1120-10, 1120-12, 1120-14, and 1120-16) by fourth designated interfaces 1112-4.

Thus, the camera system 1100 according to various embodiments of the present disclosure is capable of obtaining a 2D panoramic view A-A' merely through control with respect to the first processor 1141. The camera system 1100 is capable of obtaining a 3D panoramic view A-A' merely through control with respect to the first processor 1141 and the second processor 1142. The camera system 1100 is capable of obtaining a 2D omnidirectional view merely through control with respect to the first processor 1141 and the fourth processor 1152. The camera system 1100 is capable of obtaining a 3D omnidirectional view through control with respect to all the processors 1141, 1142, 1151, and 1152. That is, each of the plurality of cameras 1120 may be configured to be electrically connected to a functionally associated processor, rather than to a processor disposed the printed circuit board 1110 adjacent thereto.

According to one embodiment, the printed circuit board 1110 may be implemented as a multilayer printed circuit board in order to prevent interference between the plurality of interfaces. According to another embodiment, the electrical connections between the cameras and the processors may also be formed of at least one or a combination of two or more of a conductive pattern formed on the printed circuit board 1110, an FPCB, and wiring. That is, the printed circuit board 1110 may include interfaces to which the processors, with which the cameras 1120 are respectively functionally associated, can be electrically connected, regardless of the complexity of the interfaces and hence difficulties in design/process.

Figure 12:
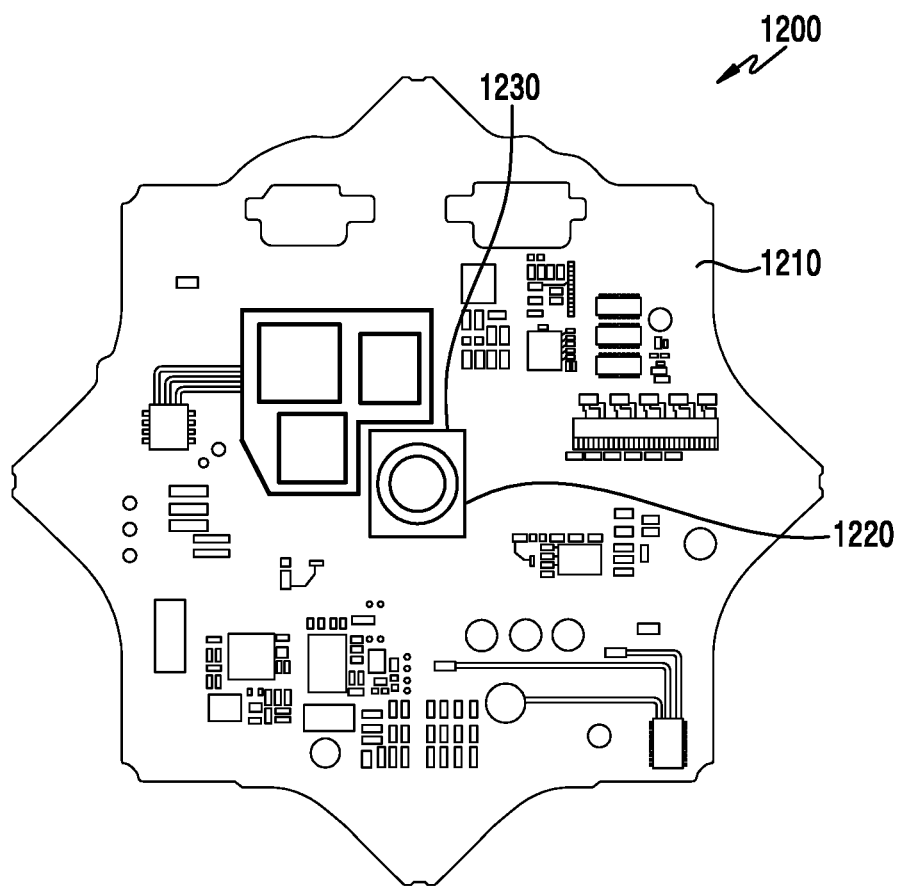
FIG. 12 is a plan view illustrating another example of a printed circuit board according to various embodiments.

FIG. 12 is a plan view illustrating another example of a printed circuit board according to various embodiments. Referring to FIG. 12, a camera system 1200 may include a PCB 1210 and a processor 1220 mounted on the PCB 1210. The PCB 1110 of FIG. 12 may be at least partially the same or similar to the PCB 530 illustrated in FIG. 5.

According to one embodiment, a top camera 1230 included in the camera system 1200 may be operatively and electrically connected to the processor 1220. The processor 1220 is capable of encoding (or image-processing) an electrical brightness signal obtained from the top camera 1230 connected thereto into a digital image. Thus, the processor 1220 may be referred to as an image processor. According to one embodiment, the processor 1220 may include an FPGA, and may be operatively and electrically connected to the top camera 1230 through the FPGA.

According to one embodiment, the processor 1220 in the camera system 1200 may operate as a main processor (e.g., the processor 310 of FIG. 3) in addition to processing images obtained from the top camera 1230. The processor 1220 may control one or more other components (e.g., a hardware or software component) of the electronic device (e.g., the apparatus 300 of FIG. 3), which are connected to the processor 1220 and may perform various data processing and arithmetic operations by driving software (e.g., a program or an instruction word). For example, the processor 1220 may receive image data, acquired from other cameras (e.g., the cameras 1120 of FIG. 11), from other processors (e.g., the processors 1141, 1142, 1151, and 1152 of FIG. 11) and may combine the image data obtained from the top camera 1230 to the image data acquired from the other cameras. That is, the processor 1220 is capable of collectively operating the image data acquired by the camera system 1200. However, the embodiment is not limited thereto, and the number of the processors 1220 and the other processors (e.g., the processors 1141, 1142, 1151, and 1152 in FIG. 11) and the arithmetic processing method may be suitably determined or configured. For example, the processor 1220 may receive image data acquired directly from other cameras (e.g., the cameras 1120 of FIG. 11) and may receive image data acquired from the top camera 1230, and may integrate and process the image data. The configuration of the processors will be described later in detail.

According to one embodiment, the processor 1220 may include at least one communication interface (e.g., the communication interface 340 of FIG. 3). The processor 1220 may be connected to at least one of the other processors (e.g., the processors 1141, 1142, 1151, and 1152 of FIG. 11) using a communication interface for image data reception, or may be connected to a communication interface for image data transmission. According to one embodiment, connections between the processor 1220 and other processors may include at least one of a via hole, a conductive pattern, a wiring, and a cable formed in the PCB 1210. The configuration in which the processor 1220 according to one embodiment is connected to other processors and/or interfaces will be described later in detail.

Figure 13A:
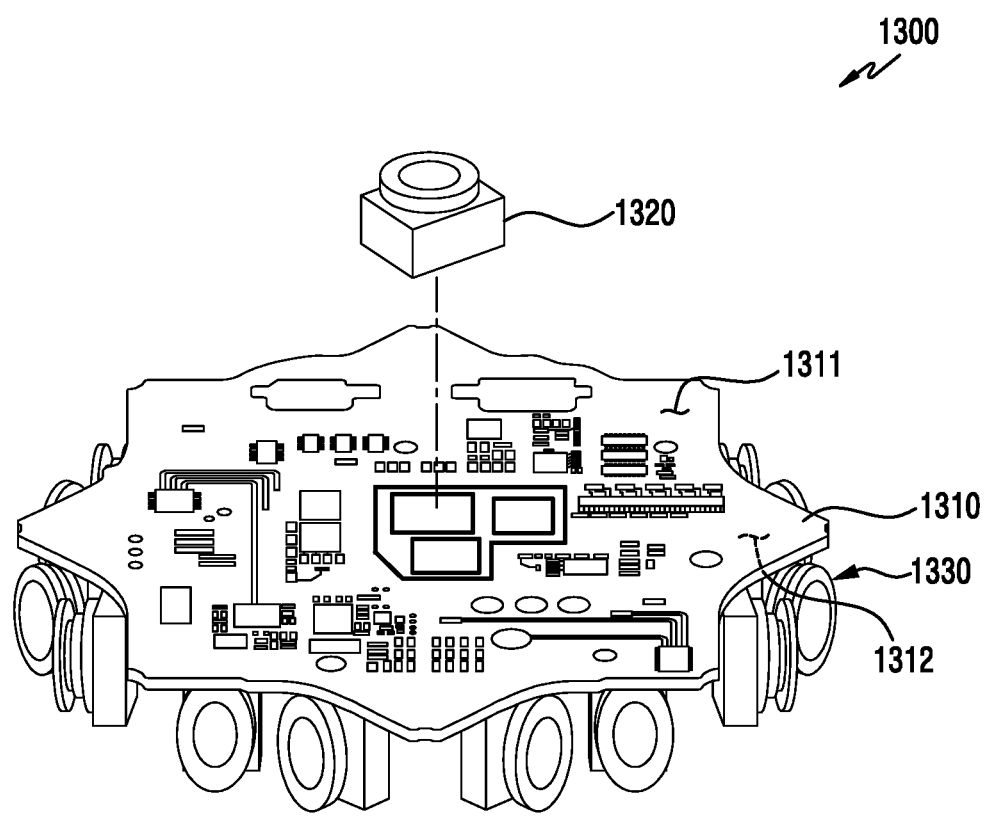
FIGS. 13A to 13C illustrate examples of an arrangement structure of a plurality of cameras and a PCB according to various embodiments.
Figure 13B:
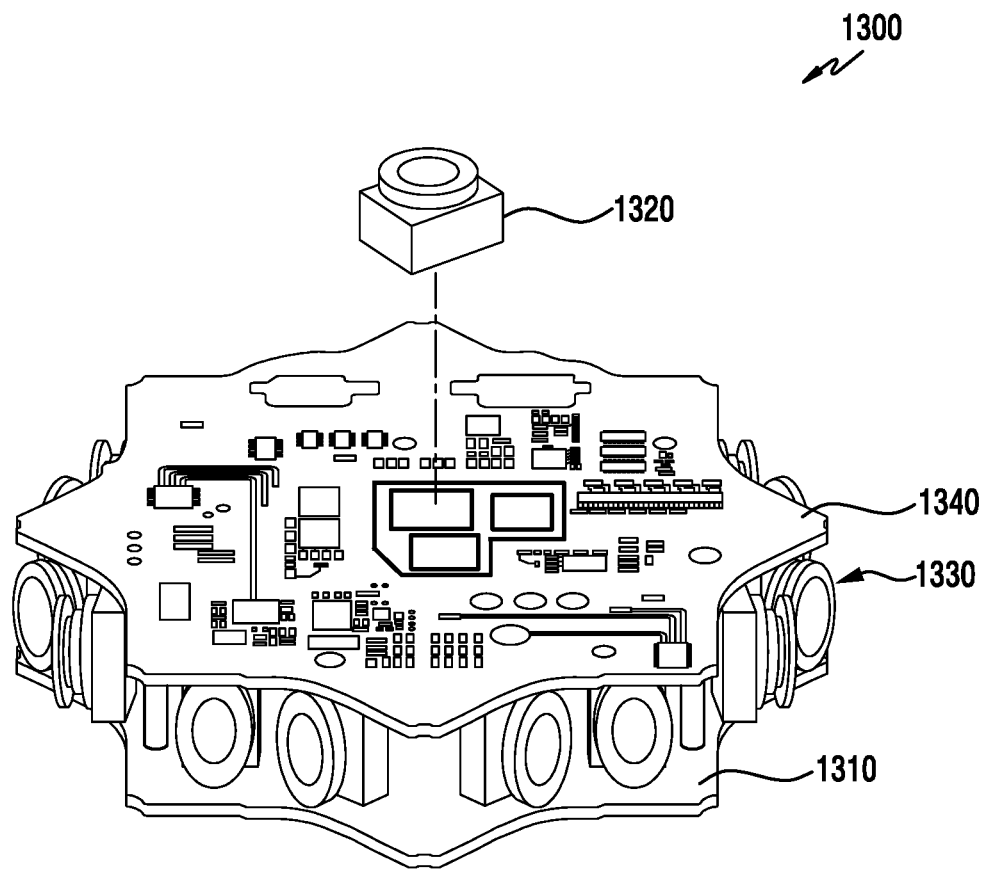
Figure 13C:
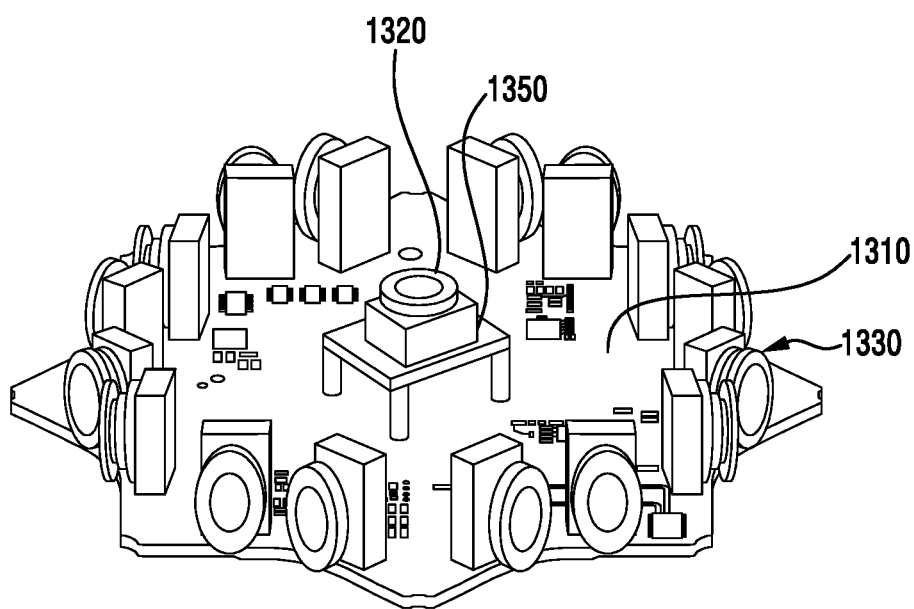

FIGS. 13A to 13C illustrate examples of the arrangement structure of a plurality of cameras and a PCB according to various embodiments.

Referring to FIG. 13A, a camera system 1300 according to one embodiment may include a double-sided PCB. A processor connected to a top camera 1320 (or the top camera 541 in FIG. 5) may be mounted on the top face 1311 of the PCB 1310. On the rear face 1312 of the PCB 1310, a plurality of side cameras 1330 (or the cameras 542 of FIG. 5) may be disposed along the periphery of the PCB 1310 and at least one processor connected to the plurality of side cameras 1330 may be mounted. Here, the top face 1311 of the PCB 1310 may be configured using the PCB 1210 illustrated in FIG. 12, and the bottom face 1312 may be configured using the PCB 1110 illustrated in FIG. 11. Thus, the camera system 1300 may have a thickness reduction (slimming) effect of the camera system 1300 by including a double-sided PCB.

Referring to FIG. 13B, a camera system 1300 according to one embodiment may include a plurality of single-sided PCBs. For example, the camera system 1300 may include a first PCB 1310 and a second PCB 1340 that forms a duplex with the first PCB 1310. A processor connected to the top camera 1320 may be mounted on the second PCB 1340. On the first PCB 1310, a plurality of side cameras 1330 may be disposed along the periphery of the second PCB 1310 and at least one processor connected to the plurality of side cameras 1330 may be mounted. Here, the second PCB 1340 may be configured using the PCB 1210 illustrated in FIG. 12, and the first PCB 1310 may be configured using the PCB 1110 illustrated in FIG. 11.

Referring to FIG. 13C, the camera system 1300 according to one embodiment may include a PCB 1310 and a support 1350 disposed on the PCB 1310. The plurality of side cameras 1330 may be disposed along the periphery of the printed circuit board 1310 and the top camera 1320 may be disposed on the support 1350 on the printed circuit board 1310. The support 1350 may be fixedly coupled to the top camera 1320. The support 1350 may have any suitable structure such that the top camera 1320 can be stably fixed. The PCB 1310 may be mounted with at least one processor connected to the top camera 1320 and the plurality of side cameras 1330.

Without being limited to the embodiment illustrated in FIGS. 13A to 13C, the PCB may have any suitable structure on which a top camera, a plurality of side cameras, and at least one processor connected to the cameras can be mounted.

Figure 14:
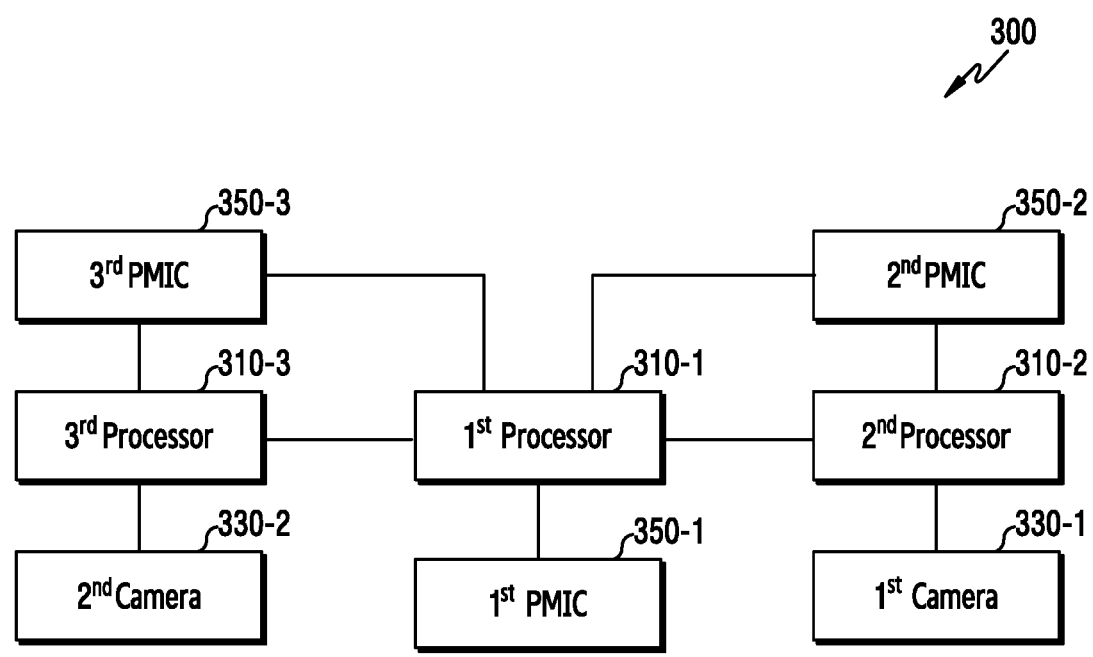
FIG. 14 illustrates an example of a functional configuration of an apparatus that controls power according to various embodiments.

FIG. 14 illustrates an example of the functional configuration of an apparatus that controls power according to various embodiments. This functional configuration may be included in the apparatus 300 illustrated in FIG. 3.

Referring to FIG. 14, the apparatus 300 may include a first processor 310-1, a second processor 310-2, a third processor 310-3, a first camera 330-1, a second camera 330-2, a first PMIC 350-1, a second PMIC 350-2, and a third PMIC 350-3.

The first processor 310-1 may control the overall operation of the apparatus 300. The first processor 310-1 may control the overall operation of the apparatus 300 by being operatively connected to the other components (e.g., the second processor 310-2, the third processor 310-3, the second PMIC 350-2, and the third PMIC 350-2).

The second processor 310-2 may be operatively connected to the first camera 330-1. The second processor 310-2 may acquire an image through the first camera 330-1. The second processor 310-2 may encode the acquired image. The second processor 310-2 may generate the encoded data by encoding the acquired image. The second processor 310-2 may provide the encoded data to the first processor 310-1.

The second processor 310-2 may be operatively connected to the second PMIC 350-2. The second processor 310-2 may operate based on the power provided from the second PMIC 350-2.

The third processor 310-3 may be operatively connected to the second camera 330-2. The third processor 310-3 may acquire an image through the second camera 330-2. The third processor 310-3 may encode the acquired image. The third processor 310-3 may generate encoded data by encoding the acquired image. The third processor 310-3 may provide the encoded data to the first processor 310-1.

The third processor 310-3 may be operatively connected to the third PMIC 350-3. The third processor 310-3 may operate based on the power provided from the third PMIC 350-3.

Each of the first processor 310-1, the second processor 310-2, and the third processor 310-3 may correspond to the processor 310 illustrated in FIG. 3.

The first camera 330-1 may be operatively connected to the second processor 310-2. The first camera 330-1 may be configured to be oriented in a first direction. The first camera 330-1 may have a first optical axis (e.g., the orientation 711L in FIG. 7). The first camera 330-1 may have a first FOV (or a first AOV). Optical data associated with the image acquired through the first camera 330-1 may be provided to the second processor 310-2.

The second camera 330-2 may be operatively connected to the third processor 310-3. The second camera 330-2 may be configured to be oriented in a second direction corresponding to the first direction. The second camera 330-2 may have a second optical axis (e.g., the orientation 711R in FIG. 7). The second camera 330-2 may have a second FOV, which partially overlaps the first FOV. Since the second camera 330-2 is configured to be oriented in the second direction corresponding to the first direction, and has the second FOV, which partially overlaps the first FOV, the second camera 330-2 may perform a function, which is the same as the left eye of a person relative to the first camera 330-1. In other words, the first camera 330-1 may perform a function, which is the same as the right eye of a person relative to the second camera 330-2. In other words, when only the images acquired through the second camera 330-2 are used, the final image may be a 2D image, and when both the images acquired through the first camera and the images acquired through the second camera are used, the final image may be a 3D image. Optical data associated with the image acquired through the second camera 330-2 may be provided to the third processor 310-3.

Each of the first camera 330-1 and the second camera 330-2 may correspond to the camera 330 illustrated in FIG. 3. Each of the first camera 330-1 and the second camera 330-2 may be constituted with a plurality of groups or sets of cameras.

The first PMIC 350-1 may be configured to provide power to the first processor 310-1. The second PMIC 350-2 may be configured to provide power to the second processor 310-2. The third PMIC 350-3 may be configured to provide power to the third processor 310-3. Each of the first PMIC 350-1, the second PMIC 350-2, and the third PMIC 350-3 may correspond to the PMIC 350 illustrated in FIG. 3.

In various embodiments, the first processor 310-1 may control the second PMIC 350-2 based on the mode (or the operation mode) of the apparatus. The modes of the apparatus may be changed according to the attribute of an image to be generated. For example, the mode of the apparatus may include a first mode for generating a 2D image, and a second mode for generating a 3D image. The final image may include an omnidirectional image, a panoramic image, and the like. In various embodiments, the mode of the apparatus may be changed based on a user input. For example, the first processor 310-1 may change the mode of the apparatus based on the user input received through the input device 370 illustrated in FIG. 3. In various embodiments, the mode of the apparatus may be changed based on the state of the battery included in the apparatus 300. For example, the first processor 310-1 may change the mode of the apparatus from the second mode to the first mode in response to confirming that the remaining amount of the battery is below the reference value. The reference value may be a fixed value or a changeable value. When the reference value is configured with a changeable value, the reference value may be changed based on a user input or user selection.

When the apparatus 300 operates in the first mode, among the operations of the first camera 330-1 and the second camera 330-2, the operation of the first camera 330-1 may not be required. In other words, when the apparatus 300 operates in the first mode, among the operations of the second processor 310-2 and the third processor 310-3, the operation of the second processor 310-2 may not be required. In various embodiments, the first processor 310-1 may interrupt or restrict power supply to the second processor 310-2 that controls the acquisition of an image through the first camera 330-1 based on the fact that the apparatus 300 operates in the first mode. In order to interrupt the power supply, the first processor 310-1 may send a first control signal to the second PMIC 350-2. The second processor 310-2 for which power supply is interrupted may be switched to a state in which booting is required to start (or resume) the operation. In various embodiments, the first processor 310-1 may control the second PMIC 350-2 such that power lower than normal power is supplied to the second processor 310-2 that controls the acquisition of an image through the first camera 330-1 based on the fact that the apparatus 300 operates in the first mode. The second processor 310-2, which is supplied with the power lower than the normal power may be switched to a state in which booting is not required to start the operation. In other words, the second processor 310-2, which is supplied with power lower than the normal power, may be switched to a sleep state (or a standby state). In various embodiments, the first processor 310-1 may resume power supply (or normal power supply) to the second processor 310-2 that controls the acquisition of an image through the first camera 330-1 based on the fact that the apparatus 300 operates in the second mode. In order to resume the power supply, the first processor 310-1 may send a second control signal to the second PMIC 350-2. When the power is supplied or supplied again, the second processor 310-2 may operate in an activated state in which the second processor 310-2 is capable of controlling the first camera 330-1 or capable of encoding an image acquired through the first camera 330-1.

As described above, in an apparatus 300 according to various embodiments, a processor (e.g., the third processor 310-3), connected to a camera (e.g., the second camera 330-2) for performing a function corresponding to one eye of a person among a plurality of cameras (e.g., the first camera 330-1 and the second camera 330-2) included in a camera pair for performing functions corresponding to the both eyes of the person, may be separated from a processor (e.g., the second processor 310-2), connected to another camera (e.g., the first camera 330-1) for performing a function corresponding to the other eye of the person among the plurality of cameras (e.g., the first camera 330-1 and the second camera 330-2) included in the camera pair for performing the functions corresponding to the functions of the both eyes of the person. Due to this separation, the apparatus 300 according to various embodiments may individually control the states of a plurality of processors (e.g., the second processor 310-2 and the third processor 310-3), depending on the mode of the apparatus 300. Through the individual control of the processors, the apparatus 300 according to various embodiments is capable of reducing power consumption. For example, in the first mode for generating a 2D image, the apparatus 300 according to various embodiments is capable of reducing power consumed for image acquisition by interrupting power provided to the second processor 310-2 or providing power lower than normal power to the second processor 310-2.

Figure 15:
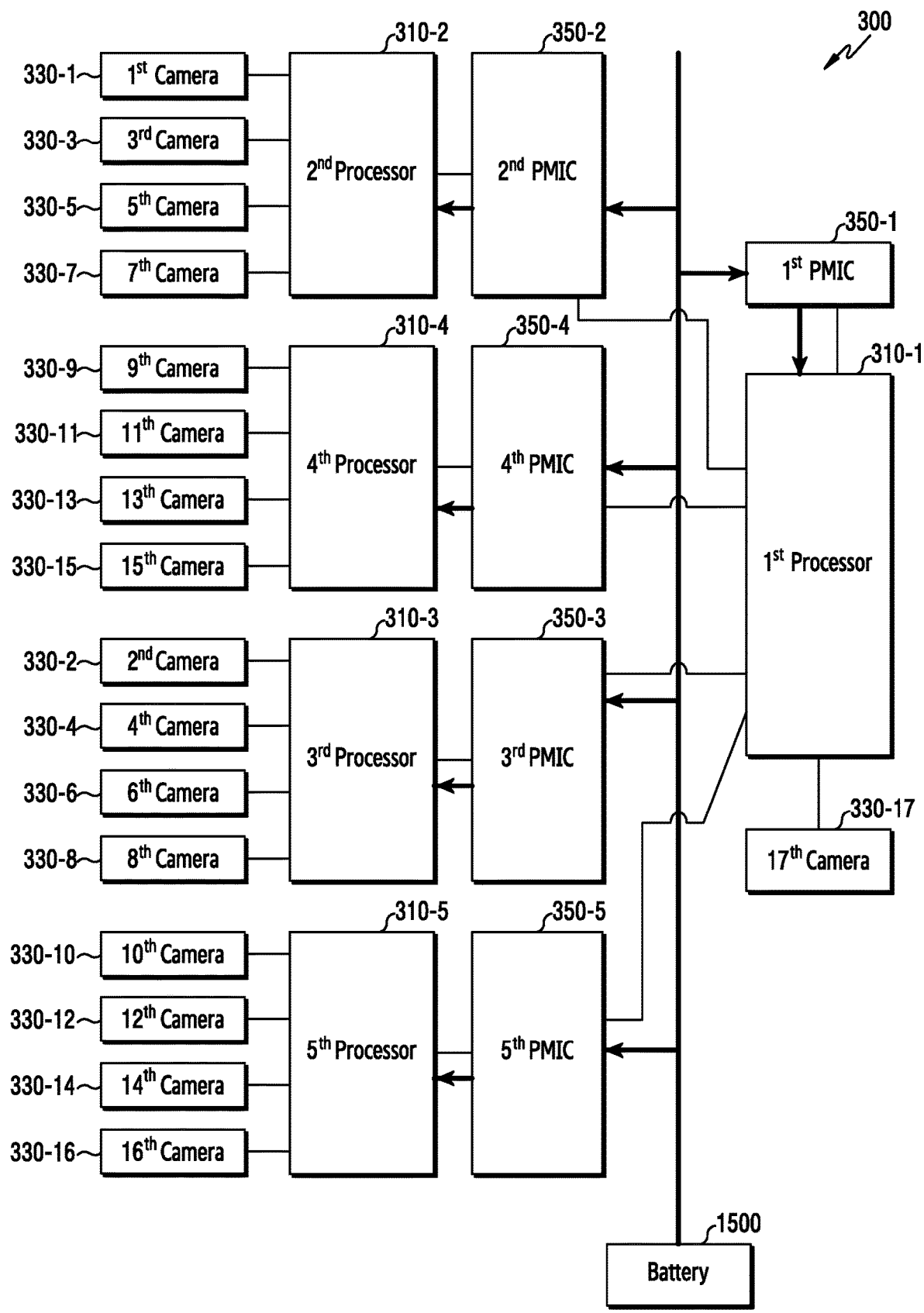
FIG. 15 illustrates an example of another example of a functional configuration of an apparatus for controlling power according to various embodiments.
Figure 16:
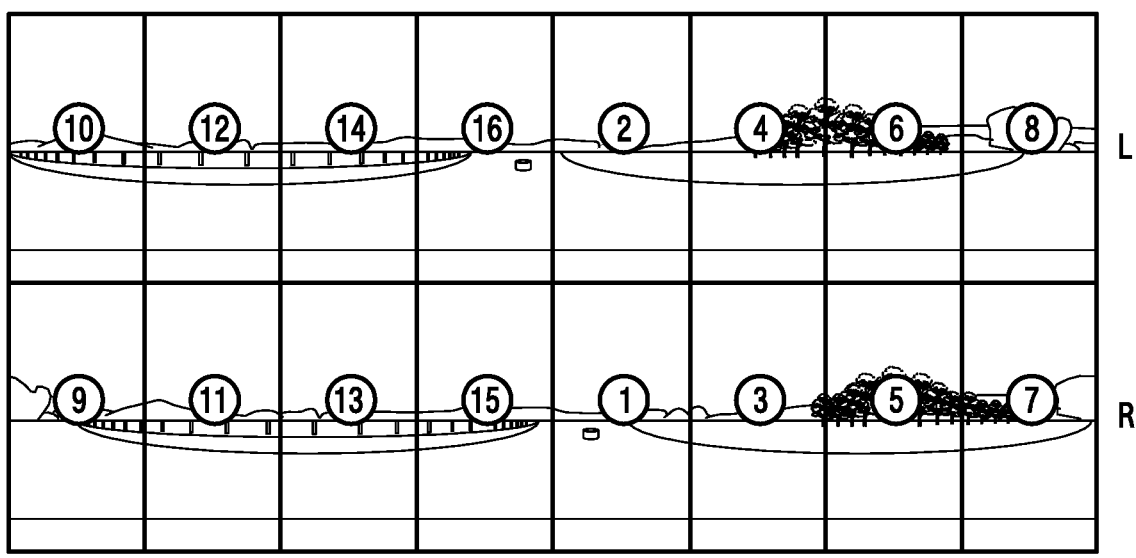
FIG. 16 illustrate an example of a plurality of images acquired by an apparatus according to various embodiments.

FIG. 15 illustrates an example of another example of the functional configuration of an apparatus for controlling power according to various embodiments. This functional configuration may be included in the apparatus 300 illustrated in FIG. 3. FIG. 16 illustrates an example of a plurality of images acquired by an apparatus according to various embodiments.

Referring to FIG. 15, the apparatus 300 may include a plurality of processors (first to fifth processors 310-1 to 310-5), a plurality of cameras (first to seventeenth cameras 330-1 to 330-17), a plurality of PMICs (first to fifth PMICs 350-1 to 350-5), and a battery 1500.

The first processor 310-1 may control the overall operation of the apparatus 300. In various embodiments, the first processor 310-1 may be interlocked with other processors (e.g., the second processor 310-2, the third processor 310-3, the fourth processor 310-4, and the fifth processor 310-5) by being operatively connected to the other processors. For example, the first processor 310-1 may receive encoded data for an image acquired through at least one camera connected to the other processors. In various embodiments, the first processor 310-1 may change the states of the other processors by operatively being connected to PMICs (e.g., the second PMIC 350-2, the third PMIC 350-3, the fourth PMIC 350-4, and the fifth PMIC 350-5) operatively connected to the other processors. As an example, the first processor 310-1 may control a PMIC operatively connected to the other processors so as to interrupt power provided to the other processors. As another example, the first processor 310-1 may control the PMIC operatively connected to the other processors so as to resume power supply to the other processors. In various embodiments, the first processor 310-1 is capable of acquiring an image through the seventeenth camera 330-17 by being operatively connected to the seventeenth camera 330-17. In various embodiments, the first processor 310-1 may be supplied with power from the battery 1500 through the first PMIC 350-1.

Each of the second to fifth processors 310-2 to 310-5 may acquire an image through a plurality of cameras connected to each of the second to fifth processors 310-2 to 310-5. Each of the second to fifth processors 310-2 to 310-5 may generate encoded data for the acquired image. Each of the second to fifth processors 310-2 to 310-5 may be supplied with power from the battery 1500 through each of the second to fifth PMICs 350-2 to 350-5.

The first to fifth processors 310-1 to 310-5 may correspond to the processor 310 illustrated in FIG. 2.

Each of the first camera 330-1, the third camera 330-3, the fifth camera 330-5 and the seventh camera 330-7 may be operatively connected to the second processor 310-2.

The first camera 330-1 may be configured to be oriented in a first direction and may have a first FOV. The first camera 330-1 may perform a function corresponding to the right eye of a person. The first camera 330-1 may be configured to be oriented in a second direction corresponding to the first direction, and may form a first camera pair with the second camera 330-2 having a second FOV, which partially overlaps the first FOV. The second camera 330-2 may perform a function corresponding to the left eye of a person. The second camera 330-2 may be operatively connected to the third processor 310-3 that is distinct from the second processor 310-2.

The third camera 330-3 may be configured to be oriented in a third direction and may have a third FOV. The third camera 330-3 may perform a function corresponding to the right eye of a person. The third camera 330-3 may be configured to be oriented in a fourth direction corresponding to the third direction, and may form a second camera pair with the fourth camera 330-4 having a fourth FOV, which partially overlaps the third FOV. The fourth camera 330-4 may perform a function corresponding to the left eye of a person. The fourth camera 330-4 may be operatively connected to the third processor 310-3 that is distinct from the second processor 310-2.

The fifth camera 330-5 may be configured to be oriented in a fifth direction and may have a fifth FOV. The fifth camera 330-5 may perform a function corresponding to the right eye of a person. The fifth camera 330-5 may be configured to be oriented in a sixth direction corresponding to the fifth direction, and may form a third camera pair with the sixth camera 330-6 having a sixth FOV, which partially overlaps the fifth FOV. The sixth camera 330-6 may perform a function corresponding to the left eye of a person. The sixth camera 330-6 may be operatively connected to the third processor 310-3 that is distinct from the second processor 310-2.

The seventh camera 330-7 may be configured to be oriented in a seventh direction and may have a seventh FOV. The seventh camera 330-7 may perform a function corresponding to the right eye of a person. The seventh camera 330-7 may be configured to be oriented in an eighth direction corresponding to the seventh direction, and may form a fourth camera pair with the eighth camera 330-8 having an eighth FOV, which partially overlaps the seventh FOV. The eighth camera 330-8 may perform a function corresponding to the left eye of a person. The eighth camera 330-8 may be operatively connected to the third processor 310-3 that is distinct from the second processor 310-2.

Each of the ninth camera 330-9, the eleventh camera 330-11, the thirteenth camera 330-13, and the fifth camera 330-15 may be operatively connected to the fourth processor 310-4.

The ninth camera 330-9 may be configured to be oriented in a ninth direction and may have a ninth FOV. The ninth camera 330-9 may perform a function corresponding to the right eye of a person. The ninth camera 330-9 may be configured to be oriented in a tenth direction corresponding to the ninth direction, and may form a fifth camera pair with the tenth camera 330-10 having a tenth FOV, which partially overlaps the ninth FOV. The tenth camera 330-10 may perform a function corresponding to the left eye of a person. The tenth camera 330-10 may be operatively connected to the fifth processor 310-5 that is distinct from the fourth processor 310-4.

The eleventh camera 330-11 may be configured to be oriented in an eleventh direction and may have an eleventh FOV. The eleventh camera 330-11 may perform a function corresponding to the right eye of a person. The eleventh camera 330-11 may be configured to be oriented in a twelfth direction corresponding to the eleventh direction, and may form a sixth camera pair with the twelfth camera 330-12 having a twelfth FOV, which partially overlaps the eleventh FOV. The twelfth camera 330-12 may perform a function corresponding to the left eye of a person. The twelfth camera 330-12 may be operatively connected to the fifth processor 310-5 that is distinct from the fourth processor 310-4.

The thirteenth camera 330-13 may be configured to be oriented in a thirteenth direction and may have a thirteenth FOV. The thirteenth camera 330-13 may perform a function corresponding to the right eye of a person. The thirteenth camera 330-13 may be configured to be oriented in a fourteenth direction corresponding to the thirteenth direction, and may form a seventh camera pair with the fourteenth camera 330-14 having a fourteenth FOV, which partially overlaps the thirteenth FOV. The fourteenth camera 330-14 may perform a function corresponding to the left eye of a person. The fourteenth camera 330-14 may be operatively connected to the fifth processor 310-5 that is distinct from the fourth processor 310-4.

The fifteenth camera 330-15 may be configured to be oriented in a fifteenth direction and may have a fifteenth FOV. The fifteen camera 330-15 may perform a function corresponding to the right eye of a person. The fifteenth camera 330-15 may be configured to be oriented in a sixteenth direction corresponding to the fifteenth direction, and may form an eighteenth camera pair with the sixteenth camera 330-16 having a sixteenth FOV, which partially overlaps the fifteenth FOV. The sixteenth camera 330-16 may perform a function corresponding to the left eye of a person. The sixteenth camera 330-16 may be operatively connected to the fifth processor 310-5 that is distinct from the fourth processor 310-4.

In order to generate an omnidirectional image, the first FOV may partially overlap the third FOV and the fifteenth FOV, the second FOV may partially overlap the fourth FOV and the sixth FOV, the third FOV may partially overlap the first FOV and the fifth FOV, the fourth FOV may partially overlap the second FOV and the sixth FOV, the fifth FOV may partially overlap the third FOV and the seventh FOV, the sixth FOV may partially overlap the fourth FOV and the eighth FOV, the seventh FOV may partially overlap the fifth FOV and the ninth FOV, the eighth FOV may partially overlap the sixth FOV and the tenth FOV, the ninth FOV may partially overlap the seventh FOV and the eleventh FOV, the tenth FOV may partially overlap the eighth FOV and the twelfth FOV, the eleventh FOV may partially overlap the ninth FOV and the thirteenth FOV, the twelfth FOV may partially overlap the tenth FOV and the fourteenth FOV, the thirteenth FOV may partially overlap the eleventh FOV and the fifteenth FOV, the fourteenth FOV may partially overlap the twelfth FOV and the sixteenth FOV, the fifteenth FOV may partially overlap the first FOV and the thirteenth FOV, and the sixteenth FOV may partially overlap the second FOV and the fourteenth FOV.

The seventeenth camera 330-17 may be operatively connected to the first processor 310-1. The seventeenth camera 330-17 may be configured to be oriented in a seventeenth direction and may have a seventeenth FOV. The seventeenth FOV may be substantially perpendicular to the first to sixteenth directions. The seventeenth FOV may partially overlap the first FOV, the second FOV, the third FOV, the fourth FOV, the fifth FOV, the sixth FOV, the seventh FOV, the eighth FOV, the ninth FOV, the tenth FOV, the eleventh FOV, the twelfth FOV, the thirteenth FOV, the fourteenth FOV, the fifteenth FOV, and the sixteenth FOV.

The first camera 330-1 may be used to acquire a first image, the second camera 330-2 may be used to acquire a second image, the third camera 330-3 may be used to acquire a third image, the fourth camera 330-4 may be used to acquire a fourth image, the fifth camera 330-5 may be used to acquire a fifth image, and the sixth camera 330-6 may be used to acquire the sixth image, the seventh camera 330-7 may be used to acquire the seventh image, the eighth camera 330-8 may be used to acquire the eighth image, and the ninth camera 330-9 may be used to acquire the ninth image. The tenth camera 330-10 may be used to acquire a tenth image, the eleventh camera 330-11 may be used to acquire an eleventh image, the twelfth camera 330-12 may be used to acquire a twelfth image, the thirteenth camera 330-13 may be used to acquire a thirteen image, the fourteenth camera 330-14 may be used to acquire a fourteenth image, the fifteenth camera 330-15 may be used to acquire a fifteenth image, and the sixteenth camera 330-16 may be used to acquire a sixteenth image, and the seventeenth camera 330-17 may be used to acquire a seventeenth image.

For example, referring to FIG. 16, the second image, the fourth image, the sixth image, the eighth image, the tenth image, the twelfth image, the fourteenth image, and the sixteenth image may include a scene corresponding to the left eye of a person, and the first image, the third image, the fifth image, the seventh image, the ninth image, the eleventh image, the thirteenth image, and the fifteenth image may include a scene corresponding to the right eye of a person. The second image, the fourth image, the sixth image, the eighth image, the tenth image, the twelfth image, the fourteenth image, and the sixteenth image may be combined with the first image, the third image, the fifth image, the seventh image, the ninth image, the eleventh image, the thirteenth image, and the fifteenth image in order to generate a 3D omnidirectional image. Although not illustrated in FIG. 16, the seventeenth image may be used to supplement the first to sixteenth images.

As another example, the second image, the fourth image, the sixth image, the eighth image, the tenth image, the twelfth image, the fourteenth image, and the sixteenth image may be combined with each other in order to produce a 2D omnidirectional image. Although not illustrated in FIG. 16, the seventeenth image may be combined with the second image, the fourth image, the sixth image, the eighth image, the tenth image, the twelfth image, the fourteenth image, and the sixteenth image in order to generate the 2D omnidirectional image.

As another example, the first image, the third image, the fifth image, the seventh image, the ninth image, the eleventh image, the thirteenth image, and the fifteenth image may be combined with each other in order to generate another 2D omnidirectional image. Although not illustrated in FIG. 16, the seventeenth image may be combined with the first image, the third image, the fifth image, the seventh image, the ninth image, the eleventh image, the thirteenth image, and the fifteenth image in order to generate the other 2D omnidirectional image.

As another example, the second image, the fourth image, the sixth image, and the eighth image (or the tenth image, the twelfth image, the fourteenth image, and the sixteenth image) may be combined with each other in order to generate a 2D panoramic image (i.e., a 180-degree image). Although not illustrated in FIG. 16, the seventeenth image may be combined with the second image, the fourth image, the sixth image, and the eighth image (or the tenth image, the twelfth image, the fourteenth image, and the sixteenth image) in order to generate the 2D panoramic image.

As another example, the first image, the third image, the fifth image, and the seventh image (or the ninth image, the eleventh image, the thirteenth image, and the fifteenth image) may be combined with each other in order to generate another 2D omnidirectional image. Although not illustrated in FIG. 16, the seventeenth image may be combined with the first image, the third image, the fifth image, and the seventh image (or the ninth image, the eleventh image, the thirteenth image, and the fifteenth image) in order to generate the other 2D panoramic image.

Each of the first to fifth PMICs 350-1 to 350-5 may be used to provide power to each of the first to fifth processors 310-1 to 310-5.

Each of the second to fifth PMICs 350-2 to 350-5 may control power provided to each of the second to fifth processors 310-2 to 310-3 based on a control signal transmitted from the first processor 310-1.

The battery 1500 may be charged through a power supply connected to the apparatus 300. In other words, the battery 1500 may be configured to be chargeable. The battery 1500 may provide power to the first to fifth PMICs 350-1 to PMIC 350-5 each operatively connected to the battery 1500. In various embodiments, the battery 1500 may be configured to be removable from the apparatus 300.

In various embodiments, the first processor 310-1 may identified the mode of the apparatus 300. The mode of the apparatus 300 may be changed according to the user's input, or may be changed according to the state of the battery 1500. The first processor 310-1 may change the state associated with the power of the first processor 310-1 and at least one of the other processors based on the identified mode of the apparatus.

As an example, in response to determining that the mode of the apparatus 300 is a mode for generating a 2D omnidirectional image, the first processor 310-1 may control the 2PMIC 350-2 and the fourth PMIC 350-4 to interrupt each of the power supplied to the second processor 310-2 and the power supplied to the fourth processor 350-4. In response to determining that the mode of the apparatus 300 is a mode for generating the 2D omnidirectional image, the first processor 310-1 may transmit a first control signal to each of the second PMIC 350-2 and the fourth PMIC 350-4 so as to interrupt each of the power supplied to the second processor 310-2 and the power supplied to the fourth processor 310-4. As illustrated in FIG. 16, since acquisition of the first image, the third image, the fifth image, the seventh image, the ninth image, the eleventh image, the thirteenth image, and the fifteenth image may not be required in order to generate the 2D omnidirectional image, the first processor 310-1 may interrupt the power provided to the second processor 310-2 and the fourth processor 310-4. Through this interruption, the apparatus 300 is capable reducing the power required for the generation of the 2D omnidirectional image.

As another example, in response to determining that the mode of the apparatus 300 is a mode for generating a 2D panoramic image, the first processor 310-1 may control each of the 2PMIC 350-2, the fourth PMIC 350-4, the fifth PMIC 350-5 to interrupt each of the power supplied to the second processor 310-2, the power supplied to the fourth processor 350-4, and the power supplied to the fifth PMIC 350-5. In response to determining that the mode of the apparatus 300 is a mode for generating the 2D panoramic image, the first processor 310-1 may transmit the first control signal to each of the second PMIC 350-2, the fourth PMIC 350-4, and the fifth PMIC 350-5 so as to interrupt each of the power supplied to the second processor 310-2, the power supplied to the fourth processor 310-4, and the power supplied to the fifth processor 310-5. As illustrated in FIG. 16, since acquisition of the first image, the third image, the fifth image, the seventh image, the ninth image, the tenth image, the eleventh image, the twelfth image, the thirteenth image, the fourteenth image, the fifteenth image, and the sixteenth image may not be required in order to generate the 2D panoramic image, the first processor 310-1 may interrupt the power provided to the second processor 310-2, the fourth processor 310-4, and the fifth processor 310-5. Through this interruption, the apparatus 300 is capable reducing the power required for the generation of the 2D panoramic image.

As another example, in response to determining that the mode of the apparatus 300 is a mode for generating a 3D omnidirectional image, the first processor 310-1 may control a PMIC connected to other processors (e.g., the second processor 310-2, the fourth processor 310-4, or the fifth processor 310-5) so as to resume power supply to the other processors to which power supply is interrupted (or ceased). In response to determining that the mode of the apparatus 300 is a mode for generating the 3D omnidirectional image, the first processor 310-1 may transmit a second control signal to the PMIC connected to the other processor where power supply is interrupted so as to resume power supply to the other processor. Through the resumption of power supply, the apparatus 300 is capable of acquiring a plurality of images for generation of a 3D omnidirectional image.

As described above, the apparatus 300 according to various embodiments is capable of reducing power consumed for acquiring a plurality of images by separating a processor coupled to a camera performing a function corresponding to one eye of a person from a processor coupled to a camera performing a function corresponding to the other eye of the person.

Figure 17:
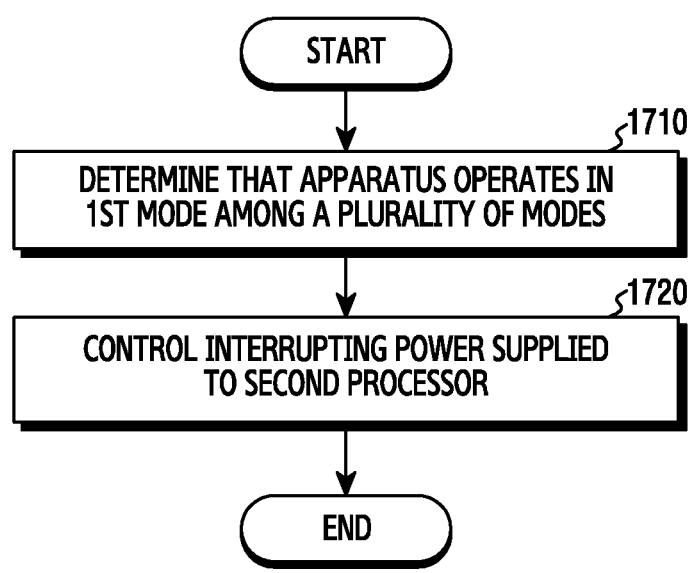
FIG. 17 illustrates an example of an operation of an apparatus that controls power according to various embodiments.

FIG. 17 illustrates an example of an operation of an apparatus that controls power according to various embodiments. This operation may be performed by any of the apparatus 300 illustrated in FIG. 3, the apparatus 300 illustrated in FIG. 14, the apparatus 300 illustrated in FIG. 15, or a component of the apparatus 300 (e.g., the processor 310 of FIG. 3), the first processor 310-1 of FIG. 14, or the first processor 310-1 of FIG. 15.

Referring to FIG. 17, at operation 1710, the first processor 310-1 may determine that the apparatus 300 operates in the first mode among a plurality of modes. The first processor 310-1 may determine that the apparatus 300 operates in the first mode among the plurality of modes in order to reduce the power consumed for acquiring images. The plurality of modes may include a mode for acquiring a plurality of images for generating a 2D omnidirectional image, a mode for acquiring a plurality of images for generating a 3D omnidirectional image, a mode for acquiring a plurality of images generating a 2D panoramic image, and/or a mode for acquiring a plurality of images for generating a 3D panoramic image. The first mode may be a mode in which acquisition of some of the images that can be acquired by the apparatus 300 is not required. For example, the first mode may be a mode for acquiring a plurality of images for generating a 2D omnidirectional image, a mode for acquiring a plurality of images for generating a 2D panoramic image, and/or a mode for acquiring a plurality of images for generating a 3D panoramic image.

In various embodiments, the first processor 310-1 may determine that the apparatus 300 operates in the first mode by monitoring whether a user input is detected through an input device 370 of the apparatus 300, or monitoring whether the state of the battery of the apparatus 300 is the designated state.

In operation 1720, the first processor 310-1 may control the interruption of power supply to the second processor 310-2. The second processor 310-2 may be a processor operatively connected to at least one camera, which is not used in the first mode (i.e., at least one camera for which acquisition of an image is not required). In the first mode, since the second processor 310-2 is not required to control at least one camera connected to the second processor 310-2 in order to acquire an image, the second processor 310-2 may be a processor that does not require power supply. The second processor 310-2 where power supply is interrupted may be booted for reactivation. Alternatively, the first processor 310-1 may reduce power supplied to the second processor 310-2 in response to determining that the apparatus 300 operates in the first mode. For example, in response to determining that the apparatus 300 operates in the first mode, the first processor 310-1 may supply power lower than normal power to the second processor 310-2. The first processor 310-1 may supply the second processor 310-2 with power lower than the normal power such that the second processor 310-2 does not perform booting again even if the second processor 310-2 is reactivated. In the apparatus 300 according to various embodiments, when a fast response rate (i.e., fast state transition) of the second processor 310-2 is required, the first processor 310-1 may supply the second processor 310-2 with power lower than the normal power without interrupting power supply to the second processor 310-2.

Figure 18:
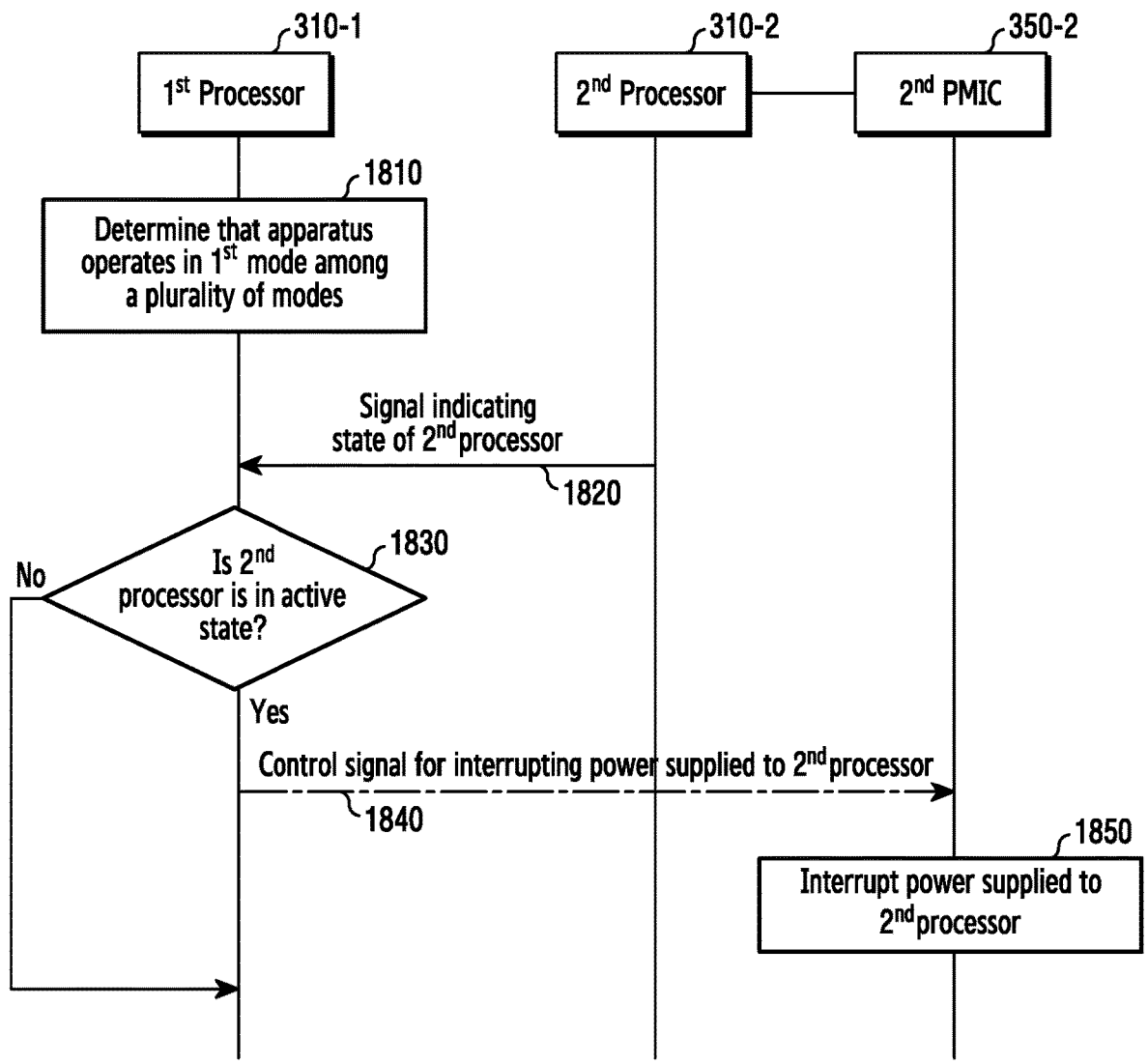
FIG. 18 illustrates an example of signal flow in an apparatus that controls power according to various embodiments.

FIG. 18 illustrates an example of signal flow in an apparatus that controls power according to various embodiments. This signal flow may be caused in the apparatus 300 illustrated in FIG. 3, the apparatus 300 illustrated in FIG. 14, and the apparatus 300 illustrated in FIG. 15.

Referring to FIG. 18, in operation 1810, the first processor 310-1 may determine that the apparatus 300 operates in the first mode among a plurality of modes. The first processor 310-1 may determine that the apparatus 300 operates in a first image-capturing mode in which use of at least one processor or camera is not required, among a plurality of image-capturing modes that can be provided by the apparatus 300. The at least one processor may include a second processor 310-2.

In operation 1820, the first processor 310-1 may receive a signal indicating the state of the second processor 310-2 from the second processor 310-2. The first processor 310-1 may receive a signal indicating the state of the second processor 310-2 from the second processor 310-2 based on a first communication method. In various embodiments, a signal indicating the state of the second processor 310-2 may be transmitted from the second processor 310-2 in response to a request from the first processor 310-1. In various embodiments, a signal indicating the state of the second processor 310-2 may be transmitted from the second processor 310-2 based on a designated period. For example, a signal indicating the state of the second processor 310-2 may be transmitted from the second processor 310-2 every designated period when normal power is supplied to the second processor 310-2 or power lower than the normal power is supplied to the second processor 310-2. The signal indicating the state of the second processor 310-2 may be used to indicate whether or not power is being supplied to the second processor 310-2. The first communication method may be associated with General-Purpose Input/Output (GPIO). Unlike the illustration of FIG. 18, when the second processor 310-2 is in the state in which no power is supplied thereto, the first processor 310-1 may determine that no power is supplied to the second processor 310-2 by not receiving the signal indicating the state of the second processor 310-2.

In operation 1830, the first processor 310-1 may determine whether the second processor 310-2 is in the active state. The first processor 310-1 may determine whether the second processor 310-2 is in the active state based on the signal indicating the state of the second processor 310-2, which is received from the second processor 310-2. When it is determined that the second processor 310-2 is not in the active state (e.g., when the second processor 310-2 is in the state in which power lower than the normal power is supplied thereto, or in the state in which power supply to the second processor 310-2 is interrupted), the first processor 310-1 may maintain the state of the second processor 310-2. Unlike this, when it is determined that the second processor 310-2 is in the active state, the first processor 310-1 may perform operation 1840.

In operation 1840, when it is determined that the second processor 310-2 is in the active state, the first processor 310-1 may transmit a control signal for interrupting the power supplied to the second processor 310-2 to the second PMIC 350-2 operatively coupled to the second processor 310-2. In response to determining that the second processor 310-2 is in the active state, the first processor 310-1 may transmit the control signal for interrupting the power supplied to the second processor 310-2 using a second communication method. The second communication method may be associated with a Serial Peripheral Interface (SPI).

The second PMIC 350-2 may receive the control signal for interrupting power supplied to the second processor 310-2 from the first processor 310-1 through the second communication method.

In operation 1850, the second PMIC 350-2 may interrupt the power supplied to the second processor 310-2 in response to receiving the control signal. The second PMIC 350-2 may interrupt the power supplied to the second processor 310-2 in order to reduce the power unnecessarily consumed due to the operation of the second processor 310-2.

FIG. 18 illustrates the case in which the power supply to the second processor 310-2 is interrupted (or ceased) in response to determining that the apparatus 300 is operating in the first mode, but this is merely an example for illustration. In various embodiments, in response to determining that the apparatus 300 operates in the first mode, the first processor 310-1 may transmit, to the second PMIC 350-2, the control signal for reducing power supplied to the second processor 310-2. The second PMIC 350-2, which receives the control signal for reducing the power supplied to the second processor 310-2, may supply the second processor 310-2 with power lower than the normal power.

As described above, in the apparatus 300 according to various embodiments, the first processor 310-1 is capable of reducing the consumption of power consumed for image acquisition through signaling with another processor (e.g., the second processor 310-2) or a PMIC (e.g., the second PMIC 350-2) connected to the other processor.

Figure 19:
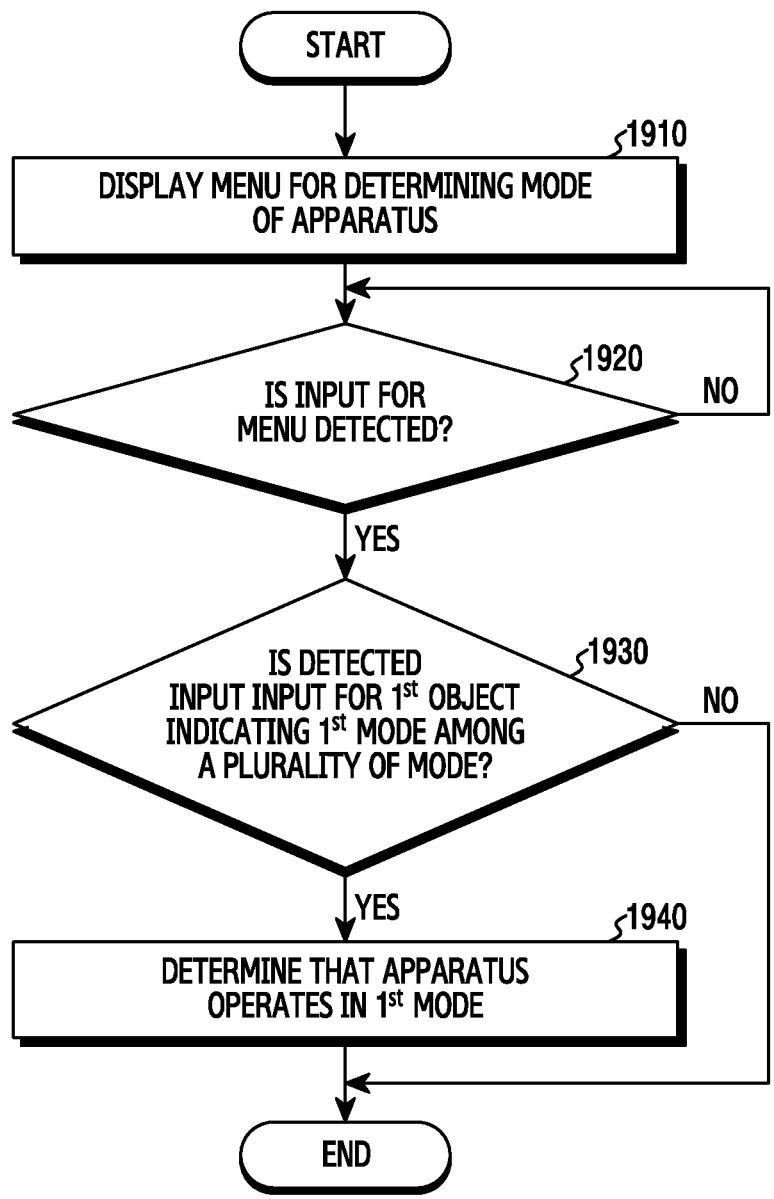
FIG. 19 illustrates an example of a mode control operation of an apparatus that controls power according to various embodiments.

FIG. 19 illustrates an example of a mode control operation of an apparatus that controls power according to various embodiments. This operation may be performed by any of the apparatus 300 illustrated in FIG. 3, the apparatus 300 illustrated in FIG. 14, the apparatus 300 illustrated in FIG. 15, or a component of the apparatus 300 (e.g., the processor 310 of FIG. 3), the first processor 310-1 of FIG. 14, or the first processor 310-1 of FIG. 15).

Figure 20:
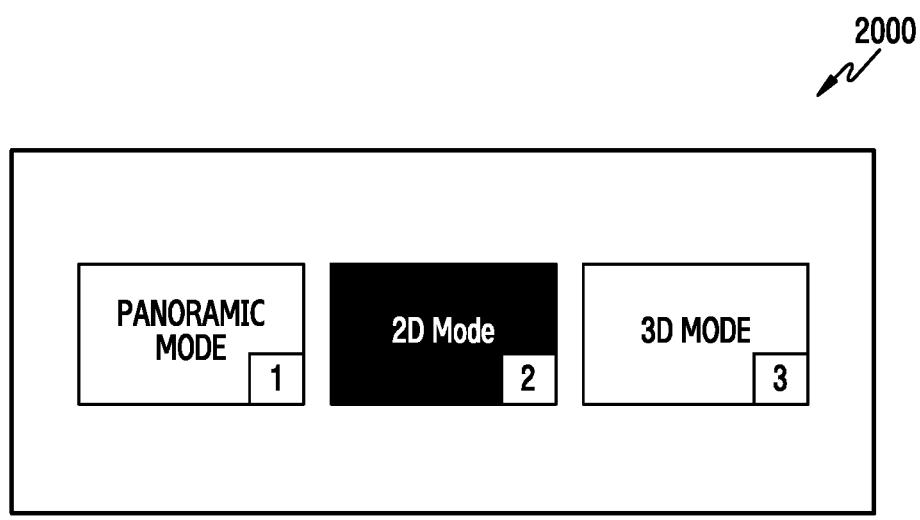
FIG. 20 illustrates an example of a User Interface (UI) displayed in an apparatus according to various embodiments.

FIG. 20 illustrates an example of a User Interface (UI) displayed in an apparatus according to various embodiments.

Operations 1910 to 1940 of FIG. 19 may be associated with operation 1710 of FIG. 17.

Referring to FIG. 19, in operation 1910, the first processor 310-1 may display a menu for determining the mode of the apparatus 300. For example, referring to FIG. 20, the first processor 310-1 may display a UI 2000 including the menu through the display 390 illustrated in FIG. 3. The menu may include a plurality of modes available in the apparatus 300. For example, the menu may include a panoramic mode for acquiring a panoramic image, a 2D mode for acquiring a 2D image, and a 3D mode for acquiring a 3D image.

The menu may be displayed based on various conditions. For example, the first processor 310-1 may display the menu based on a user's operation for displaying the menu. As another example, the first processor 310-1 may display the menu based on booting of the apparatus 300.

In various embodiments, unlike the illustration of FIG. 19, the processor 310-1 may display the menu through a display (e.g., the display device 160) of an electronic device connected to apparatus 300. To this end, the first processor 310-1 may transmit information for displaying the menu to the electronic device 101 through the communication interface 340 illustrated in FIG. 3. The electronic device 101 may display the menu via an application for the apparatus (e.g., an application for remotely controlling the apparatus 300), based on the information received from the apparatus 300.

In operation 1920, the first processor 310-1 may determine whether an input for the displayed menu is detected. When detecting the input for the displayed menu, the first processor 310-1 may perform operation 1930. Unlike this, when the input for the displayed menu is not detected, the first processor 310-1 may monitor whether the input is detected while continuously displaying the menu.

In various embodiments, the first processor 310-1 may drive a timer in response to the displaying of the menu. The timer can be used to limit the time for which the menu is displayed. For example, when an input for the displayed menu is not detected until the timer expires, the first processor 310-1 may control the apparatus 300 to operate in a default mode. The length of the timer may have a fixed value or a variable value. For example, the length of the timer may be changed depending on the remaining amount of the battery of the apparatus 300. As another example, the length of the timer may be changed depending on the setting of the user.

Unlike the illustration of FIG. 19, when the menu is displayed on the electronic device 101, the first processor 310-1 may receive information on the input for the menu from the electronic device 101.

In operation 1930, in response to detecting the input for the menu, the first processor 310-1 may determine whether the detected input is an input for a first object representing the first mode among the plurality of modes. The first mode may be a mode in which driving of at least one of the plurality of processors included in the apparatus 300 is not required. The first mode may be a mode requiring a lower power consumption than at least one other mode in the plurality of modes. The first mode may be the second mode or the panoramic mode. For example, referring to FIG. 20, the processor 310-1 may determine whether the detected input is an input for an object representing the panoramic mode or an object representing a 2D mode. When it is determined that the detected input is an input for the first object that represents the first mode among the plurality of modes, the first processor 310-1 may perform operation 1940. Unlike this, when it is determined that the detected input is not an input for the object representing the first mode among the plurality of modes, the first processor 310-1 may terminate the algorithm.

In operation 1940, the first processor 310-1 may determine that the apparatus 300 operates in the first mode. The first processor 310-1 may perform an operation for changing the power state of the processor connected to at least one camera that does not acquire an image in the first mode, based on determining that the apparatus 300 operates in the first mode.

As described above, in the apparatus 300 according to various embodiments, the first processor 310-1 may determine the mode of the apparatus 300 according to the user's input, and may reduce the power consumed for acquisition of an image in the apparatus 300, based on the determined mode.

Figure 21:
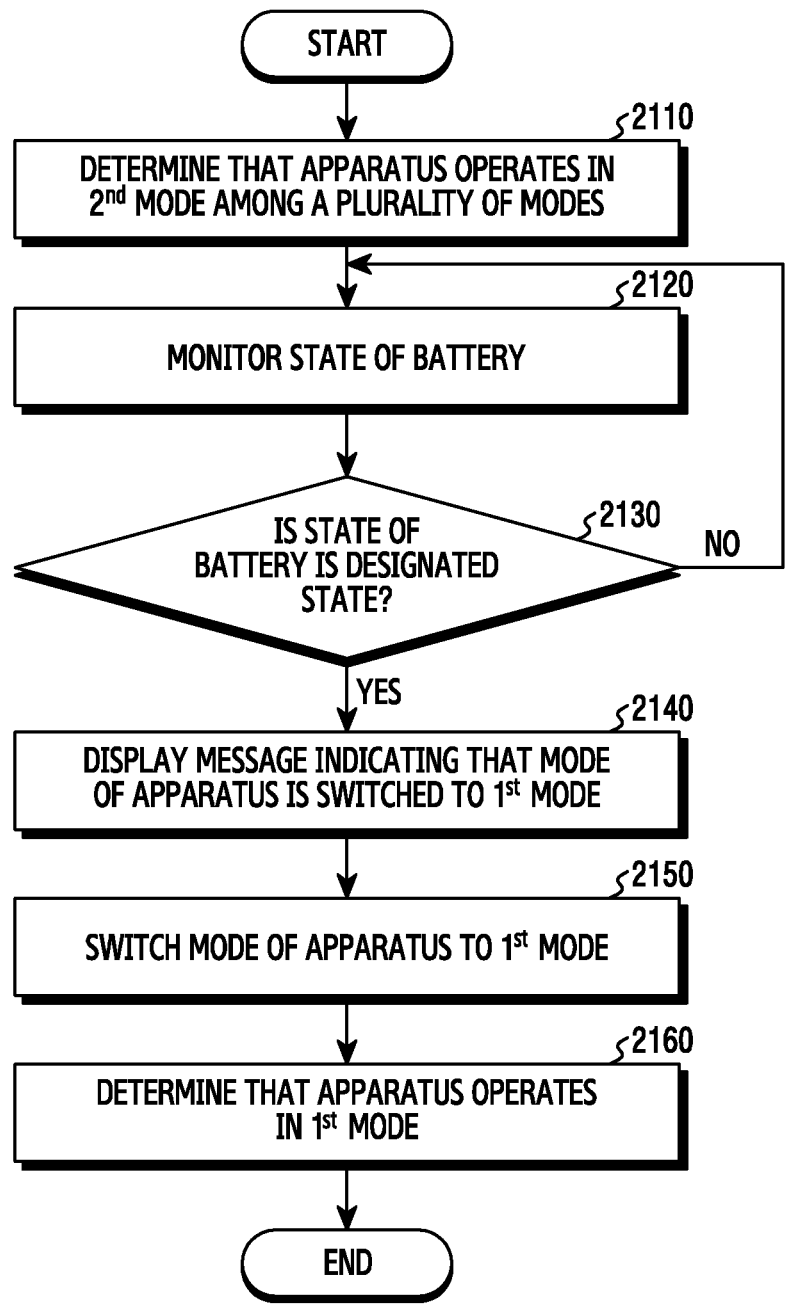
FIG. 21 illustrates another example of a mode control operation of an apparatus that controls power according to various embodiments.

FIG. 21 illustrates another example of the mode control operation of an apparatus that controls power according to various embodiments. This operation may be performed by any of the apparatus 300 illustrated in FIG. 3, the apparatus 300 illustrated in FIG. 14, the apparatus 300 illustrated in FIG. 15, or a component of the apparatus 300 (e.g., the processor 310 of FIG. 3, the first processor 310-1 of FIG. 14, or the first processor 310-1 of FIG. 15).

Figure 22:
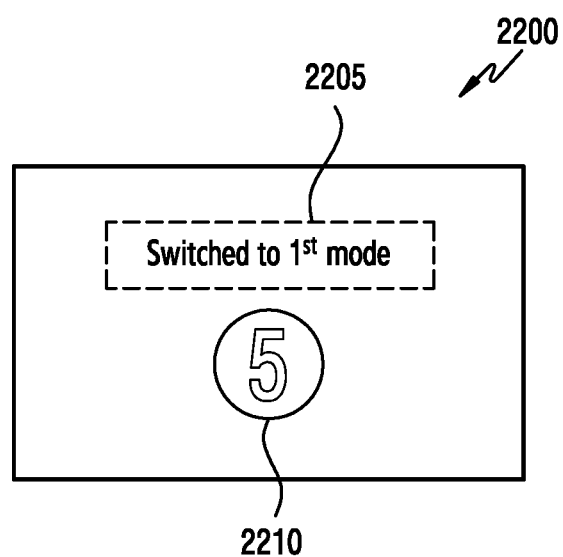
FIG. 22 illustrates another example of a UI displayed in an apparatus according to various embodiments.

FIG. 22 illustrates another example of a UI displayed in an apparatus according to various embodiments.

Operations 2110 to 2160 of FIG. 21 may be associated with operation 1710 of FIG. 17.

Referring to FIG. 21, in operation 2110, the first processor 310-1 may determine that the apparatus 300 operates in the second mode among a plurality of modes. The second mode may be a mode in which all of the plurality of cameras included in the apparatus 300 are used. For example, the second mode may be a mode for generating a 3D omnidirectional image. The second mode may be a mode consuming more power than at least one mode other than the second mode in the plurality of modes.

In operation 2120, the first processor 310-1 may monitor the state of the battery 1500. For example, the first processor 310-1 may monitor the state of the battery 1500 in order to determine power consumption according to the second mode.

In operation 2130, the first processor 310-1 may determine whether the state of the monitored battery 1500 is a designated state. The designated state may be associated with the power state of the battery 1500. For example, the designated state may include a state where the remaining amount of the battery 1500 is less than the reference value. When the remaining amount of the battery 1500 is less than the reference value, the first processor 310-1 may determine the remaining usage time of the apparatus 300, which is determined based on the remaining amount of the battery 1500, and a time for which the apparatus 300 is to be used to acquire a plurality of images (i.e., a predicted use time). The first processor 310-1 may determine whether to switch to the first mode based on the determined relationship. As another example, the designated state may include a state where the decrease rate of the power of the battery 1500 is equal to or higher than a designated rate. When the state of the battery 1500 is not the designated state, the first processor 310-1 may continuously monitor the state of the battery 1500. Unlike this, when the state of the battery 1500 is the designated state, the first processor 310-1 may perform operation 2140.

In operation 2140, in response to determining that the state of the battery 1500 is the designated state, the first processor 310-1 may display a message indicating that the mode of the apparatus 300 is switched to the first mode. The first mode is a mode in which power lower than that of the second mode is consumed, and cameras, the number of which is smaller than the number of cameras (or processors) used in the second mode (or smaller than the number of processors used in the second mode), are used. For example, referring to FIG. 22, the first processor 310-1 may display a UI 2200 including a message indicating that the mode of the apparatus 300 is switched to the first mode in order to reduce power consumption. The UI 2200 may include a text 2205 indicating that the mode is switched to the first mode. The UI 2200 may include a timer 2210 indicating a time remaining until being switched to the first mode. The timer 2210 may be driven on the condition that it is determined that the state of the battery 1500 is the designated state. The length of the timer 2210 may be configured with a fixed value. The length of the timer 2210 may be changed depending on the user's setting or the state of the battery.

In operation 2150, the first processor 310-1 may switch the mode of the apparatus 300 to the first mode. The first processor 310-1 may switch the mode of the apparatus 300 to the first mode based on determining that the state of the battery 1500 is the designated state. In various embodiments, the first processor 310-1 may switch the mode of the apparatus 300 to the first mode in response to determining that the state of the battery 1500 is the designated state. The UI 2200 may not include the timer 2210. Operation 2140 and operation 2150 may be performed simultaneously or in reverse order.

In operation 2160, the first processor 310-1 may determine that the apparatus 300 operates in the first mode by switching the mode of the apparatus 300 to the first mode.

As described above, in the apparatus 300 according to various embodiments, the first processor 310-1 is capable of reducing power consumed in the apparatus by switching the mode of the apparatus to a mode in which power consumption can be adaptively reduced according to the state of the battery.

Figure 23:
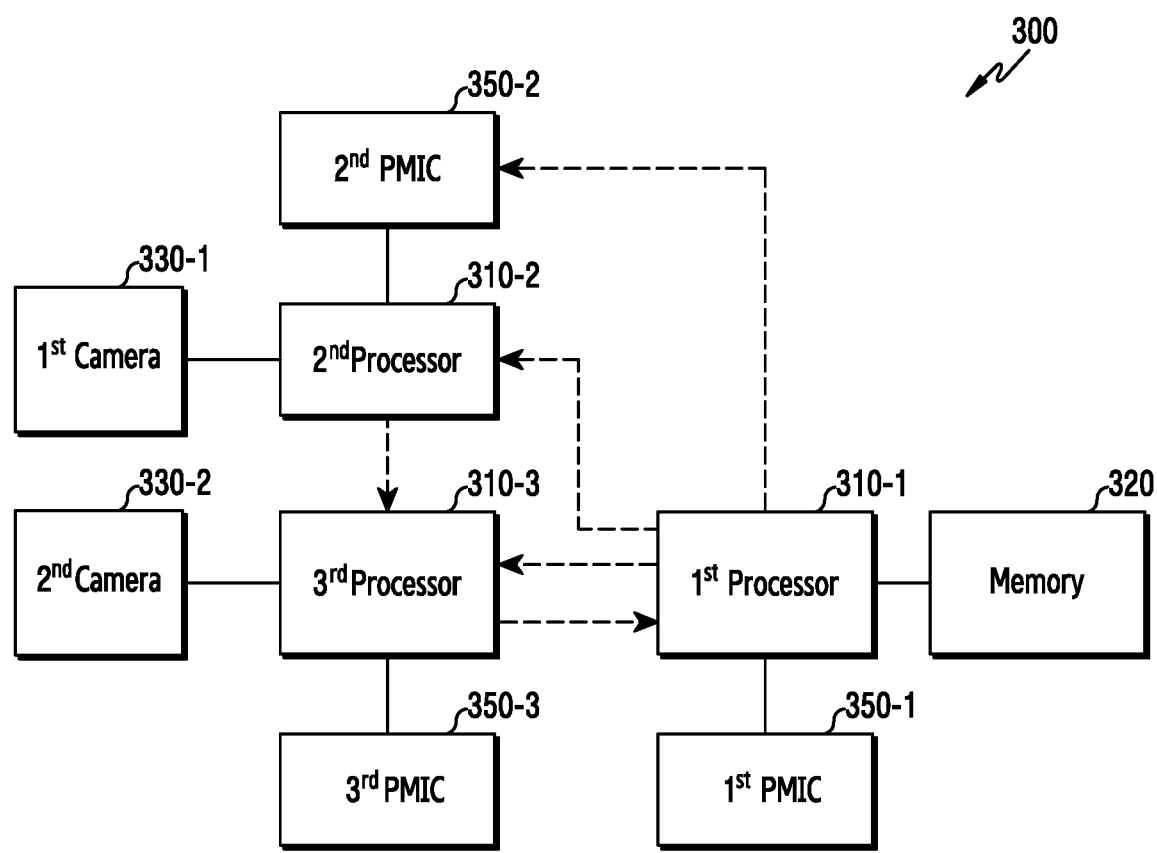
FIG. 23 illustrates an example of a functional configuration of an apparatus that controls image processing according to various embodiments.

FIG. 23 illustrates an example of the functional configuration of an apparatus that controls image processing according to various embodiments. This functional configuration may be included in the apparatus 300 illustrated in FIG. 3.

Referring to FIG. 23, the apparatus 300 may include a first processor 310-1, a second processor 310-2, a third processor 310-3, a memory 320, a first camera 330-1, a second camera 330-2, a first PMIC 350-1, a second PMIC 350-2, and a third PMIC 350-3.

The first processor 310-1 may request other processors (e.g., the second processor 310-2 and the third processor 310-3) of the apparatus 300, which are operatively connected to cameras, to capture (or acquire) an image or may request encoded data of a captured image from the other processors. The first processor 310-1 may request first encoded data for an image acquired through the first camera 330-1 from the second processor 310-2 operatively connected to the first camera 330-1. The first processor 310-1 may request second encoded data for an image acquired through the second camera 330-2 from the third processor 310-3 operatively connected to the second camera 330-2. The first encoded data and the second encoded data are usable to generate a final image. Each of the first encoded data and the second encoded data may be independently decodable.

The first processor 310-1 may determine the mode of the apparatus 300. The mode of the apparatus 300 may include at least one of a mode for generating a 2D omnidirectional image, a mode for generating a 2D panoramic image, a mode for generating a 3D panoramic image, or a mode for generating an 3D omnidirectional image. The mode of the apparatus 300 may include a mode using all the cameras of the apparatus 300 and a mode using some of the cameras of the apparatus 300. The first processor 310-1 may determine the mode of the apparatus 300 in order to determine the processor from which encoded data will be requested. For example, when the apparatus 300 operates in a mode using the second camera 330-2 without using the first camera 330-1 in order to acquire an image, the first processor 310-1 may request encoded data only from the third processor 310-3. The first processor 310-1 is capable of reducing the calculation amount of the second processor 310-2 by not requesting the encoded data from the second processor 310-2. In addition, in order to reduce the power consumed by the second processor 310-2, the first processor 310-1 may transmit a signal for interrupting the power supplied to the second processor 310-2 (or a signal for reducing the power supplied to the second processor 310-2) to the second PMIC 350-2. As another example, when the apparatus 300 operates in a mode using the first camera 330-1 and the second camera 330-2 in order to acquire an image, the first processor 310-1 may request encoded data from each of the second processor 310-2 and the third processor 310-3.

The first processor 310-1 may correspond to the processor 310 of the apparatus 300 illustrated in FIG. 3.

The second processor 310-2 may receive a request for encoded data from the first processor 310-1. The request for the encoded data may be received from the first processor 310-1 in response to determining that the mode of the apparatus 300 is a mode in which it is required that an image is acquired through the first camera 310-1.

In response to the request, the second processor 310-2 may acquire the image through the first camera 330-1 operatively connected to the second processor 310-2. The second processor 310-2 may encode the acquired image. The second processor 310-2 may generate first encoded data by encoding the acquired image. The first encoded data may be independently decodable. The first encoded data may be configured to be decodable independently without a combination with other encoded data (e.g., a combination with second encoded data generated by the third processor 310-3).

The second processor 310-2 may provide the first encoded data to the third processor 310-3.

The second processor 310-2 may correspond to the processor 310 of the apparatus 300 illustrated in FIG. 3.

The third processor 310-3 may receive a request for encoded data from the first processor 310-1. In various embodiments, the request for the encoded data may be received from the first processor 310-1, regardless of the mode of the apparatus 300 when image acquisition is desired. In other words, since the second camera 330-2 operatively connected to the third processor 310-3 is a camera that is always used regardless of the mode of the apparatus 300, the request for the encoded data may be received from the first processor 310-1 regardless of the mode of the apparatus 300 when an event for acquiring an image occurs in the apparatus 300.

In response to the request, the third processor 310-3 may acquire the image through the second camera 330-2 operatively connected to the third processor 310-3. The third processor 310-3 may encode the acquired image. The third processor 310-3 may generate second encoded data by encoding the acquired image. The second encoded data may be independently decodable. The second encoded data may be configured to be decodable independently without a combination with other encoded data (e.g., a combination with the first encoded data generated by the second processor 310-2).

The third processor 310-3 may provide the second encoded data to the first processor 310-1. In various embodiments, when receiving the first encoded data from the second processor 310-2, the third processor 310-3 may transmit the second encoded data, together with the first encoded data, to the first processor 310-1. The first encoded data and the second encoded data provided to the first processor 310-1 may be independent from each other. In other words, the third processor 310-3 may provide the first encoded data and the second encoded data to the first processor 310-1 as separate data.

The third processor 310-3 may correspond to the processor 310 of the apparatus 300 illustrated in FIG. 2.

The first processor 310-1 may receive only the second encoded data from the third processor 310-3 when the apparatus 300 operates in a mode in which it is not required that an image is acquired through the first camera. Unlike this, when the apparatus 300 is operating in a mode in which it is required that an image is acquired through the first camera, it is possible to receive the first encoded data and the second encoded data from the third processor 310-3.

The first processor 310-1 may process the received encoded data.

In various embodiments, the first processor 310-1 may store the received encoded data (e.g., the first encoded data and/or the second encoded data) as one data set. For example, when the apparatus 300 operates in a mode in which it is not required that an image is acquired through the first camera, the first processor 310-1 may store only the received second encoded data as one data set. In another example, when the apparatus 300 operates in a mode in which it is required that an image is acquired through the first camera, the first processor 310-1 may store both of the received first encoded data and the received second encoded data as one data set. The one data set may be a data processing unit for generating a final image (e.g., a 2D omnidirectional image, a 3D omnidirectional image, a 2D panoramic image, or a 3D panoramic 3D image). The encoded data contained in the one data set may be independently decodable, regardless of other encoded data contained in the one data set. The first processor 310-1 may store the one data set in the memory 320. For example, the first processor 310-1 may store the one data set in the memory 320 in order to generate a final image based on the one data set in another apparatus (e.g., the electronic device 101 illustrated in FIG. 1). For example, the first processor 310-1 may store the one data set in the memory 320 in order to generate a final image based on the one data set in the apparatus 300.

In various embodiments, the first processor 310-1 may transmit the received encoded data to another apparatus (e.g., the electronic device 101) as one data set. The first processor 310-1 may transmit the one data set to the other apparatus in order to generate the final image based on the one data set in the other apparatus. The encoded data in the one data set transmitted to the other apparatus may be independently decodable in the other apparatus. For example, when the first encoded data and the second encoded data are included in the one data set, the other apparatus, which has received the one data set, may determine the first encoded data from the one data set, and may decode the first encoded data regardless of whether the second encoded data is decoded or not, thereby generating at least one image. The other apparatus, which has received the one data set, may determine the second encoded data from the one data set, and may decode the second encoded data regardless of whether the first encoded data is decoded or not, thereby generating one image.

According to various embodiments, the apparatus 300 may transmit the one data set to another apparatus. The other apparatus may receive the one data set. The other apparatus may decode at least a part of data included in the one data set. For example, in order to generate a 2D omnidirectional image, the other apparatus may decode the first encoded data to generate the 2D omnidirectional image. In order to generate the 2D omnidirectional image, the other apparatus may acquire images included in the first encoded data and captured from a plurality of cameras by decoding the first encoded data, and may generate the 2D omnidirectional image by stitching the acquired images.

The apparatus 300 according to various embodiments may generate the final image regardless of the mode of the apparatus 300 in an image acquisition procedure by configuring the encoded data to be independently decodable. For example, even though the apparatus 300 has acquired a plurality of images based on a mode in which both of the first camera 330-1 and second camera 330-2 are used, the apparatus 300 or the electronic device 101 connected to the apparatus 300 may generate, in a stitching procedure, the final image based on the first encoded data (or the second encoded data) among the first encoded data for the image acquired from the first camera 330-1 and the second encoded data for the image acquired from the second camera 330-2.

The first camera 330-1 may be operatively connected to the second processor 310-2. The first camera 330-1 may be configured to be oriented in a first direction. The first camera 330-1 may have a first FOV. Optical data associated with the image acquired through the first camera 330-1 may be provided to the second processor 310-2.

The first camera 330-1 may correspond to the camera 330 of the apparatus 300 illustrated in FIG. 3.

The second camera 330-2 may be operatively connected to the third processor 310-3. The second camera 330-2 may be configured to be oriented in a second direction corresponding to the first direction. The second camera 330-2 may have a second FOV, which partially overlaps the first FOV. Since the second camera 330-2 is configured to be oriented in the second direction corresponding to the first direction and has the second FOV partially overlapping the first FOV, the second camera 330-2 may perform the same function as the left eye of a person relative to the first camera 330-1. In other words, the first camera 330-1 may perform a function, which is the same as the right eye of a person relative to the second camera 330-2. In other words, when only the images acquired through the second camera 330-2 are used, the final image may be a 2D image, and when both the images acquired through the first camera 330-1 and the images acquired through the second camera 330-2 are used, the final image may be a 3D image. Optical data associated with the image acquired through the second camera 330-2 may be provided to the third processor 310-3. According to one embodiment, the second camera 330-2 may be a camera used, regardless of the mode of the apparatus 300, when the apparatus 300 acquires an image. For example, the second camera 330-2 may be a camera used, regardless of the mode, when the second camera 330-2 is set to operate in both of the 2D mode operation and the 3D mode operation.

The second camera 330-2 may correspond to the camera 330 of the apparatus 300 illustrated in FIG. 3.

The first PMIC 350-1 may be used to provide power to the first processor 310-1.

The second PMIC 350-2 may be used to provide power to the second processor 310-2. When the second PMIC 350-2 receives, from the first processor 310-1, a signal for stopping supplying power to the second processor 310-2 from the first processor 310-1 or for reducing the power supplied to the second processor 310-2, the second PMIC 350-2 may stop supplying power to the second processor 310-2 or may reduce the power supplied to the second processor 310-2.

The third PMIC 350-3 may be used to provide power to the third processor 310-3. Each of the first PMIC 350-1, the second PMIC 350-2, and the third PMIC 350-3 may correspond to the PMIC 350 of the apparatus 300 illustrated in FIG. 3.

The memory 320 may store or temporarily store provided encoded data. The memory 320 may store the provided encoded data as the one data set. For example, when only the second encoded data is provided, the memory 320 may store only the second encoded data as one data set. In another example, when the second encoded data and the third encoded data are provided, the memory 320 may store both the first encoded data and the second encoded data as one data set. In various embodiments, the one data set stored in the memory 320 may be transmitted to another apparatus (e.g., the electronic device 101) for performing decoding and stitching in order to generate a final image. In various embodiments, the one data set stored in the memory 320 may be decoded and stitched in the apparatus 300 in order to generate a final image.

As described above, in various embodiments, the apparatus 300 may separate a processor connected to a camera that is used regardless of the mode of the apparatus 300 (e.g., the third processor 310-3) and a process connected to a camera that is not used depending on the mode of the apparatus 300 (e.g., the second processor 310-2). Through this distinction, the apparatus 300 is capable of reducing a calculation amount required to execute a particular mode. As an example, the second camera 330-2 may be a camera used, regardless of the mode of the apparatus 300, when the apparatus 300 acquires an image. For example, the second camera 330-2 may be a camera used, regardless of the mode, when the second camera 330-2 is set to operate in both of the 2D mode operation and the 3D mode operation.

In various embodiments, the encoded data generated in the apparatus 300 may be independently decodable. Through encoded data configured to be independently decodable, the apparatus 300 is capable of independently operating the attribute of the target final image in the image acquisition step and the attribute of the final image in the image stitching step. Through the encoded data configured to be independently decodable, the apparatus, which performs the operation of generating the final image, may inquire encoded data more quickly.

Figure 24:
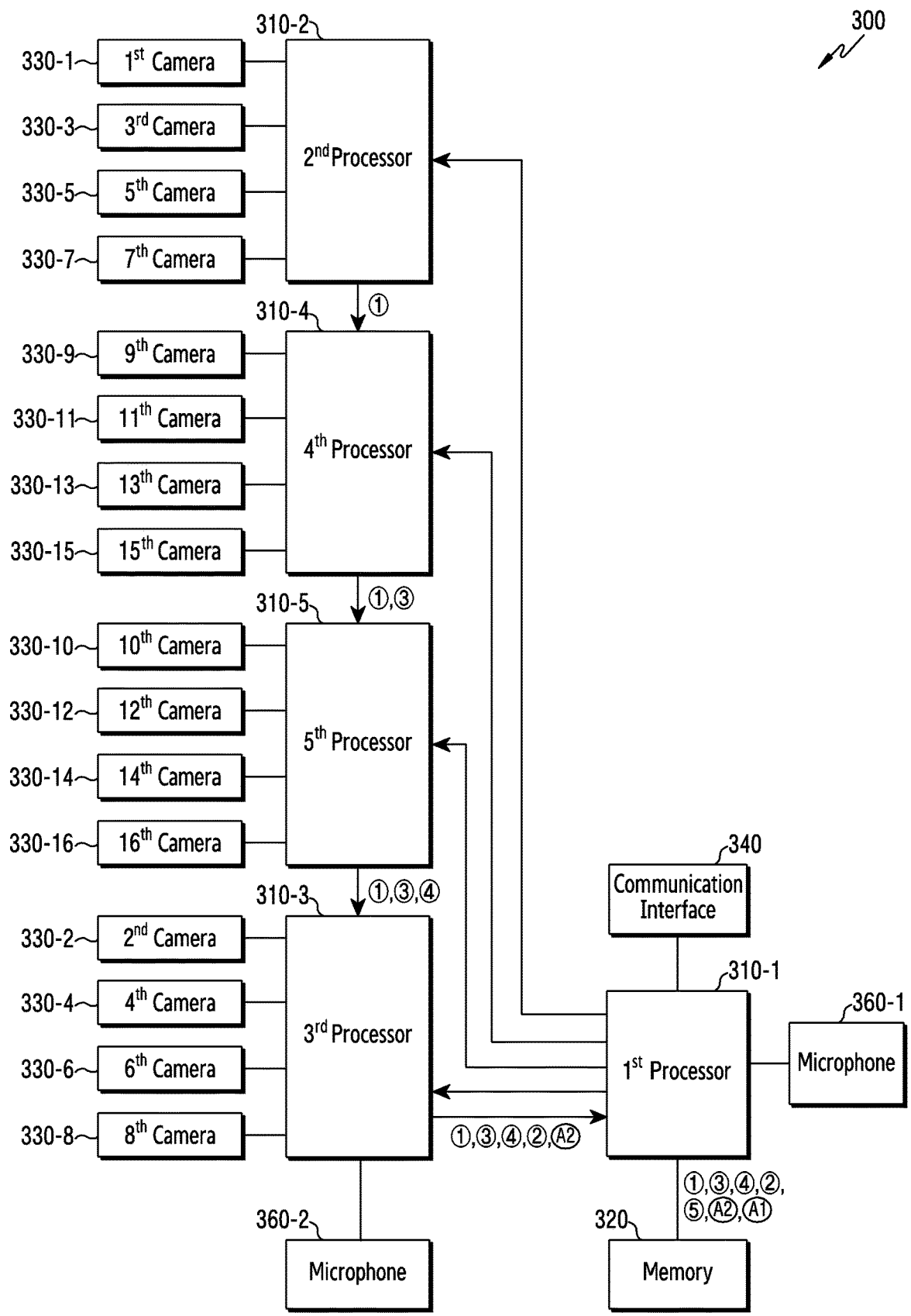
FIG. 24 illustrates another example of a functional configuration of an apparatus that controls image processing according to various embodiments.

FIG. 24 illustrates another example of the functional configuration of an apparatus that controls image processing according to various embodiments. This functional configuration may be included in the apparatus 300 illustrated in FIG. 3.

First to sixteenth cameras 330-1 to 330-16 in FIG. 24 may respectively correspond to the first to sixteenth cameras 330-1 to 330-16 illustrated in FIG. 15.

Referring to FIG. 24, the apparatus 300 may include first to fifth processors 310-1 to 310-5, a memory 320, first to sixteenth cameras 330-1 to 330-16, a communication interface 340, a microphone 360-1, and a microphone 360-2.

In response to the operation of the apparatus 300 in a mode for generating a 3D omnidirectional image, the first processor 310-1 may request encoded data from the second processor 310-2, the third processor 310-3, the fourth processor 310-4, and the fifth processor 310-5. Referring to FIG. 16, in order to generate a 3D omnidirectional image, it may be required to acquire the first to sixteenth images. The first processor 310-1 may request encoded data, which is generated by encoding the first image, the third image, the fifth image, and the seventh image, from the second processor 310-2, which is operatively connected to the first camera 330-1 configured to acquire the first image, the third camera 330-3 configured to acquire the third image, the fifth camera 330-5 configured to acquire the fifth image, and the seventh camera 310-7 configured to acquire the seventh image. The first processor 310-1 may request encoded data, which is generated by encoding the ninth image, the eleventh image, the thirteenth image, and the fifteenth image, from the fourth processor 310-4, which is operatively connected to the ninth camera 330-9 configured to acquire the ninth image, the eleventh camera 330-11 configured to acquire the eleventh image, the thirteenth camera 310-13 configured to acquire the thirteenth image, and the fifteenth camera 330-15 configured to acquire the fifteenth image.

The first processor 310-1 may transmit a synchronization signal for synchronization of the first to sixteenth cameras 330-1 to 330-16. The synchronization signal may include information associated with an operating frequency. For example, the first processor 310-1 may transmit the synchronization signal to each of the first to sixteenth cameras 330-1 to 330-16. Some of the transmitted synchronization signals may have a phase different from the other ones of the transmitted synchronization signals in order to reduce noise caused between the cameras. As an example, at least one of the synchronization signals may have a first phase, while at least one of the other synchronization signals may have a second phase. As an example, there may be a phase difference of 180 between the phase of a synchronization signal supplied to a first camera set including the first camera 330-1, the second camera 330-2, the third camera 330-3, the fourth camera 330-4, the ninth camera 330-9, the tenth camera 330-10, the eleventh camera 330-11, and the twelfth camera 330-12 and the phase of the synchronization signal provided to a second camera set including the fifth camera 330-5, the sixth camera 330-6, the seventh camera 330-7, the eighth camera 330-8, the thirteenth camera 330-13, the fourteenth camera 330-14, the fifteenth camera 330-15), and the 16th camera 330-16. The first processor 310-1 may cause the acquisition time points of the plurality of images acquired from the cameras 330-1 to 330-16 to be matched through the transmission of the synchronization signal. As another example, the phase of the synchronization signal provided to each of the first camera 330-1, the fifth camera 330-5, the ninth camera 330-9, the thirteenth camera 330-11, the tenth camera 330-10, the fourteenth camera 330-14, the second camera 330-2, and the sixth camera 330-6 may be different from the phase of the synchronization signal provided to each of the third camera 330-3, the seventh camera 330-7, the eleventh camera 330-11, the fifteenth camera 330-15, the twelfth camera 330-12, the sixteenth camera 330-16, the fourth camera 330-4, and the eighth camera 330-8, which are disposed adjacent to the first camera 330-1, the fifth camera 330-5, the ninth camera 330-9, the thirteenth camera 330-11, the tenth camera 330-10, the fourteenth camera 330-14, the second camera 330-2, and the sixth camera 330-6, respectively. The phase difference of the synchronization signals may be 180 degrees.

In another example, the first processor 310-1 may transmit the synchronization signals to each of the second processor 310-2, the third processor 310-3, the fourth processor 310-4, and the fifth processor 310-5. Each of the transmitted synchronization signals may be received by the first to sixteenth cameras 330-1 to 330-16 through each of the second to fifth processors 310-2 to 310-5. At least some of the first to sixteenth cameras 330-1 to 330-16 may receive a synchronization signal on which phase conversion has been performed at least some of the second processor 310-2, the third processor 310-3, the fourth processor 310-4, and the fifth processor 310-5 in order to reduce noise.

The second processor 310-2 may be operatively connected to the first camera 330-1, the third camera 330-3, the fifth camera 330-5, and the seventh camera 330-7. For example, the second processor 310-2 may be operatively connected to the first camera 330-1, the third camera 330-3, the fifth camera 330-5, and the seventh camera 330-7 through an FPGA (not illustrated). The second processor 310-2 may acquire the first image through the first camera 330-1, may acquire the third image through the third camera 330-3, may acquire the fifth image through the fifth camera 330-5, and may acquire the seventh image through the seventh camera 330-7. The second processor 310-2 may receive the first image, the third image, the fifth image, and the seventh image through the FPGA. The second processor 310-2 may generate first encoded data based on the first image, the third image, the fifth image, and the seventh image. The second processor 310-2 may generate the first encoded data by encoding the first image, the third image, the fifth image, and the seventh image. The first encoded data may be independently decodable regardless of the other encoded data. The second processor 310-2 may provide the first encoded data to the fourth processor 310-4.

The fourth processor 310-4 may be operatively connected to the ninth camera 330-9, the eleventh camera 330-11, the thirteenth camera 330-13, and the fifteenth camera 330-15. For example, the fourth processor 310-4 may be operatively connected to the ninth camera 330-9, the eleventh camera 330-11, the thirteenth camera 330-13, and the fifteenth camera 330-15 through the FPGA. The fourth processor 310-4 may acquire the ninth image through the ninth camera 330-9, may acquire the eleventh image through the eleventh camera 330-11, may acquire the thirteenth image through the thirteenth camera 330-13, and may acquire the fifteenth image through the fifteenth camera 330-15. The fourth processor 310-4 may receive the ninth image, the eleventh image, the thirteenth image, and the fifteenth image through the FPGA. The fourth processor 310-4 may generate third encoded data based on the ninth image, the eleventh image, the thirteenth image, and the fifteenth image. The fourth processor 310-4 may generate the third encoded data by encoding the ninth image, the eleventh image, the thirteenth image, and the fifteenth image. The third encoded data may be independently decodable regardless of the other encoded data. The fourth processor 310-4 may provide the first encoded data and the third encoded data to the fifth processor 310-5. Each of the first encoded data and the third encoded data provided to the fifth processor 310-5 may be configured to be independently decodable.

The fifth processor 310-5 may be operatively connected to the tenth camera 330-10, the twelfth camera 330-12, the fourteenth camera 330-14, and the sixteenth camera 330-16. For example, the fifth processor 310-5 may be operatively connected to the tenth camera 330-10, the twelfth camera 330-12, the fourteenth camera 330-14, and the sixteenth camera 330-16 through the FPGA. The fifth processor 310-5 may acquire the tenth image through the tenth camera 330-10, may acquire the twelfth image through the twelfth camera 330-12, may acquire the fourteenth image through the fourteenth camera 330-14, and may acquire the sixteenth image through the sixteenth camera 330-16. The fifth processor 310-5 may receive the tenth image, the twelfth image, the fourteenth image, and the sixteenth image through the FPGA. The fifth processor 310-5 may generate fourth encoded data based on the tenth image, the twelfth image, the fourteenth image, and the sixteenth image. The fifth processor 310-5 may generate the fourth encoded data by encoding the tenth image, the twelfth image, the fourteenth image, and the sixteenth image. The fourth encoded data may be independently decodable regardless of the other encoded data. The fifth processor 310-5 may provide the first encoded data, the third encoded data, and the fourth encoded data to the third processor 310-3. Each of the first encoded data, the third encoded data, and the fourth encoded data provided to the third processor 310-3 may be configured to be independently decodable.

The third processor 310-3 may be operatively connected to the second camera 330-2, the fourth camera 330-4, the sixth camera 330-6, and the eighth camera 330-8. For example, the third processor 310-3 may be operatively connected to the second camera 330-2, the fourth camera 330-4, the sixth camera 330-6, and the eighth camera 330-8 through the FPGA. The third processor 310-3 may acquire the second image through the second camera 330-2, may acquire the fourth image through the fourth camera 330-4, may acquire the sixth image through the sixth camera 330-6, and may acquire the eighth image through the eighth camera 330-8. The third processor 310-3 may receive the second image, the fourth image, the sixth image, and the eighth image through the FPGA. The third processor 310-3 may generate second encoded data based on the second image, the fourth image, the sixth image, and the eighth image. The third processor 310-3 may generate the second encoded data by encoding the second image, the fourth image, the sixth image, and the eighth image. The second encoded data may be independently decodable regardless of the other encoded data.

The third processor 310-3 receives audio associated with at least one of the first to sixteenth images through the microphone 360-2 operatively connected to the third processor 310-3. The microphone 360-2 may not be included in the apparatus 300 according to embodiments. The microphone 360-2 may be constituted with a plurality of sets or groups of microphones according to embodiments. The third processor 310-3 may generate second audio encoded data based on the received audio. The second audio encoded data may be independently decodable regardless of other encoded data.

The third processor 310-3 may provide the first encoded data, the second encoded data, the third encoded data, the fourth encoded data, and the second audio encoded data to the first processor 310-1. Each of the first encoded data, the second encoded data, the third encoded data, the fourth encoded data, and the second audio encoded data provided to the first processor 310-1 may be configured to be independently decodable.

Although not illustrated in FIG. 24, in response to the operation of the apparatus 300 in a mode for generating a 3D omnidirectional image, the first processor 310-1 may acquire the seventeenth image through the seventeenth camera corresponding to the seventeenth camera 330-17 illustrated in FIG. 15 may generate fifth encoded data based on the acquired seventeenth image.

In response to the operation of the apparatus 300 in a mode for generating a 3D omnidirectional image, the first processor 310-1 may receive audio associated with at least one image among the first to seventeenth images through the microphone 360-1 operatively connected to the first processor 310-1. The first processor 310-1 may generate first audio encoded data based on the received audio. The first audio encoded data may be independently decodable regardless of other encoded data.

The first processor 310-1 may configure the received first encoded data, the received second encoded data, the received third encoded data, the received fourth encoded data, the generated fifth encoded data, the received second audio encoded data, and the generated first audio encoded data as one data set for generating a 3D omnidirectional image. In the one data set, the encoded data may be arranged in the order of the first encoded data, the third encoded data, the fourth encoded data, the second encoded data, the fifth encoded data, the second audio encoded data, and the first audio encoded data, as illustrated in FIG. 24. The first processor 310-1 may store the one data set in the memory 320. The first processor 310-1 may transmit the configured single data set to another apparatus (e.g., the electronic device 101 for stitching) through the communication interface 340. Each of the various data contained in the stored or transmitted single data set may be independently decodable.

As described above, in order to generate a 3D omnidirectional image, the apparatus 300 according to various embodiments may generate the first to fourth encoded data, the first audio encoded data, and the second audio encoded data. Since each of the first to fourth encoded data, the first audio encoded data, and the second audio encoded data is configured to be independently decodable, an apparatus, which is provided with encoded data through the apparatus 300 may generate a 2D omnidirectional image, a 2D panoramic image, a 3D panoramic image, or the like, rather than a 3D omnidirectional image through selective decoding, even though the provided encoded data has been generated through a mode for generating a 3D omnidirectional image.

The apparatus 300 according to various embodiments may cause the image acquisition time points of the first to sixteenth cameras 310-1 to 310-16 to be matched through synchronization signals transmitted from the first processor 310-1 to the second to fifth processors 310-2 to 310-5, or synchronization signals transmitted from the first camera 310-1 to the first to sixteenth cameras 310-1 to 310-16. The apparatus 300 according to various embodiments is capable of reducing noise that may occur during signaling of synchronization signals by converting the phases of at least some of the synchronization signals.

Figure 25:
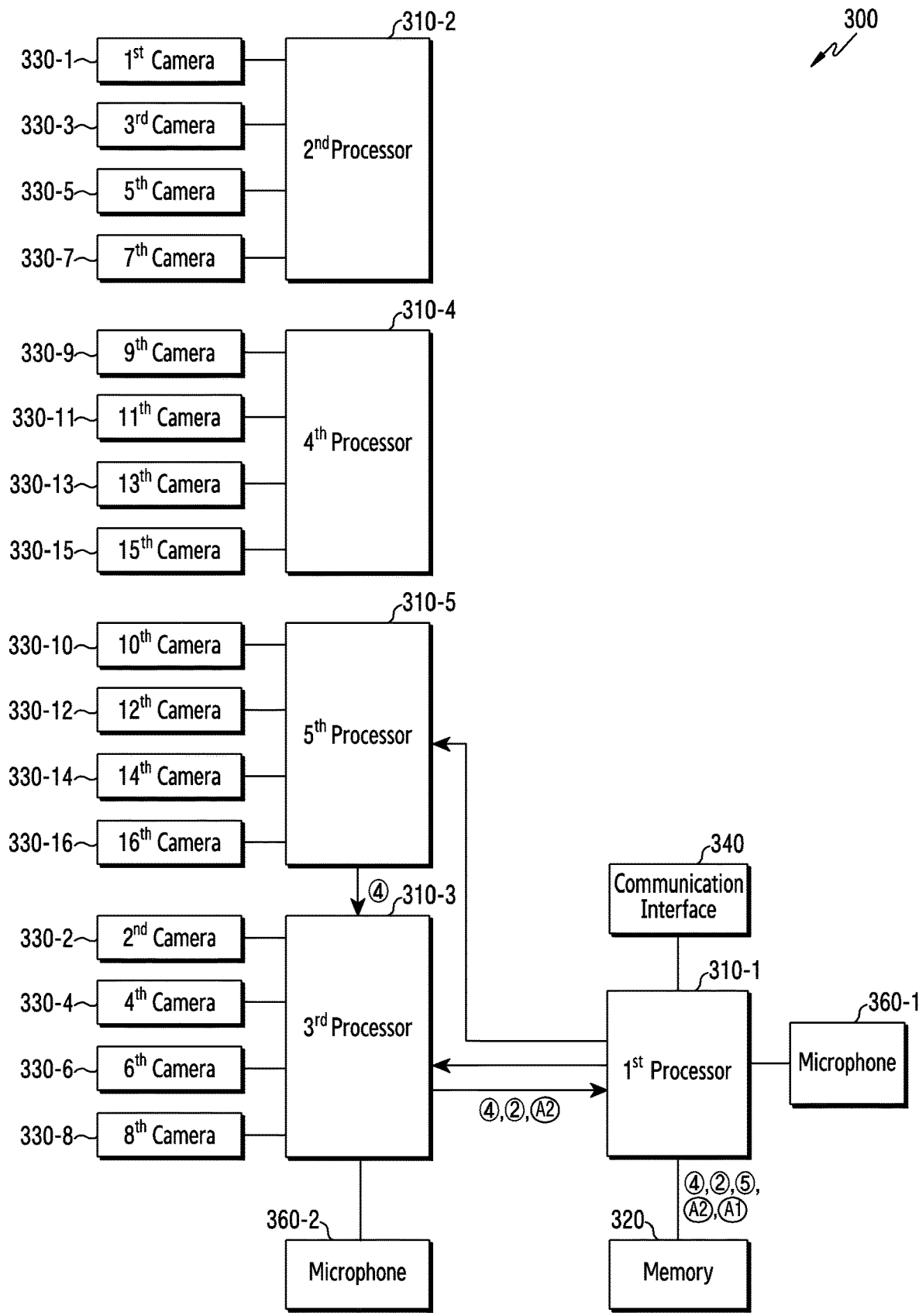
FIG. 25 illustrates still another example of a functional configuration of an apparatus that controls image processing according to various embodiments.

FIG. 25 illustrates still another example of the functional configuration of an apparatus that controls image processing according to various embodiments. This functional configuration may be included in the apparatus 300 illustrated in FIG. 3.

In FIG. 25, each of the components included in the apparatus 300 (e.g., first to fifth processors 310-1 to 310-5, a memory 320, first to sixteenth cameras 330-1 to 330-16, a communication interface 340, a microphone 360-1, and a microphone 360-2) may correspond to each of the components included in the apparatus 300 illustrated in FIG. 24.

Referring to FIG. 25, in response to the operation of the apparatus 300 in a mode for generating a 2D omnidirectional image, the first processor 310-1 may request encoded data from the fifth processor 310-5 and the third processor 310-3. Referring to FIG. 16, it may be required to acquire the second image, the fourth image, the sixth image, the eighth image, the tenth image, the twelfth image, the fourteenth image, and the sixteenth image in order to generate the 2D omnidirectional image. The first processor 310-1 may request encoded data, which is generated by encoding the tenth image, the twelfth image, the fourteenth image, and the sixteenth image, from the fifth processor 310-5, which is operatively connected to the tenth camera 330-10 configured to acquire the tenth image, the twelfth camera 330-12 configured to acquire the twelfth image, the fourteenth camera 310-14 configured to acquire the fourteenth image, and the sixteenth camera 330-16 configured to acquire the sixteenth image. The first processor 310-1 may request encoded data, which is generated by encoding the second image, the fourth image, the sixth image, and the eighth image, from the third processor 310-3, which is operatively connected to the second camera 330-2 configured to acquire the second image, the fourth camera 330-4 configured to acquire the fourth image, the sixth camera 310-6 configured to acquire the sixth image, and the eighth camera 330-8 configured to acquire the eighth image.

The first processor 310-1 may transmit synchronization signals for the synchronization of the second camera 330-2, the fourth camera 330-4, the sixth camera 330-6, the eighth camera 330-8, the tenth camera 330-10, the twelfth camera 330-12, the fourteenth camera 330-14, and the sixteenth camera 330-16. The synchronization signals may include information associated with an operating frequency. For example, the first processor 310-1 may transmit the synchronization signals to each of the second camera 330-2, the fourth camera 330-4, the sixth camera 330-6, the eighth camera 330-8, the tenth camera 330-10, the twelfth camera 330-12, the fourteenth camera 330-14, and the sixteenth camera 330-16. Some of the transmitted synchronization signals may have a phase different from the other ones of the transmitted synchronization signals in order to reduce noise caused between the cameras.

As an example, the phase of the synchronization signal provided to each of the tenth camera 330-10, the fourteenth camera 330-14, the second camera 330-2, and the sixth camera 330-6 may be different from the phase of the synchronization signal provided to each of the twelfth camera 330-12, the sixteenth camera 330-16, the fourth camera 330-4, and the eighth camera 330-8, which may be disposed adjacent to the fourteenth camera 330-14, the second camera 330-2, and the sixth camera 330-6, respectively. The phase difference of the synchronization signals may be 180 degrees.

As another example, the first processor 310-1 may transmit the synchronization signals to each of the fifth processor 310-5 and the third processor 310-3. Each of the transmitted synchronization signals may be received by each of the second camera 330-2, the fourth camera 330-4, the sixth camera 330-6, the eighth camera 330-8, the tenth camera 330-10, the twelfth camera 330-12, the fourteenth camera 330-14, and the sixteenth camera 330-16 through each of the fifth processor 310-5 and the third processor 310-3. At least some of the second camera 330-2, the fourth camera 330-4, the sixth camera 330-6, the eighth camera 330-8, the tenth camera 330-10, the twelfth camera 330-12, the fourteenth camera 330-14, and the sixteenth camera 330-16 may receive a synchronization signal, on which phase conversion is performed by at least a part of the fifth processor 310-5 and the third processor 310-3, in order to reduce noise.

Since acquisition of the first image, the third image, the fifth image, the seventh image, the ninth image, the eleventh image, the thirteenth image, and the fifteenth image may not be required in order to generate a 2D omnidirectional image, the first processor 310-1 may not request encoded data from the second processor 310-2 and the fourth processor 310-4. In various embodiments, the first processor 310-1 may control each of the second PMIC 350-2 (not illustrated) and the fourth PMIC 350-4, which are respectively connected to the second processor 310-2 and the fourth processor 310-4, to interrupt power supplied to the second processor 310-2 and the fourth processor 310-4 that are not used for the generation of the 2D omnidirectional image or to reduce the power supplied to the second processor 310-2 and the fourth processor 310-4 which are not used for the generation of the 2D omnidirectional image.

In response to the request, the fifth processor 310-5 may acquire the tenth image through the tenth camera 330-10, may acquire the twelfth image through the twelfth camera 330-12, may acquire the fourteenth image through the fourteenth camera 330-14, and may acquire the sixteenth image through the sixteenth camera 330-16. The fifth processor 310-5 may generate fourth encoded data based on the tenth image, the twelfth image, the fourteenth image, and the sixteenth image. The fourth encoded data may be independently decodable regardless of the other encoded data. The fifth processor 310-5 may provide the fourth encoded data to the third processor 310-3.

In response to the request, the third processor 310-3 may acquire the second image through the second camera 330-2, may acquire the fourth image through the fourth camera 330-4, may acquire the sixth image through the sixth camera 330-6, and may acquire the eighth image through the eighth camera 330-8. The third processor 310-3 may generate second encoded data based on the second image, the fourth image, the sixth image, and the eighth image. The second encoded data may be independently decodable regardless of the other encoded data.

The third processor 310-3 may receive audio associated with at least one of the second image, the fourth image, the sixth image, the eighth image, the tenth image, the twelft image, the fourteenth image, and the sixteenth image through the microphone 360-2. The microphone 360-2 may not be included in the apparatus 300 according to embodiments. The microphone 360-2 may be constituted with a plurality of sets or groups of microphones according to embodiments. The third processor 310-3 may generate second audio encoded data based on the received audio. The second audio encoded data may be independently decodable regardless of other encoded data.

The third processor 310-3 may provide the second encoded data, the fourth encoded data, and the second audio encoded data to the first processor 310-1. Each of the second encoded data, the fourth encoded data, and the second audio encoded data provided to the first processor 310-1 may be configured to be independently decodable.

In response to the operation of the apparatus 300 in a mode for generating a 2D omnidirectional image, the first processor 310-1 may acquire the seventeenth image through the seventeenth camera and may generate fifth encoded data based on the acquired seventeenth image.

In response to the operation of the apparatus 300 in a mode for generating a 2D omnidirectional image, the first processor 310-1 may receive audio associated with at least one image among the acquired images through the microphone 360-1. The first processor 310-1 may generate first audio encoded data based on the received audio. The first audio encoded data may be independently decodable regardless of other encoded data.

The first processor 310-1 may configure the received second encoded data, the received fourth encoded data, the generated fifth encoded data, the received second audio encoded data, and the generated first audio encoded data as one data set for generating the 2D omnidirectional image. In the one data set, the encoded data may be arranged in the order of the fourth encoded data, the second encoded data, the fifth encoded data, the second audio encoded data, and the first audio encoded data, as illustrated in FIG. 25. The first processor 310-1 may store the one data set in the memory 320. The first processor 310-1 may transmit the configured single data set to another apparatus (e.g., the electronic device 101 for stitching) through the communication interface 340. The configured single data set may be transmitted to the other apparatus in real time when the apparatus 300 operates in a mode for generating a 2D omnidirectional image. Each of the various data contained in the stored or transmitted single data set may be independently decodable.

As described above, the apparatus 300 according to various embodiments is capable of reducing a calculation amount required for generating encoded data in the apparatus 300 by connecting at least one camera, which is not used for generation of a 2D omnidirectional image, to a processor other than a processor connected to at least one camera, which is used for generating a 2D omnidirectional image.

Since each of the second encoded data, the fourth encoded data, the fifth encoded data, the second audio encoded data, and the first audio encoded data, which are generated in the apparatus 300 according to various embodiments, is independently decodable, an apparatus that is provided with encoded data through the apparatus 300 may generate a 2D panoramic image, rather than the 2D omnidirectional image, through selective decoding, even though the provided encoded data has been generated through the mode for generating the 2D omnidirectional image. In other words, the apparatus 300 according to various embodiments may reduce a calculation amount required in a decoding procedure and a stitching procedure for generation of a final image.

Figure 26:
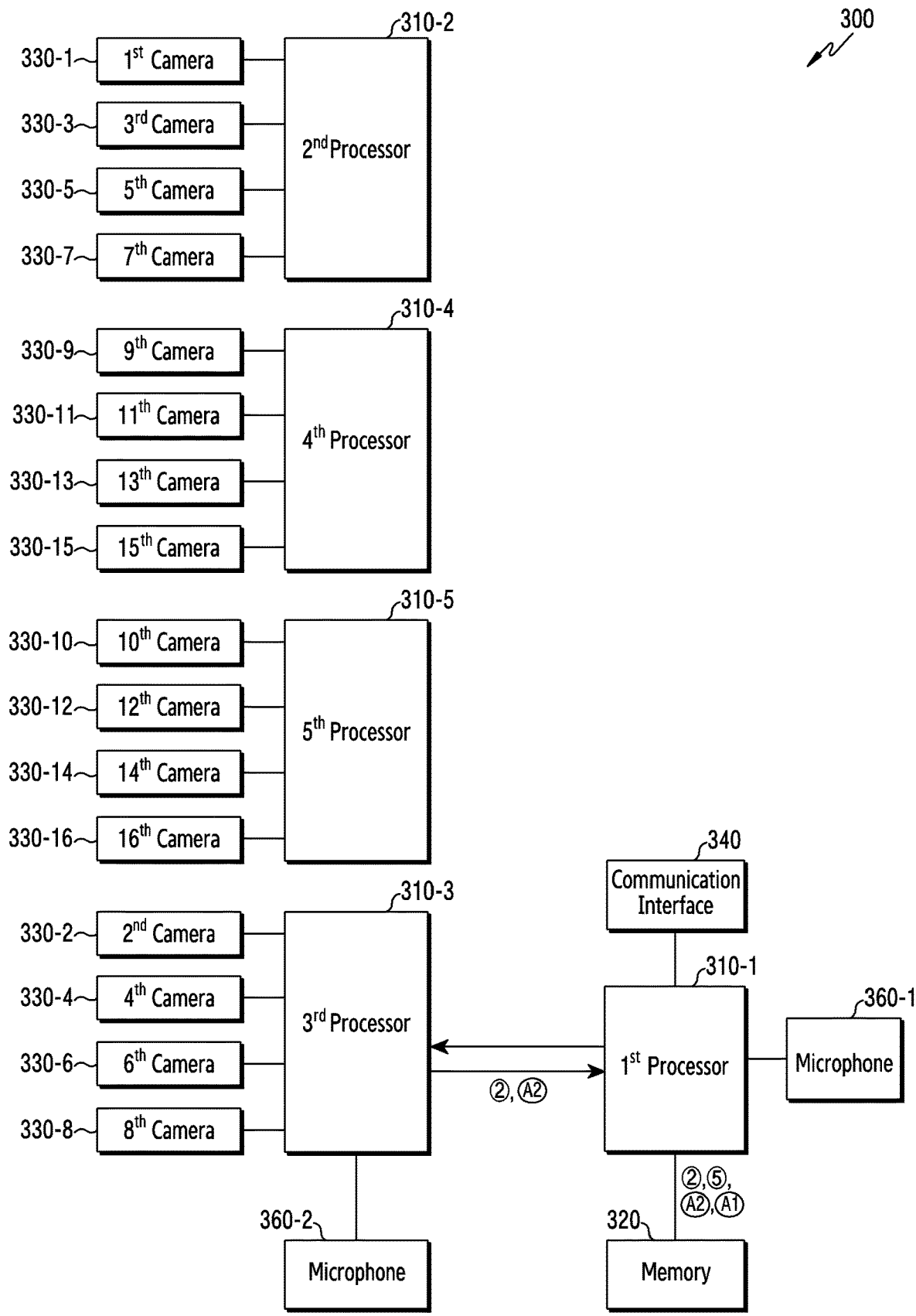
FIG. 26 illustrates still another example of a functional configuration of an apparatus that controls image processing according to various embodiments.

FIG. 26 illustrates still another example of the functional configuration of an apparatus that controls image processing according to various embodiments. This functional configuration may be included in the apparatus 300 illustrated in FIG. 3.

In FIG. 26, each of the components included in the apparatus 300 (e.g., first to fifth processors 310-1 to 310-5, a memory 320, first to sixth cameras 330-1 to 330-16, a communication interface 340, a microphone 360-1, and a microphone 360-2) may correspond to each of the components included in the apparatus 300 illustrated in FIG. 24.

Referring to FIG. 26, in response to the operation of the apparatus 300 in a mode for generating a 2D panoramic image, the first processor 310-1 may request encoded data from the third processor 310-3. Referring to FIG. 16, it may be required to acquire the second image, the fourth image, the sixth image, and the eighth image in order to generate the 2D panoramic image. The first processor 310-1 may request encoded data, which is generated by encoding the second image, the fourth image, the sixth image, and the eighth image, from the third processor 310-3, which is operatively connected to the second camera 330-2 configured to acquire the second image, the fourth camera 330-4 configured to acquire the fourth image, the sixth camera 330-6 configured to acquire the sixth image, and the eighth camera 330-8 configured to acquire the eighth image.

The first processor 310-1 may synchronize the second camera 330-2, the fourth camera 330-4, the sixth camera 330-6, and the eighth camera 330-8 by transmitting a synchronization signal to each of the second camera 330-2, the fourth camera 330-4, the sixth camera 330-6, and the eighth camera 330-8 or by transmitting a synchronization signal to the third processor 310-3.

Since acquisition of the first image, the third image, the fifth image, the seventh image, the ninth to sixteenth images is not required to generate a 2D panoramic image, the first processor 310-1 may not request the encoded data from the second processor 310-2, the fourth processor 310-4, and the fifth processor 310-5. In various embodiments, the first processor 310-1 may control each of the second PMIC 350-2 (not illustrated), the fourth PMIC 350-4 (not illustrated), and the fifth PMIC 350-5, which are respectively connected to the second processor 310-2, the fourth processor 310-4, and the fifth processor 310-5 so as to interrupt the power supplied to each of the second processor 310-2, the fourth processor 310-4, and the fifth processor 310-5, which are not used for generating a 2D panoramic image, and to reduce the power supplied to each of the second processor 310-2, the fourth processor 310-4, and the fifth processor 310-5, which are not used for generating a 2D panoramic image.

In response to the request, the third processor 310-3 may acquire the second image through the second camera 330-2, may acquire the fourth image through the fourth camera 330-4, may acquire the sixth image through the sixth camera 330-6, and may acquire the eighth image through the eighth camera 330-8. The third processor 310-3 may generate second encoded data based on the second image, the fourth image, the sixth image, and the eighth image. The second encoded data may be independently decodable regardless of the other encoded data.

The third processor 310-3 may receive, through the microphone 360-2, audio associated with at least one of the second image, the fourth image, the sixth image, the eighth image, the tenth image, the twelfth image, the fourteenth image, and the sixth image. The third processor 310-3 may generate second audio encoded data based on the received audio. The second audio encoded data may be independently decodable regardless of other encoded data.

The third processor 310-3 may provide the second encoded data and the second audio encoded data to the first processor 310-1. Each of the second encoded data and the second audio encoded data, which are provided to the first processor 310-1, may be configured to be independently decodable.

In response to the operation of the apparatus 300 in a mode for generating a 2D panoramic image, the first processor 310-1 may acquire the seventeenth image through the seventeenth camera and may generate fifth encoded data based on the acquired seventeenth image.

In response to the operation of the apparatus 300 in a mode for generating a 2D panoramic image, the first processor 310-1 may receive audio associated with at least one image among the acquired images through the microphone 360-1. The first processor 310-1 may generate first audio encoded data based on the received audio. The first audio encoded data may be independently decodable regardless of other encoded data.

The first processor 310-1 may configure the received second encoded data, the generated fifth encoded data, the received second audio encoded data, and the generated first audio encoded data as one data set for generating the 2D panoramic image. In the one data set, the encoded data may be arranged in the order of the second encoded data, the fifth encoded data, the second audio encoded data, and the first audio encoded data, as illustrated in FIG. 26. The first processor 310-1 may store the one data set in the memory 320. The first processor 310-1 may transmit the configured single data set to another apparatus through the communication interface 340. The configured single data set may be transmitted to the other apparatus in real time when the apparatus 300 operates in a mode for generating a 2D panoramic image. Each of the various data contained in the stored or transmitted single data set may be independently decodable.

As described above, the apparatus 300 according to various embodiments is capable of reducing a calculation amount required for generating encoded data in the apparatus 300 by connecting at least one camera, which is not used for generation of a 2D panoramic image, to a processor other than a processor connected to at least one camera, which is used for generating a 2D panoramic image.

Figure 27:
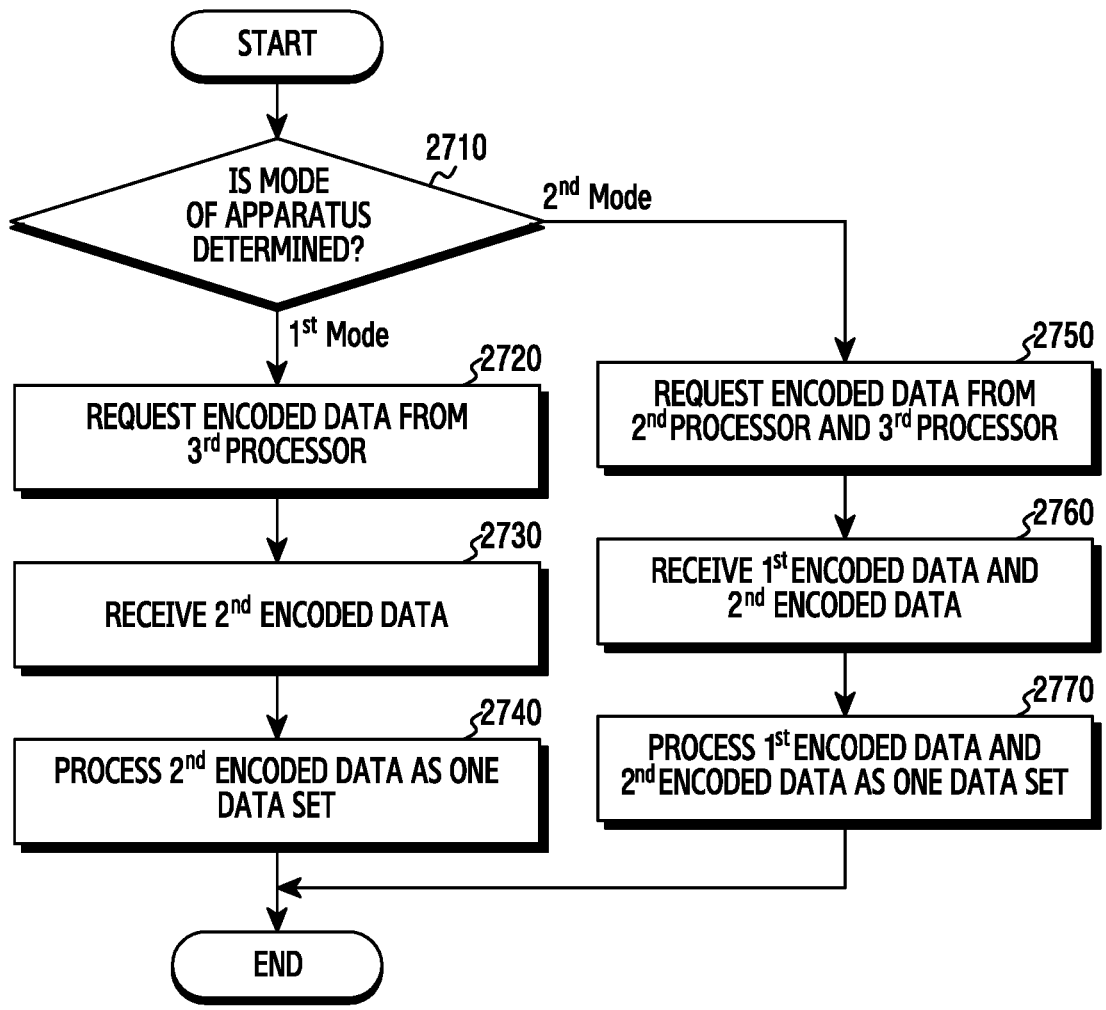
FIG. 27 illustrates an example of an operation of an apparatus that controls image processing according to various embodiments.

FIG. 27 illustrates an example of the operation of an apparatus that controls image processing according to various embodiments. This operation may be performed by the apparatus 300 illustrated in FIG. 3, the apparatus 300 illustrated in FIGS. 23 to 26, or a component of the apparatus 300 (e.g., the processor 310 of FIG. 3 or the first processor 310-1 of FIGS. 23 to 26).

Referring to FIG. 27, in operation 2710, the first processor 310-1 may determine the mode of the apparatus 300. In various embodiments, the first processor 310-1 may determine the mode of the apparatus 300 in order to determine at least one target processor to transmit a request for encoded data among a plurality of processors included in the apparatus 300. In various embodiments, the mode of the apparatus 300 may be determined based on the input detected through the UI 2000 illustrated in FIG. 20. In response to determining that the mode of the apparatus 300 is the first mode, the first processor 310-1 may perform operations 2720 to 2740. The first mode may be a mode in which use of the second processor (or the first camera 310-1 connected to the second processor 310-2) among the second processor 310-2 and the third processor 310-3) is not required. In response to determining that the mode of the apparatus 300 is the second mode, the first processor 310-1 may perform operations 2750 to 2770. The second mode may be a mode in which use of the second processor 310-2 and the third processor 310-3 is used.

In operation 2720, in response to determining that the mode of the apparatus 300 is the first mode, the first processor 310-1 may request encoded data from the third processor 310-3. The first processor 310-1 may request the encoded data only from the third processor 310-3 in order to reduce a calculation amount of for acquiring the encoded data. The third processor 310-3 may receive the request.

In operation 2730, the first processor 310-1 may receive the second encoded data from the third processor 310-3. The second encoded data may be generated in the third processor 310-3 based on the image acquired through the second camera 310-2 operatively connected to the third processor 310-3. The received second encoded data may be independently decodable.

In operation 2740, the first processor 310-1 may process the second encoded data as one data set. In various embodiments, the first processor 310-1 may store the one data set including the second encoded data in the memory 320 of the apparatus 300. In various embodiments, when the second camera 310-2 is constituted with a plurality of cameras, the second encoded data may be independently decodable for each of a plurality of images acquired from each of the plurality of cameras. Information on each of the plurality of images may be included in the second encoded data in an order corresponding to the arrangement of each of the plurality of cameras. In various embodiments, the first processor 310-1 may transmit the one data set including the second encoded data to another apparatus (e.g., the electronic device 101).

In operation 2750, in response to determining that the mode of the apparatus 300 is the second mode, the first processor 310-1 may request encoded data from the second processor 310-2 and the third processor 310-3. Since the second mode requires image acquisition and encoding of the second processor 310-2, the first processor 310-1 may request encoded data from the second processor 310-2 and the third processor 310-3. Each of the second processor 310-2 and the third processor 310-3 may receive the request.

In operation 2760, the first processor 310-1 may receive the first encoded data and the second encoded data from the third processor 310-3. The first encoded data may be generated based on the image acquired through the first camera 310-1 operatively connected to the second processor 310-2. The first encoded data may be provided from the second processor 310-2 to the first processor 310-1 through the third processor 310-3. The first encoded data may be independently decodable regardless of whether the second encoded data is decoded. The second encoded data may be generated based on the image acquired through the second camera 310-2 operatively connected to the third processor 310-3. The second encoded data may be independently decodable regardless of whether the first encoded data is decoded.

In operation 2770, the first processor 310-1 may process the first encoded data and the second encoded data as one data set. Processing the first encoded data and the second encoded data as the one data set may be a concept distinct from combining the first encoded data and the second encoded data. The first encoded data may be configured independently of the second encoded data in the one data set and the second encoded data may be configured independently of the first encoded data in the one data set. In various embodiments, the first processor 310-1 may store the one data set in the memory 320 of the apparatus 300. In various embodiments, the first processor 310-1 may transmit the one data set to another apparatus (e.g., the electronic device 101). The other apparatus receiving the one data set may acquire information associated with the image acquired through the first camera 330-1 by extracting and decoding only the first encoded data in the one data set. The other apparatus receiving the one data set may acquire information associated with the image acquired through the second camera 330-2 by extracting and decoding only the second encoded data in the one data set. In other words, each of the first encoded data and the second encoded data in the transmitted single data set may be independently decodable.

As described above, the apparatus 300 according to various embodiments is capable of reducing a calculation amount required for image acquisition and image processing by generating and providing independently decodable encoded data. The apparatus 300 according to various embodiments is capable of reducing a calculation amount required for image acquisition and image processing by selectively driving the processor according to the mode of the apparatus 300.

Figure 28:
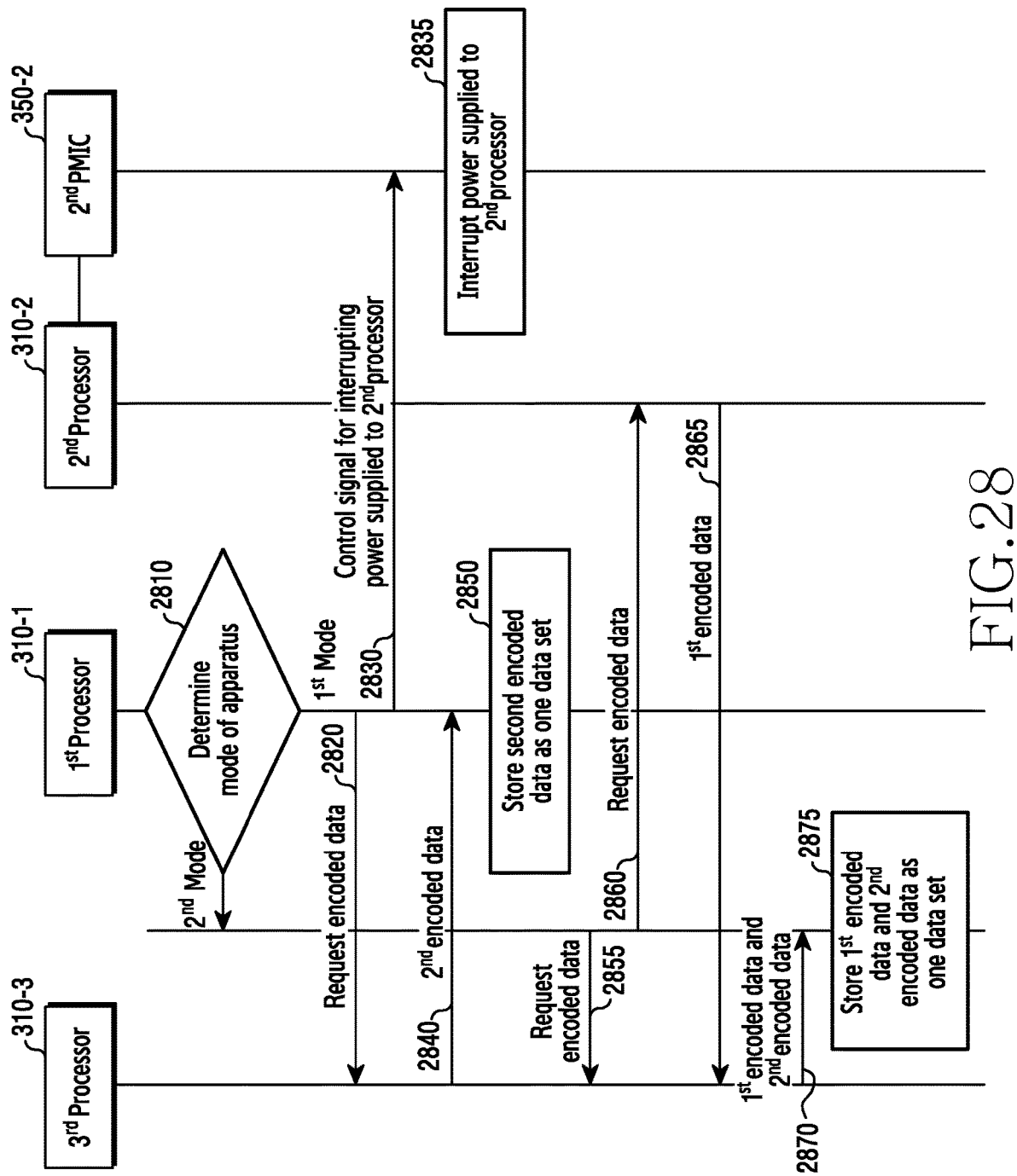
FIG. 28 illustrates an example of a signal flow in an apparatus that controls image processing according to various embodiments.

FIG. 28 illustrates an example of a signal flow in an apparatus that controls power according to various embodiments. This signal flow may be caused in the apparatus illustrated in FIG. 3 and the apparatus 300 illustrated in FIGS. 23 to 26.

Referring to FIG. 28, in operation 2810, the first processor 310-1 may determine the mode of the apparatus 300. The first processor 310-1 may determine the mode of the apparatus 300 in order to specify an object from which encoded data will be requested. When the first processor 310-1 determines that the mode of the apparatus 300 is the first mode in which calculation by the second processor 310-2 is not required, operations 2820 to 2850 may be performed in the apparatus 300. Unlike this, when the first processor 310-1 determines that the mode of the apparatus 300 is the second mode in which calculation by the second processor 310-2 is required, operations 2855 to 2875 may be performed in the apparatus 300.

In operation 2820, in response to determining that the mode of the apparatus 300 is the first mode, the first processor 310-1 may request encoded data only from the third processor 310-3. Since the apparatus 300 is configured such that the calculation by the second processor 310-2 is not required in the first mode, the first processor 310-1 may request the encoded data only from the third processor 310-3.

In operation 2830, in response to determining that the mode of the apparatus 300 is the first mode, the first processor 310-1 may transmit a control signal for interrupting power, provided to the second processor 310-2, to the second PMIC 350-2 operatively connected to the second processor 310-2. Since the apparatus 300 is configured such that the calculation by the second processor 310-2 is not required in the first mode, the first processor 310-1 may transmit a control signal for deactivating the second processor 310-2. The second PMIC 350-2 may receive the control signal.

Operation 2820 and operation 2830 may be performed simultaneously or in reverse order. In other words, operation 2820 and operation 2830 may be performed regardless of order.

In operation 2835, the second PMIC 310-2 may interrupt power supplied to the second processor 310-2.

In operation 2840, in response to the request, the third processor 310-3 may provide, to the first processor 310-1, the second encoded data generated based on the image acquired from the second camera 330-2. The first processor 310-1 may receive the second encoded data.

Operation 2830 and operation 2840 may be performed simultaneously or in reverse order. In other words, operation 2830 and operation 2840 may be performed regardless of order.

In operation 2850, the first processor 310-1 may store only the second encoded data in the memory 320 as one data set. The first processor 310-1 may store the one data set in the memory 320 in order to post-process the one data set or to transmit the one data set to another apparatus.

In operation 2855, in response to determining that the mode of the apparatus 300 is the second mode, the first processor 310-1 may request encoded data from the third processor 310-3. The third processor 310-3 may receive the request.

In operation 2860, in response to determining that the mode of the apparatus 300 is the second mode, the first processor 310-1 may request encoded data from the second processor 310-2. The second processor 310-2 may receive the request.

Operation 2855 and operation 2860 may be performed simultaneously or in reverse order. In other words, operation 2855 and operation 2860 may be performed regardless of order.

In operation 2865, in response to the request, the second processor 310-2 may transmit, to the third processor 310-3, the first encoded data generated based on the image acquired through the first camera 330-1. The first encoded data may be independently decodable. The third processor 310-3 may receive the first encoded data.

In operation 2870, in response to the request, the third processor 310-3 may provide, to the first processor 310-1, the second encoded data generated based on the image acquired through the second camera 330-2 and the received first encoded data. The second encoded data may be independently decodable. The first processor 310-1 may receive the first encoded data and the second encoded data.

In operation 2875, the first processor 310-1 may store the first encoded data and the second encoded data as one data set. The first processor 310-1 may store the one data set in order to post-process the one data set constituted with the first encoded data and the second encoded data or to transmit the one data set to another apparatus. In other words, each of the first encoded data and the second encoded data in the transmitted single data set may be independently decodable in the apparatus 300 or the other apparatus.

Figure 29:
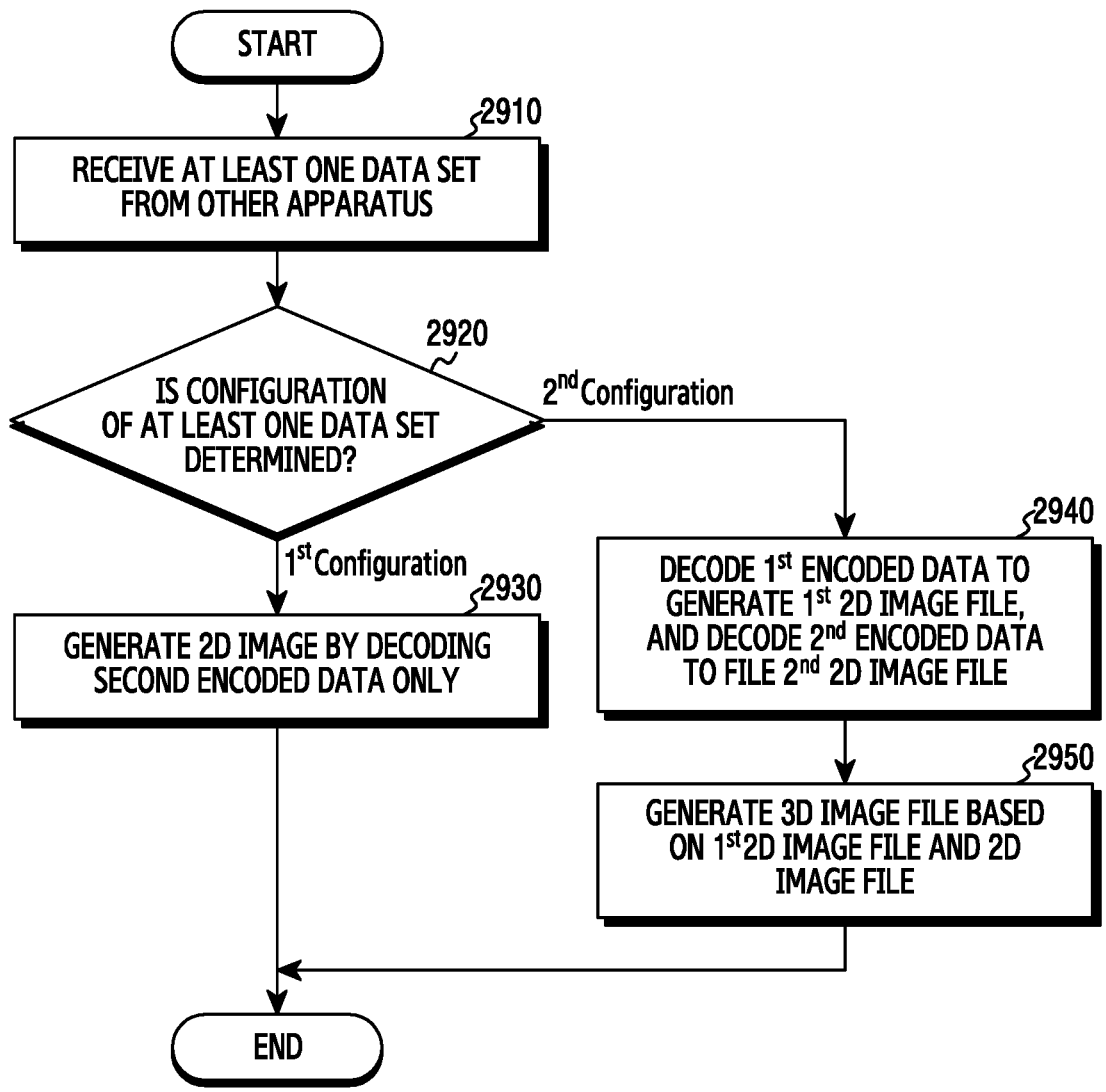
FIG. 29 illustrates an example of an operation of another apparatus that receives a data set according to various embodiments.

FIG. 29 illustrates an example of an operation of another apparatus that receives a data set according to various embodiments. This operation may be performed by the electronic device 101 illustrated in FIG. 1 or the processor 120 in the electronic device 101.

Referring to FIG. 29, in operation 2910, the processor 120 may receive at least one data set from another apparatus (e.g., the apparatus 300). The at least one data set may be configured by the apparatus 300. For example, the at least one data set may be constituted with the first encoded data and the second encoded data. As another example, the at least one data set may be constituted only with the second encoded data.

In operation 2920, the processor 120 may determine the configuration of the at least one data set. In various embodiments, the processor 120 may determine the configuration of the at least one data set in response to the reception. The processor 120 may perform operation 2930 based on determining that the configuration of the at least one data set is a first configuration. Unlike this, the processor 120 may perform operations 2940 and 2950 based on determining that the configuration of the at least one data set is a second configuration.

In operation 2930, based on determining that the configuration of the at least one data set is the first configuration, the processor 120 may decode only the second encoded data to generate a 2D image file. Since the at least one data set may be constituted only with the second encoded data, the processor 120 may acquire the second encoded data from the at least one data set, and may decode the acquired second encoded data, thereby generating a 2D image file as the final image.

In operation 2940, based on determining that the configuration of the at least one data set is the second configuration, the processor 120 may decode the first encoded data to generate a first 2D image file, and may decode the second encoded data to generate a second 2D image file. Each of the first encoded data and the second encoded data may be independently decodable and may be used to generate an independent image file.

In operation 2950, the processor 120 may generate a 3D image file based on the first 2D image file and the second 2D image file. The processor 120 may synthesize (or stitch) the first 2D image file and the second 2D image file to generate the 3D image file.

Unlike operation 2950 of FIG. 29, the processor 120 may use only the first 2D image file as the final image file, or may use only the second 2D image file as the final image file. In other words, since each of the first encoded data and the second encoded data is independently decodable, the processor 120 may adaptively use a file generated based on the first encoded data and a file generated based on the second encoded data.

Figure 30:
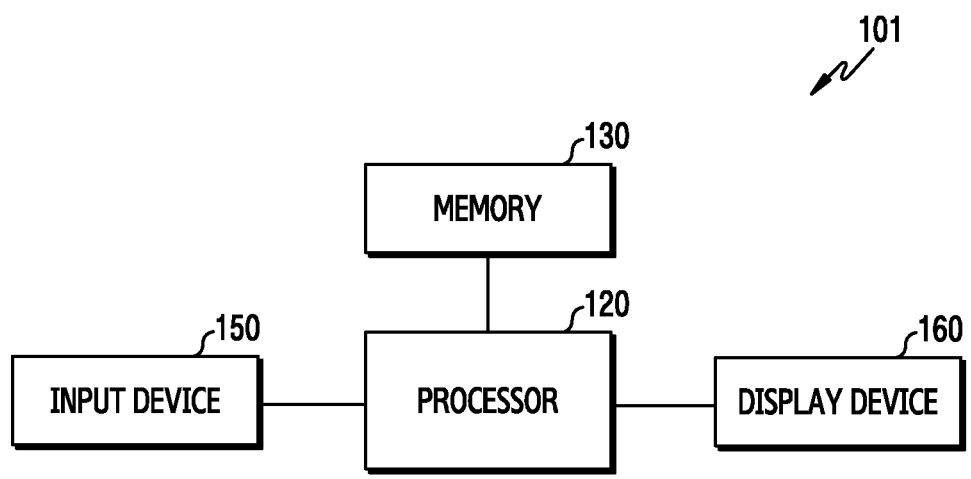
FIG. 30 illustrates an example of a functional configuration of an electronic device that processes an audio signal according to various embodiments.

FIG. 30 illustrates an example of the functional configuration of an electronic device that processes an audio signal according to various embodiments. This functional configuration may be included in the apparatus 300 illustrated in FIG. 3.

Figure 31:
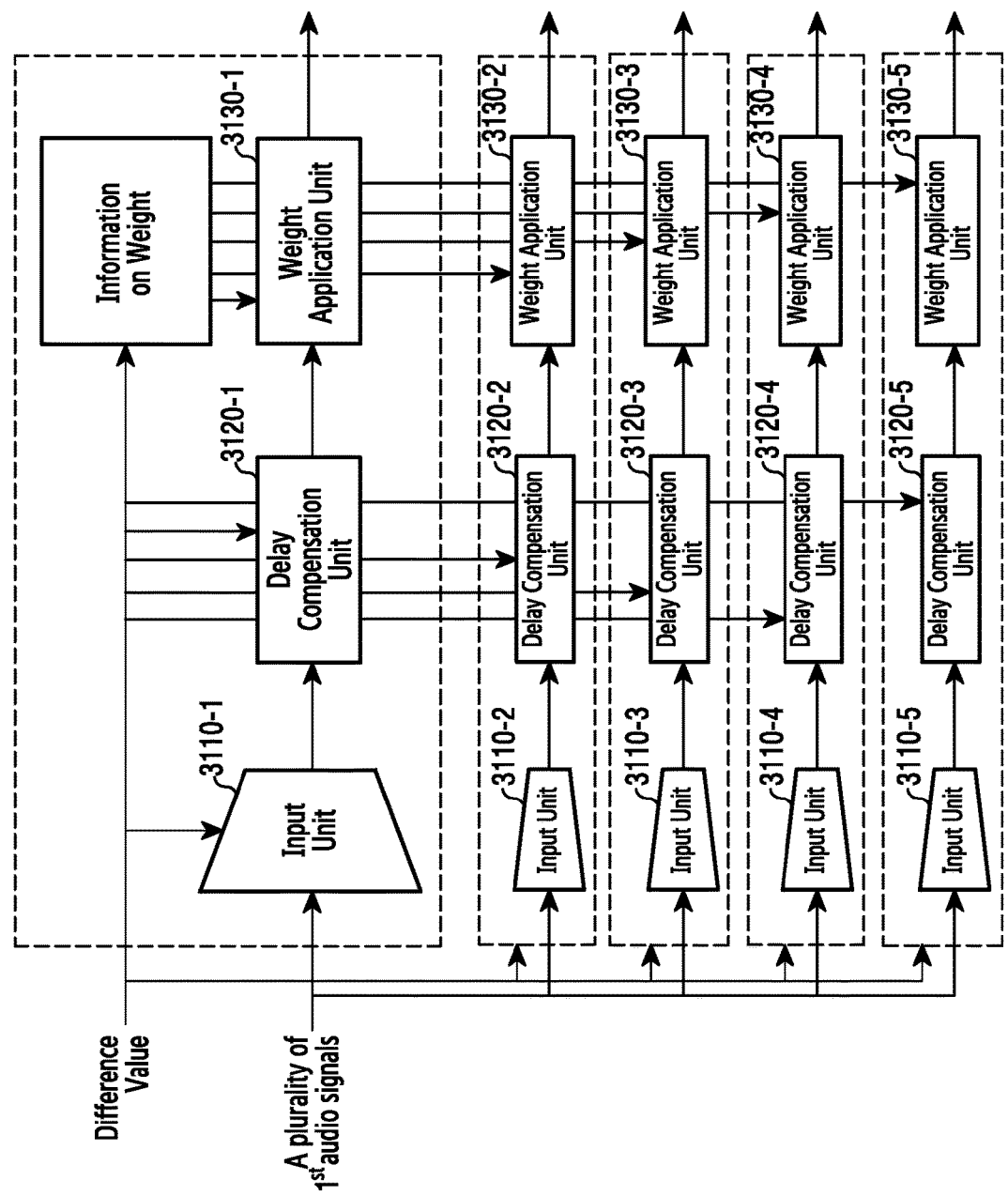
FIG. 31 illustrates an example of an operation of a processor that processes an audio signal according to various embodiments.

FIG. 31 illustrates an example of the operation of a processor that processes an audio signal according to various embodiments.

In FIG. 30, the electronic device 101 may be an electronic device that receives a plurality of images and a plurality of audio signals for an omnidirectional image from the apparatus 300 illustrated in FIG. 3, etc. The electronic device 101 may be an electronic device that generates the omnidirectional image or an electronic device that reproduces the omnidirectional image.

Referring to FIG. 30, the electronic device 101 may include a processor 120, a memory 130, an input device 150, and a display device 160.

The processor 120 may be operatively connected to the memory 130, the input device 150, and the display device

160. The processor 120 may control the memory 130, the input device 150, and the display device 160 through the connection.

In various embodiments, the processor 120 may display a plurality of images for the omnidirectional image through the display device 160 by executing a plurality of instruction words stored in the memory 130. The processor 120 may display the plurality of images for editing of the omnidirectional image. For example, the processor 120 may display the plurality of images in order to change the reference direction of the omnidirectional image from the first direction to the second direction. The displayed plurality of images may be acquired based on the first direction (or using a specific camera as a central camera) in the apparatus 300 or the like. The processor 120 may display the plurality of images within an UI of an application for changing the reference direction of the omnidirectional image.

In various embodiments, the processor 120 may detect, through the input device 150, an input for changing the reference direction of the omnidirectional image by executing a plurality of instruction words stored in the memory 130. The processor 120 may detect an input for changing the reference direction of the omnidirectional image from the first direction to the second direction. The input may include an input for selecting a $k^{th}$ image corresponding to the second direction among the displayed plurality of images. For example, the input for selecting the $k^{th}$ image may be a long touch input, a drag input, a double tap input, a force touch input, or the like for the $k^{th}$ image.

In various embodiments, in response to detecting (or receiving) the input, the processor 120 may identify a plurality of first audio signals for the omnidirectional image by executing a plurality of instruction words stored in the memory 130. The plurality of first audio signals may be respectively acquired through a plurality of microphones while the plurality of images are being acquired. The processor 120 may identify the plurality of first audio signals from the data set received from the apparatus 300. Each of the plurality of first audio signals may be a signal received through the plurality of microphones. Each of the plurality of first audio signals may be received through the plurality of microphones capable of adaptively changing a gain (or a recording mode) according to what the reference direction is.

In various embodiments, in response to detecting (or receiving) the input, the processor 120 may determine a difference value between the first direction and the second direction by executing a plurality of instruction words stored in the memory 130. The difference value may be used to adjust the plurality of first audio signals in accordance with the change of the reference direction. The difference value may be used to generate a plurality of second audio signals changed from the plurality of first audio signals. For example, each of the plurality of second audio signals may constitute a plurality of channel audio data. For example, each of the plurality of second audio signals may be output through each of the plurality of channels. The difference value may be determined based on a positional relationship between the first direction and the second direction. The difference value may include at least one of a parameter indicating an angle and a parameter indicating an orientation. The difference value may indicate the number of images arranged between an mth image corresponding to the first direction among the plurality of images and the $k^{th}$ image corresponding to the second direction among the plurality of images. In various embodiments, the difference value may be replaced by another value. For example, the difference value may be replaced with a value indicating an orientation to the reference direction (or a center view). In various embodiments, information on the difference value may be obtained together with the plurality of first audio signals.

In various embodiments, during acquisition of the plurality of images, when the reference direction is changed from the first direction to the second direction, the processor 120 may change the order of encoded data for each of a plurality of images acquired using the plurality of cameras. In some embodiments, the processor 120 may transmit, to the other apparatus, information on the difference value, which is determined according to the changed order of the encoded data for each of the plurality of images. The other apparatus may generate the second audio signals based on the received information. In some other embodiments, the processor 120 may generate the plurality of second audio signals matched in the second direction and may transmit information on the plurality of second audio signals to the other apparatus by changing the order (or combination) of the plurality of first images in accordance with the changed order of the encoded data for each of the plurality of images.

In various embodiments, the processor 120 may generate the plurality of second audio signals changed from the plurality of first audio signals based on the determined difference value by executing the plurality of instruction words stored in the memory 130. The plurality of second audio signals may be audio signals corresponding to the omnidirectional image using the second direction as a reference direction. Each of the plurality of second audio signals may be respectively associated with a plurality of channels for a surround effect. For example, the plurality of channels may include a left channel of 5.1 channels, a right channel of the 5.1 channels, a center channel of the 5.1 channels, a surround left channel of the 5.1 channels, a surround right channel of the 5.1 channels, and a woofer channel of the 5.1 channels. Each of the plurality of second audio signals may be output through each of the plurality of channels. For example, the plurality of second audio signals may include an output device for the left channel of the 5.1 channels, an output device for the right channel of the 5.1 channels, an output device for the center channel of the 5.1 channels, an output device for the surround left channel of the 5.1 channels, an output device for the surround right channel of the 5.1 channels, and an output device for the woofer channel of the 5.1 channels.

For example, referring to FIG. 31, the processor 120 may provide the determined difference value to each of the input units 3110-1 to 3110-5. Each of the input units 3110-1 to 3110-5 may correspond to a plurality of channels. For example, the input unit 3110-1 may be configured for the left channel of the 5.1 channels, the input unit 3110-2 may be configured for the right channel of the 5.1 channels, the input unit 3110-3 may be configured for the center channel of the 5.1 channels, the input unit 3110-4 may be configured for the surround left channel of the 5.1 channels, and the input unit 3110-5 may be configured for the surround right channel of the 5.1 channels.

The processor 120 may provide the plurality of first audio signals to respective input units 3110-1 to 3110-5. For example, the processor 120 may provide the plurality of first audio signals to respective input units 3110-1 to 3110-5.

The input unit 3110-1 may determine a combination of the plurality of first audio signals corresponding to (or suitable for) a channel associated with the input unit 3110-1, based on the provided difference value. As an example, the input unit 3110-1 may determine at least one first audio signal among the plurality of first audio signals as a signal corresponding to the left channel of the 5.1 channels (e.g., at least one audio signal received through at least one microphone disposed on the left side of a camera corresponding to the second direction) based on the provided difference value. As another example, the input unit 3110-4 may determine at least one other audio signal among the plurality of first audio signals as a signal corresponding to the surround left channel of the 5.1 channels based on the provided difference value. In various embodiments, at least some of one or more other audio signals may be common to at least some of one or more audio signals. In various embodiments, all of the one or more other audio signals may not be common to all of the one or more audio signals.

Each of the input units 3110-1 to 3110-5 may provide information on at least one determined audio signal to each of delay compensation units 3120-1 to 3120-5. Each of the delay compensation units 3120-1 to 3120-5 may be used to compensate for a delay caused by a difference in position between a plurality of microphones that acquire the plurality of first audio signals. Each of the delay compensation units 3120-1 to 3120-5 may compensate for a delay of the at least one audio signal received in each of the delay compensating units 3120-1 to 3120-5. For example, each of the delay compensation units 3120-1 to 3120-5 may compensate for a delay of the at least one audio signal such that each of the plurality of second audio signals is output in a state of being synchronized.

Each of the delay compensation units 3120-1 to 3120-5 may provide the at least one audio signal, for which the delay has been compensated, to weighted-value application units 3130-1 to 3130-5.

Each of the weight application units 3130-1 to 3130-5 may be provided with information on the difference value. Each of the weight application units 3130-1 to 3130-5 may be provided the at least one audio signal, for which the delayed has been compensated.

Each of the weight application units 3130-1 to 3130-5 may retrieve information on a weight based on the difference value and the at least one audio signal. The information on the weight may include data for at least one weight to be applied to the at least one audio signal. The information on the weight may be used to provide beam-forming or directionality to the plurality of second audio signals. The information on the weight may be stored in advance in the memory 130. In the information on the weight, the data for the at least one weight may be associated with the difference value. For example, a difference value a may be associated with first data for the at least one weight, and a difference value b may be associated with second data for the at least one weight. The data for the at least one weight may be configured for each combination of at least some of the plurality of first audio signals.

Each of the weight application units 3130-1 to 3130-5 may acquire at least one weight corresponding to the difference value and the at least one audio signal from the information on the weight. Each of the weight application units 3130-1 to 3130-5 may generate each of the plurality of second audio signals by applying the acquired at least one weight to the at least one audio signal.

In the processor 120, each of the generated plurality of second audio signals may be an audio signal corresponding to the omnidirectional image the reference direction of which is changed in the second direction. Each of the plurality of second audio signals may be output through an output device in the electronic device 101 or an output device in another apparatus connected to the electronic device.

FIG. 31 illustrates an example of processing, in the electronic device 101 receiving a plurality of images and a plurality of audio signals from the apparatus 300, the plurality of audio signals. It should be noted that, independent of the illustration of FIG. 31, in various embodiments, the apparatus 300 is capable of processing the plurality of audio signals. For example, the apparatus 300 according to various embodiments may include a first camera and a second camera, and may include one or more first transducers corresponding to the first camera and one or more second transducers corresponding to the second camera. When the first camera is configured as a central camera, the apparatus 300 is capable of acquiring the plurality of audio signals through the one or more first transducers. By acquiring the plurality of audio signals through the one or more first transducers, the apparatus 300 is capable of acquiring audio that is matched with the central image acquired through the first camera as the central camera. For example, audio data in the central direction, which is contained in the acquired audio and corresponds to the central image, may have a higher gain than audio data in at least one direction other than the central direction. When the second camera is configured as a central camera, the apparatus 300 is capable of acquiring the plurality of other audio signals through the one or more second transducers. By acquiring the plurality of other audio signals through the one or more second transducers, the apparatus 300 is capable of acquiring audio that is matched with the central image acquired through the second camera as the central camera. For example, audio data in the central direction, which is contained in the acquired audio and corresponds to the central image, may have a higher gain than audio data in at least one direction other than the central direction.

As described above, when the reference direction of the omnidirectional image is changed from the first direction to the second direction, the electronic device 101 according to various embodiments is capable of changing a plurality of first audio signals for the omnidirectional image to a plurality of second audio signals based on a difference value between the first direction and the second direction. Through the above change, the electronic device 101 according to various embodiments is capable of resolving a mismatch between an audio signal and an omnidirectional image due to a change in the reference direction. Even if the reference direction of the image acquisition procedure is changed in the other direction with this change, the electronic device 101 according to various embodiments is capable of compensating for this.

Figure 32:
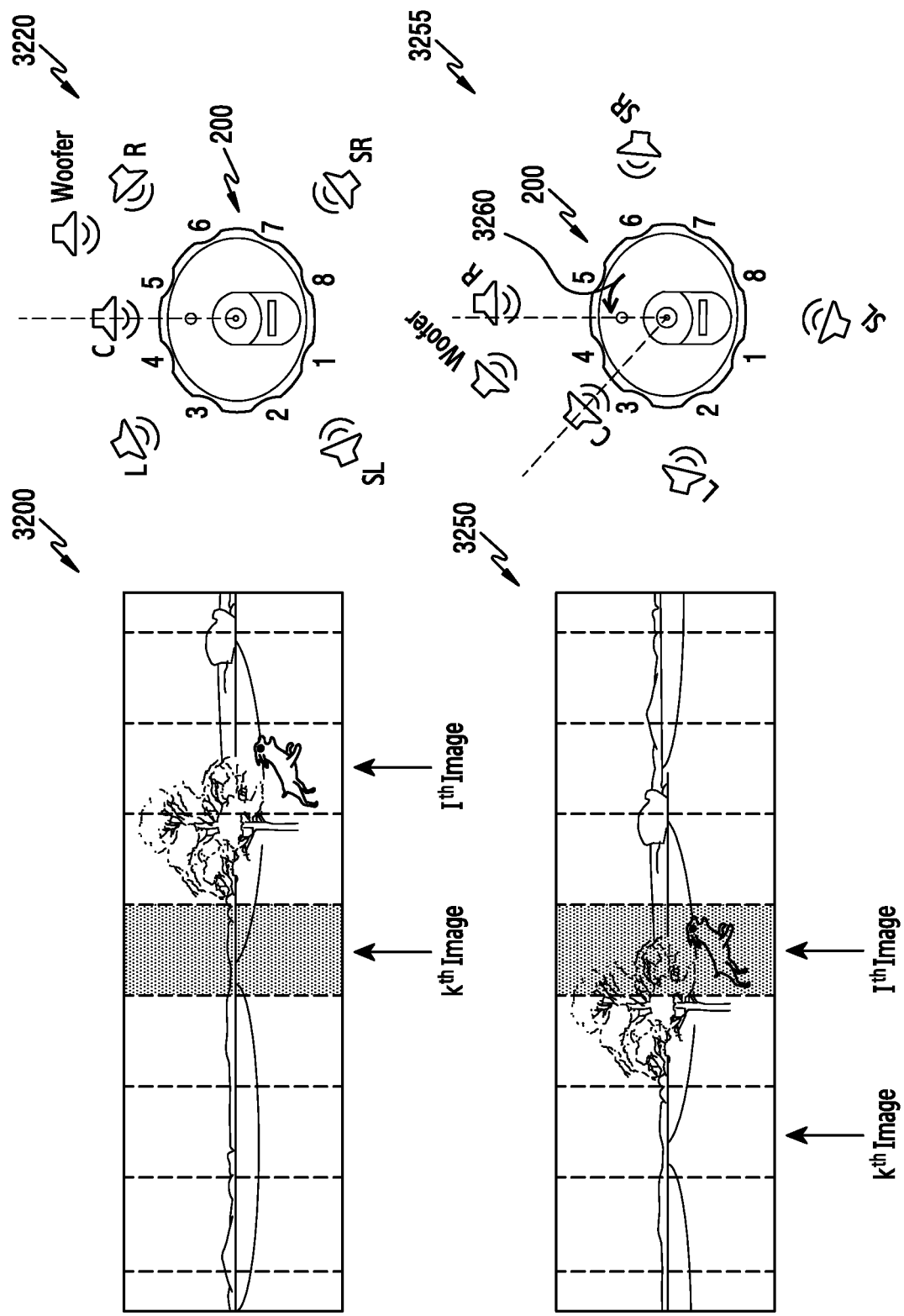
FIG. 32 illustrates another example of changing a direction of audio in an electronic device according to various embodiments.

FIG. 32 illustrates another example of changing a direction of audio in an electronic device according to various embodiments. Such an example may be configured in the electronic device 101 of FIG. 1, the electronic device 101 of FIG. 30, or the processor 120 included in the electronic device 101.

Referring to FIG. 32, the processor 120 may process a plurality of images 3200. The plurality of images 3200 may be images acquired or generated with reference to the direction corresponding to a $k^{th}$ image. The plurality of images 3200 may be images for an omni-directional image and may have a $k^{th}$ image as a reference image. The plurality of first audio signals associated with the plurality of images 3200 may be acquired in consideration of being output or transmitted as in an exemplary view 3220. For example, the plurality of first audio signals may be audio signals configured to correspond to the case in which the $k^{th}$ image is a reference image. Each of the plurality of first audio signals may include an audio signal for the left side of the $k^{th}$ image, an audio signal for the right side, an audio signal for the center, an audio signal for the left rear side, and an audio signal for the right rear side.

The processor 320 may receive an input for changing the reference direction of the plurality of images 3200 from the first direction to the second direction. The input may be received from an external device. The second direction may correspond to the first image among the plurality of images 3200. The processor 320 may change the reference direction of the omnidirectional image from the first direction to the second direction in response to receiving the input. The processor 320 may calculate a difference value between the first direction and the second direction in response to receiving the input. The processor 320 may allocate at least one of the plurality of first audio signals to each of the plurality of second audio signals based on the difference value. The processor 320 may generate each of the plurality of second audio signals by applying a weight to the at least one audio signal. Each of the plurality of second audio signals may be generated based on a positional relationship between a camera corresponding to the second direction and a plurality of microphones receiving the plurality of first audio signals. For example, each of the plurality of second audio signals may include an audio signal received through at least one microphone disposed on the left of the camera corresponding to the second direction, an audio signal received through at least one microphone disposed on the right of the camera corresponding to the second direction, an audio signal received through at least one microphone disposed around the camera corresponding to the second direction, an audio signal received through at least one microphone disposed on the rear left of the camera corresponding to the second direction, and an audio signal received through at least one microphone disposed on the rear right of the camera corresponding to the second direction. Each of the plurality of second audio signals may be a signal to which a change of directivity (e.g., rotation 3260) is applied, as in exemplary view 3255. Through the change of this directivity, the electronic device 101 is capable of generating a plurality of second audio signals that are matched with the omnidirectional image, the reference direction of which has been changed.

Figure 33:
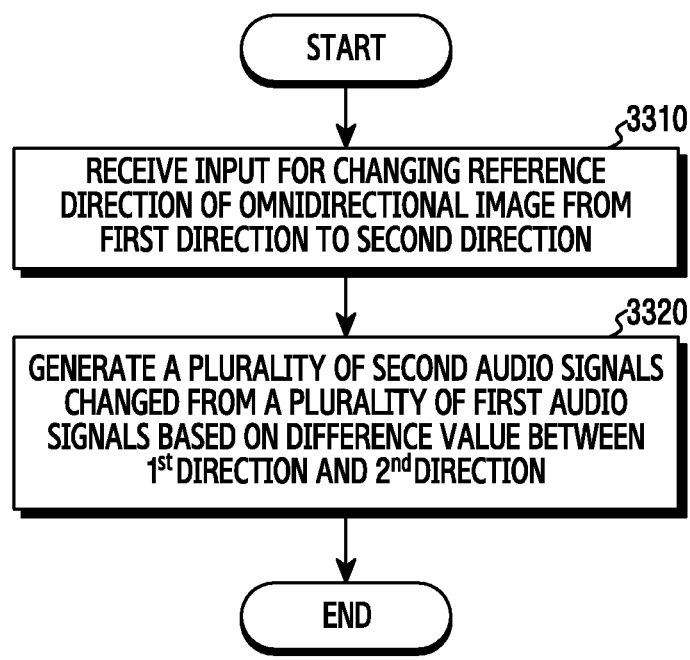
FIG. 33 illustrates an example of an operation of an apparatus that processes an audio signal according to various embodiments.

FIG. 33 illustrates an example of an operation of an apparatus that processes an audio signal according to various embodiments. Such an operation may be performed by the electronic device 101 illustrated in FIG. 1, the electronic device 101 illustrated in FIG. 30, or the processor 120 included in the electronic device 101.

Referring to FIG. 33, in operation 3301, the processor 120 may receive an input for changing the reference direction of the omnidirectional image from the first direction to the second direction. The reference direction may be a direction disposed at the front of the user at the time of starting reproduction of the omnidirectional image. The input may be received from an external device. The reference direction may be a direction that is a reference for the omnidirectional image. The reference direction may be a direction set in a procedure of acquiring a plurality of images for the omnidirectional image. The reference direction set in the procedure for acquiring the plurality of images may be inconsistent with a main direction to be used at the time of reproduction depending on a context included in the plurality of images. In order to overcome this inconsistency, a change in the reference direction may be required in the electronic device 101.

In operation 3320, the processor 120 may generate the plurality of second audio signals changed from the plurality of first audio signals based on a difference value between the first direction and the second direction. The processor 120 may determine at least one of the plurality of first audio signals to be allocated for each of the plurality of second audio signals based on the difference value. The processor 120 may generate the plurality of second audio signals by applying a weight corresponding to each of the plurality of second audio signals to the determined at least one audio signal. The plurality of second audio signals may be configured to be output in the second direction as a reference direction. The plurality of second audio signals may be generated or output together with the plurality of images for reproduction of the omnidirectional image.

Figure 34:
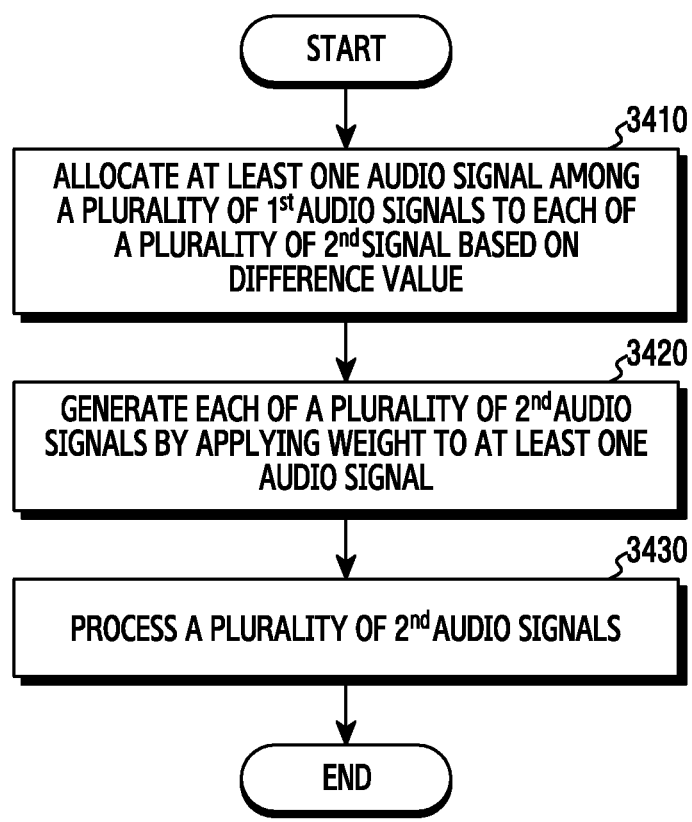
FIG. 34 illustrates an example of an operation of an electronic device that generates a plurality of second audio signals according to various embodiments.

FIG. 34 illustrates an example of an operation of an electronic device that generates a plurality of second audio signals according to various embodiments. Such an operation may be performed by the electronic device 101 illustrated in FIG. 1, the electronic device 101 illustrated in FIG. 30, or the processor 120 included in the electronic device 101.

Operations 3410 to 3430 of FIG. 34 may correspond to operation 3320 of FIG. 33.

In operation 3410, the processor 120 may allocate at least one of the plurality of first audio signals to each of the plurality of second audio signals based on the difference value. In other words, the processor 120 may determine a combination of the plurality of first audio signals for each of the plurality of second audio signals to be generated, based on the difference value.

In operation 3420, the processor 120 may apply a weight to the at least one audio signal to generate each a plurality of second audio signals. The processor 120 may generate each of the plurality of second audio signals by applying a delay that varies depending on the changed direction to the at least one audio signal. For example, the processor 120 may determine a weight to be applied to the at least one audio signal using the information on the weights illustrated in FIG. 31. The processor 120 may generate each of the plurality of second audio signals by applying a weight acquired from the information on the weighted to the at least one audio signal.

In operation 3430, the processor 120 may process the plurality of second audio signals. For example, the processor 120 may output each of the plurality of second audio signals through an output device corresponding to each of the plurality of channels for reproduction of the omnidirectional image. As another example, the processor 120 may store the plurality of second audio signals for post-processing or reproduction of the omnidirectional image. As another example, the processor 120 may transmit information on the plurality of second audio signals to another apparatus for reproduction of the omnidirectional image in the other apparatus.

Figure 35:
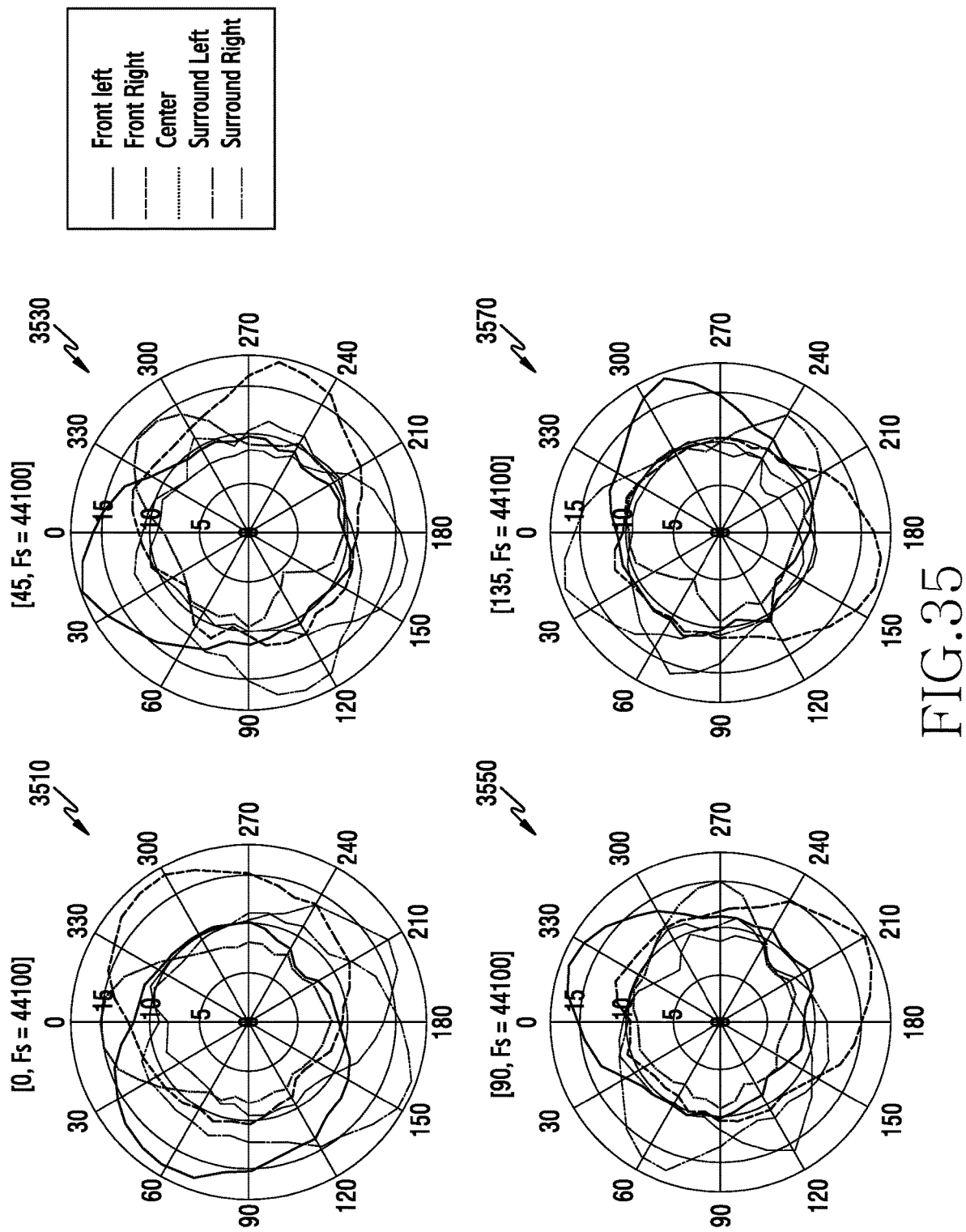
FIG. 35 illustrates an example of the plurality of generated second audio signals according to various embodiments.

FIG. 35 illustrates an example of the plurality of generated second audio signals according to various embodiments.

The plurality of second audio signals illustrated in FIG. 35 may be configured for 5.1 channels. The plurality of second audio signals illustrated in FIG. 35 may include a signal for left (or front left) of 5.1 channels, a signal for right (or front right) of 5.1 channels, a signal for center of 5.1 channels, a signal for surround left of 5.1 channels, and a signal for a surround right of 5.1 channels.

Referring to FIG. 35, graph 3510 may represent a plurality of second audio signals generated according to various embodiments when the rotation of the reference direction is 0 degrees.

Graph 3530 may represent a plurality of second audio signals generated according to various embodiments when the rotation of the reference direction is 45 degrees. When comparing graph 3510 and graph 3530, it can be seen that the plurality of second audio signals are rotated according to the change of the reference direction. In other words, the electronic device 101 according to various embodiments may provide an audio signal corresponding to a changed reference direction of the omnidirectional image.

Graph 3550 may represent a plurality of second audio signals generated according to various embodiments when the rotation of the reference direction is 90 degrees. When comparing graph 3510 and graph 3550, it can be seen that the plurality of second audio signals are rotated according to the change of the reference direction. In other words, the electronic device 101 according to various embodiments may provide an audio signal corresponding to a changed reference direction of the omnidirectional image.

Graph 3570 may represent a plurality of second audio signals generated according to various embodiments when the rotation of the reference direction is 135 degrees. When comparing graph 3510 and graph 3570, it can be seen that the plurality of second audio signals are rotated according to the change of the reference direction. In other words, the electronic device 101 according to various embodiments may provide an audio signal corresponding to a changed reference direction of the omnidirectional image.

Figure 36:
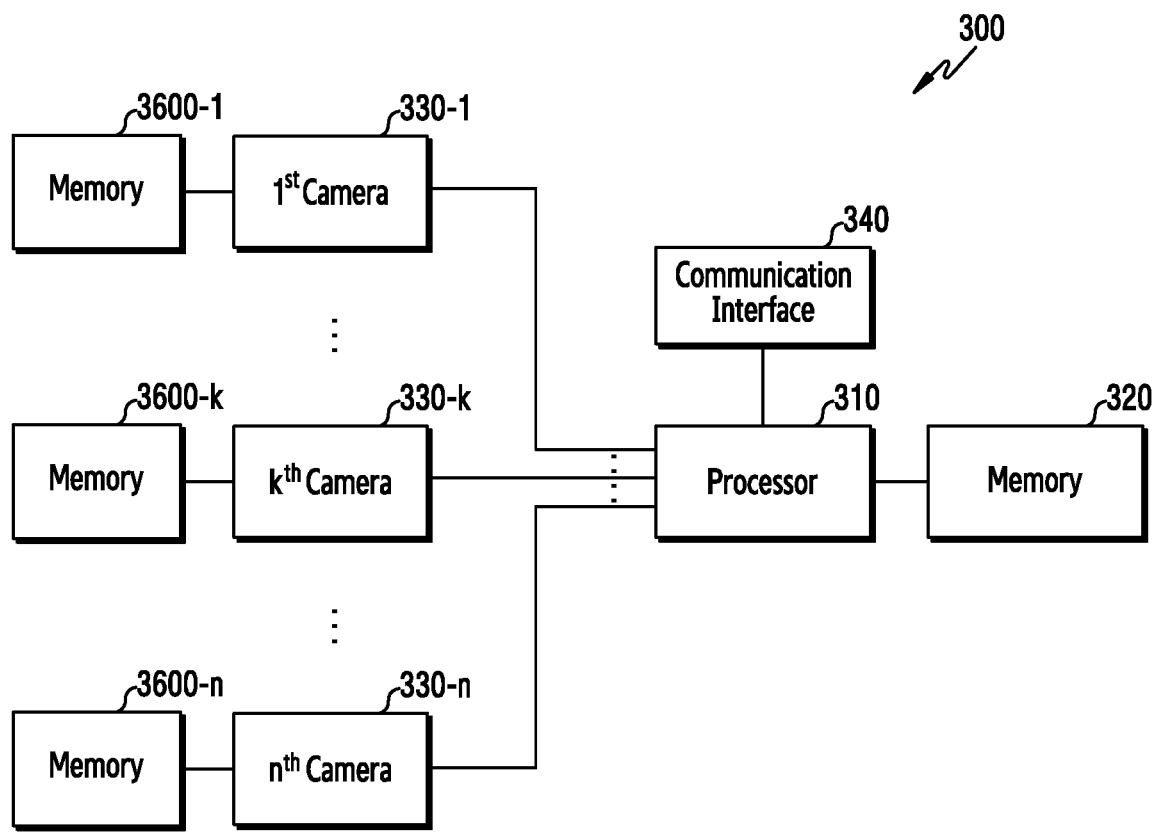
FIG. 36 illustrates an example of the functional configuration of an apparatus that compensates for distortion according to various embodiments.

FIG. 36 illustrates an example of the functional configuration of an apparatus that compensates for distortion according to various embodiments. This functional configuration may be included in the apparatus 300 illustrated in FIG. 3.

Figure 37:
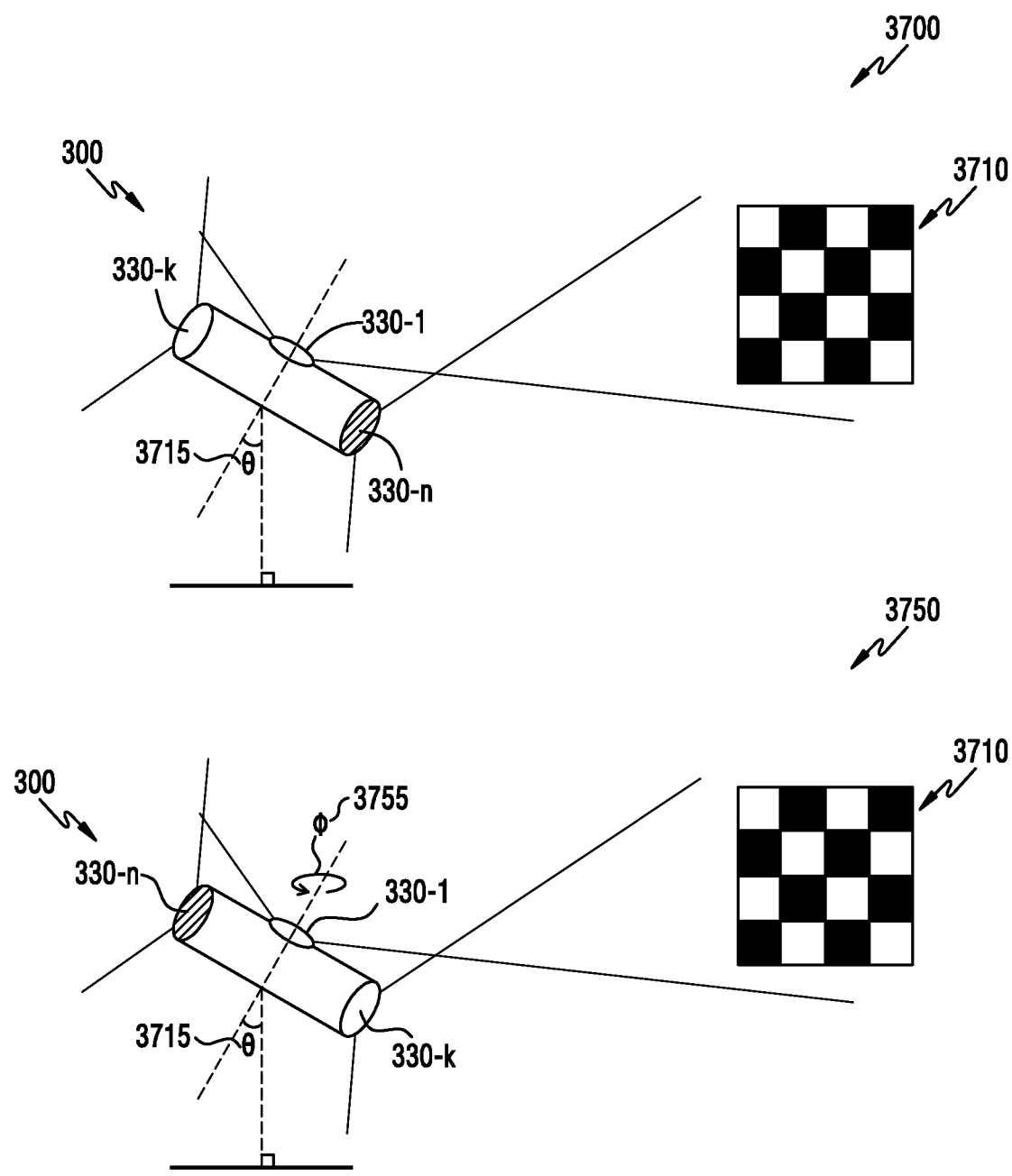
FIG. 37 illustrates an example of a method for determining information for compensating for distortion according to various embodiments.

FIG. 37 illustrates an example of a method for determining information for compensating for distortion according to various embodiments.

Figure 38:
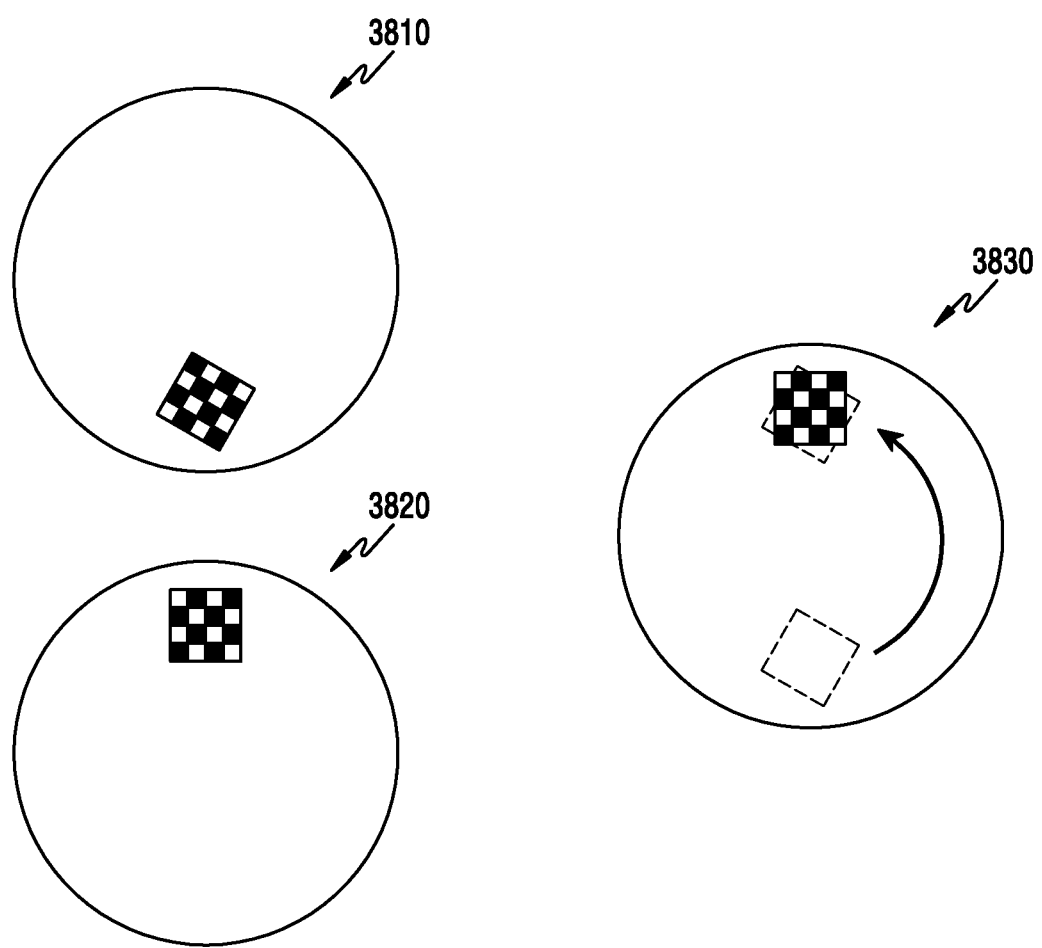
FIG. 38 illustrates an example of an image for compensating for distortion according to various embodiments.

FIG. 38 illustrates an example of an image for compensating for distortion according to various embodiments.

Figure 39:
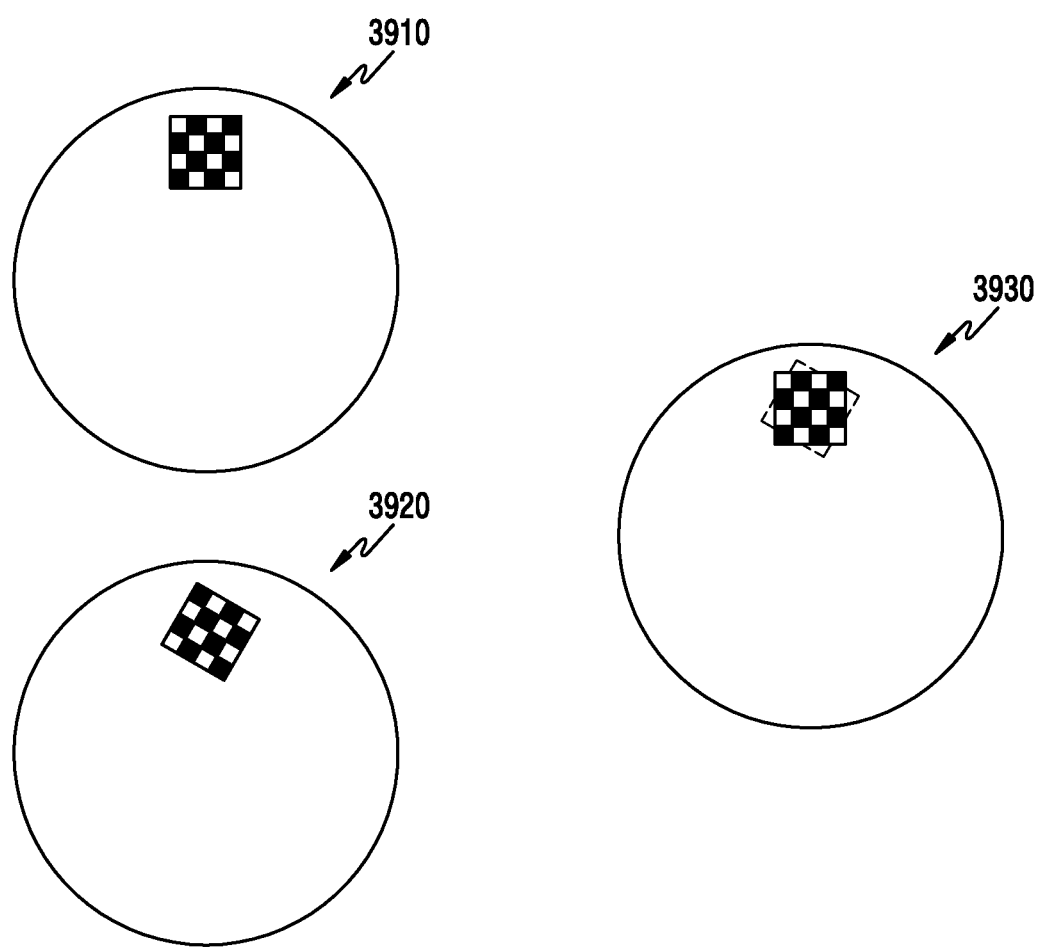
FIG. 39 illustrates another example of an image for compensating for distortion according to various embodiments.

FIG. 39 illustrates another example of an image for compensating for distortion according to various embodiments.

Figure 40:
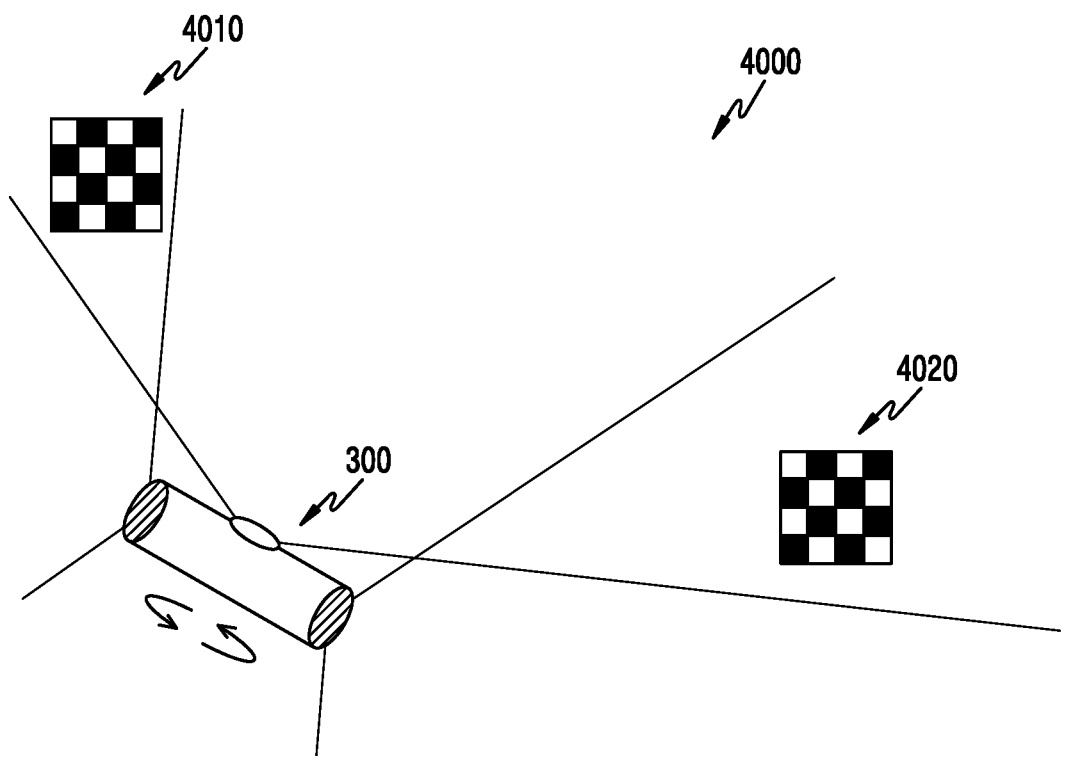
FIG. 40 illustrates another example of a method for determining information for compensating for distortion according to various embodiments.

FIG. 40 illustrates another example of a method for determining information for compensating for distortion according to various embodiments.

Referring to FIG. 36, an apparatus 300 may include a processor 310, a memory 320, a plurality of memories (e.g., memories 3600-1 to 3600-$n$), a plurality of cameras (e.g. first to $n^{th}$ cameras 330-1 to 330-$n$), and a communication interface 340.

The processor 310 may be operatively connected to each of the first to $n^{th}$ cameras 330-1 to 330-$n$. The processor 310 may acquire a plurality of images through the first to $n^{th}$ cameras 330-1 to 330-$n$.

Each of the first and $n^{th}$ cameras 330-1 to 330-$n$ may be used to acquire a plurality of images for generating an omnidirectional image or a panoramic image. Among the first to $n^{th}$ cameras 330-1 to 330-$n$, the first camera 330-1 is exposed through a part of the top face of the housing of the apparatus 300, and among the second to $n^{th}$ cameras 330-1 to 330-$n$, each of cameras other than the first camera 330-1 may be exposed through a part of the side face of the housing. In other words, the first camera 330-1 may be disposed on a face different from the face where the other cameras are disposed. Each of the first and $n^{th}$ camera 330-1 to 330-$n$ may be operatively connected to each of the plurality of memories 3600-1 to 3600-$n$.

Each of the first to $n^{th}$ cameras 330-1 to 330-$n$ may be disposed in the housing of the apparatus 300 to have a designated FOV. At least one of the first to $n^{th}$ cameras 330-1 to 330-$n$ may be disposed in the housing to have an FOV different from the designated FOV due to an error occurring during the manufacturing process or an error occurring during use of the apparatus 300. The FOV different from the designated FOV may cause a change in the positional relationship between the plurality of images. In other words, at least one image acquired through the at least one camera having the FOV different from the designated FOV may have distortion. Each of the first to $n^{th}$ cameras 330-1 to 330-$n$ may be provided with information for compensating for the distortion from each of the memories 3600-1 to 3600-$n$. At least one camera having an FOV different from the designated FOV among the first to $n^{th}$ camera 330-1 to 330-$n$ may transmit information for compensating for the distortion to the processor 310.

The processor 310 may perform signaling with each of the first to $n^{th}$ cameras 330-1 to 330-$n$. In various embodiments, the processor 310 may receive information for compensating for distortion from at least one of the first to $n^{th}$ cameras 330-1 to 330-$n$. The information for compensating for the distortion may be caused when at least one of the first to $n^{th}$ cameras 330-1 to 330-$n$ has an FOV different from the FOV designated for the at least one camera. For example, when the at least one camera is connected to (or disposed in) the housing of the apparatus 300 to be different from a target, the at least one camera may have an FOV different from a designated FOV (or a targeted FOV) of the at least one camera. For example, the at least one camera may be arranged at a position different from a targeted position in the housing due to an error that occurred during the manufacture of the apparatus 300 or an error that occurred due to an impact during the use of the apparatus 300. Due to this arrangement, the at least one camera may have an FOV different from the designated FOV. The information for compensating for the distortion may be used to adjust the distortion of an image caused by such an FOV.

As another example, in the at least one camera, due to an error that occurred in the manufacturing process of the apparatus 300 or an error that occurred by an impact during the use of the apparatus, a positional relationship between an image sensor included in the at least one camera and a lens included in the at least one camera may become different from a designated positional relationship (or a targeted positional relationship). Due to such a positional relationship, the at least one camera may have an FOV different from the designated FOV. The information for compensating for the distortion may be used to reduce the distortion of an image caused by such an FOV.

The processor 310 may transmit, through the communication interface 340, information on a plurality of images including at least one image having the distortion to another apparatus (e.g., the electronic device 101) that generates the final image. The processor 310 may transmit information for compensating for the distortion to the other device through the communication interface 340. The information for compensating for the distortion may be used in the other apparatus in order to modify or correct at least some of the plurality of images in a procedure for generating the final image.

The information for compensating for the distortion may be determined based on the position of a reference object included in the image acquired through the at least one camera. For example, referring to FIG. 37, in conceptual view 3700, the processor 310 may acquire a first image including a reference object 3170 through the first camera 330-1 exposed through a part of the top face of the housing in a first state in which the housing is tilted from horizontality by a designated elevation angle 3715. The designated elevation angle 3715 is set such that the first to $n^{th}$ (or $k^{th}$) cameras 330-1 to 330-n (or 330-k) can be set to acquire an image for the reference object 3710 simultaneously. The designated elevation angle 3715 may be, for example, 45 degrees. In conceptual diagram 3750, the processor 310 is capable of acquiring a second image including a reference object 3710 through the first camera 330-1 in a second state, which is rotated by a designated azimuth angle 3755 from the first state. For example, referring to FIG. 38, the processor 310 is capable of acquiring the first image 3810 through the first camera 330-1 in the first state, and is capable of acquiring the second image 3820 through the first camera 330-1 in the second state. In the example of FIG. 38, the azimuth angle 3755 may be 180 degrees. When the first camera 330-1 has an FOV different from the designated FOV, the positional relationship between the first image 3810 and the second image 3820 may be represented as in an image 3830. When the first image 3810 is rotated by an angle corresponding to the azimuth angle 3755, the position of the reference object in the first image 3810 may be inconsistent with the reference object in the second image 3820, as in the image 3830. Through this image analysis, the processor 310 is capable of determining that the first camera 330-1 has an FOV different from the designated FOV. The processor 310 may determine that the first camera 330-1 has torsion of axis therein. The processor 310 may determine at least one value, which makes the position, obtained by rotating the reference object in the first image 3810 by the angle, consistent with the position of the reference object in the second image 3820, as the information for compensating for the distortion of the image acquired through the first camera 330-1. The at least one value may include at least one of a value representing pitch rotation, a value representing yaw rotation, or a value representing roll rotation.

The designated elevation angle 3715 may not be an essential element. For example, by adjusting the position of the reference object 3710 to be included in the FOV of the first camera 330-1 and in the FOV of another camera (e.g., the $k^{th}$ camera 330-k or the $n^{th}$ camera 330), the apparatus 300 may perform the operations described in reference to FIGS. 36 to 42 without being tilted by the designated elevation angle 3715.

As another example, referring to FIG. 37, in conceptual view 3700, the processor 310 may acquire a first image including the reference object 3710 through the first camera 330-1 in the first state and may acquire a third image including the reference object 3710 through the $n^{th}$ camera 330-n in the first state. In conceptual view 3750, the processor 310 may acquire a second image including the reference object 3710 through the first camera 330-1 in the second state, and may acquire a fourth image including the reference object 3710 through the $k^{th}$ camera 330-k in the second state. The $k^{th}$ camera 330-k may be determined differently depending on the magnitude of the azimuth angle 3755. The processor 310 may determine that the position of the reference object obtained by rotating the reference object in the first image 3810 by the angle is consistent with the position of the reference object in the second image 3820. When the first camera 330-1 does not have torsion of axis or the torsion of axis of the first camera 330-1 is compensated for by the example described above, the torsion of axis of at least one of the $n^{th}$ camera 330-n and the $k^{th}$ camera 330-k may be compensated for. Referring to FIG. 39, the processor 310 may acquire the third image 3910 through the $n^{th}$ camera 330-n in the first state, and the $k^{th}$ camera 330-k may acquire the fourth image 3920 through the $k^{th}$ camera 330-k in the second state. In the example of FIG. 39, the azimuth angle 3755 may be 180 degrees. When the $n^{th}$ camera 330-n or the $k^{th}$ camera 330-k has an FOV different from the designated FOV, the positional relationship between the third image 3910 and the fourth image 3920 may be represented as in an image 3930. As in the image 3930, when at least one of the $n^{th}$ camera 330-n and the $k^{th}$ camera 330-k has torsion of axis, the position of the reference object in the third image 3910 may not be consistent with the position of the reference object in the fourth image 3920. The processor 310 may determine at least one value that makes the position compensated in the third image 3910 based on the azimuth angle 3755 consistent with the position of the reference object in the fourth image 3920, as information for compensating for the distortion of the image acquired through at least one of the $n^{th}$ camera 330-n and the $k^{th}$ camera 330-k. The at least one value may include at least one of a value representing pitch rotation, a value representing yaw rotation, or a value representing roll rotation.

In various embodiments, the processor 310 may adjust the torsion of axis of the at least one camera, which is caused by the positional relationship between the at least one camera and the housing, and the torsion of axis of the at least one camera, which is caused by the positional relationship between the lens in the at least one camera and the image sensor in the at least one camera. For example, referring to FIG. 40, in conceptual view 4000, the processor 310 may acquire an image including a reference object 4010 spaced apart from the apparatus 300 by a first distance and an image including a reference object 4020 spaced apart from the apparatus 300 by a second distance different from the first distance. Based on the method described with reference to FIGS. 37 to 39, the processor 310 may compensate for the torsion of axis of the at least one camera, which is caused by the positional relationship between the at least one camera and the housing, as well as the torsion of axis of the at least one camera, which is caused by the positional relationship between the lens in the at least one camera and the image sensor in the at least one camera.

As described above, in the apparatus 300 according to various embodiments, the processor 310 may generate information for compensating for an error at least one of a plurality of cameras included in the apparatus 300 has (e.g., having an FOV different from the designated FOV and torsion of axis) based on at least one of: a position of an object in an image acquired through a camera exposed through a portion of the top face of the housing in a first state in which the housing of the apparatus 300 is tilted; a position of an object in an image acquired through a camera exposed through a portion of the top face in a second state in which the housing of the apparatus 300 is rotated from the first state; a position of an object in an image acquired through a camera exposed through a portion of the side face of the housing in the first state; and a position of an object in an image acquired through another camera exposed through a portion of the side face of the housing in the second state. With this information, the device 300 may compensate for the distortion contained in the image in the post-processing operation of the acquired image.

Figure 41:
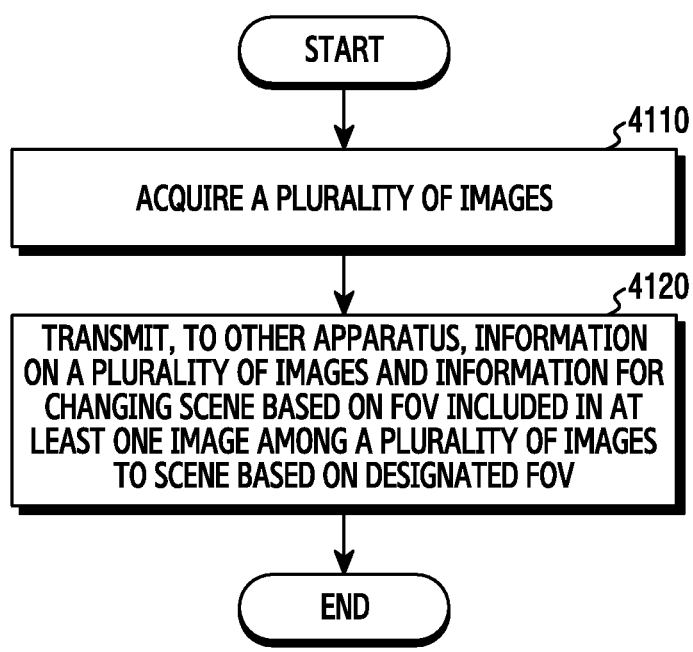
FIG. 41 illustrates another example of an apparatus that transmits information for compensating for distortion according to various embodiments.

FIG. 41 illustrates another example of an operation of an apparatus that transmits information for compensating for distortion in an image according to various embodiments. Such an operation may be performed by the apparatus 300 illustrated in FIG. 3, the apparatus 300 illustrated in FIG. 36, or the processor 310 included in the apparatus 300.

Referring to FIG. 41, in operation 41, the processor 310 may acquire a plurality of images through a plurality of cameras (e.g., the first to $n^{th}$ cameras 330-1 to 330-$n$). Among the plurality of cameras, the first camera 330-1 may be exposed through a portion of the top face of the housing of the apparatus 300, and each of the cameras other than the first camera 330-1 among the plurality of cameras may be exposed through a portion of the side face of the housing of the apparatus 300. For example, the first image acquired through the first camera 330-1 may be associated with a scene in the upper portion of the housing, and each of the images acquired through the other cameras may be associated with a scene of the side portion of the housing. The processor 310 may generate encoded data for the plurality of images.

In operation 4120, the processor 310 may send, to another apparatus, information on the plurality of images and information for compensating for at least one distortion contained in at least one of the plurality of images. For example, the other apparatus may include the electronic device 101 illustrated in FIG. 1 as an apparatus that stitches the plurality of images. The information for compensating for the at least one distortion may be stored in the apparatus 300 during the manufacture of the apparatus 300 and may be stored in the apparatus 300 during the use of the apparatus 300. The information for compensating for the at least one distortion may be stored in at least some of a plurality of memories connected to each of the plurality of cameras or may be stored in the memory 320 connected to the processor 310.

As described above, in order to ensure that a distortion caused due to at least one camera arranged different from a targeted design can be compensated for in an image processing operation, the apparatus 300 according to various embodiments may provide information for compensating for the distortion to the other apparatus or may store the information for compensating for the distortion thereon. With this information, the apparatus 300 is capable of generating a final image having desired quality without adjusting the physical position of the at least one camera.

Figure 42:
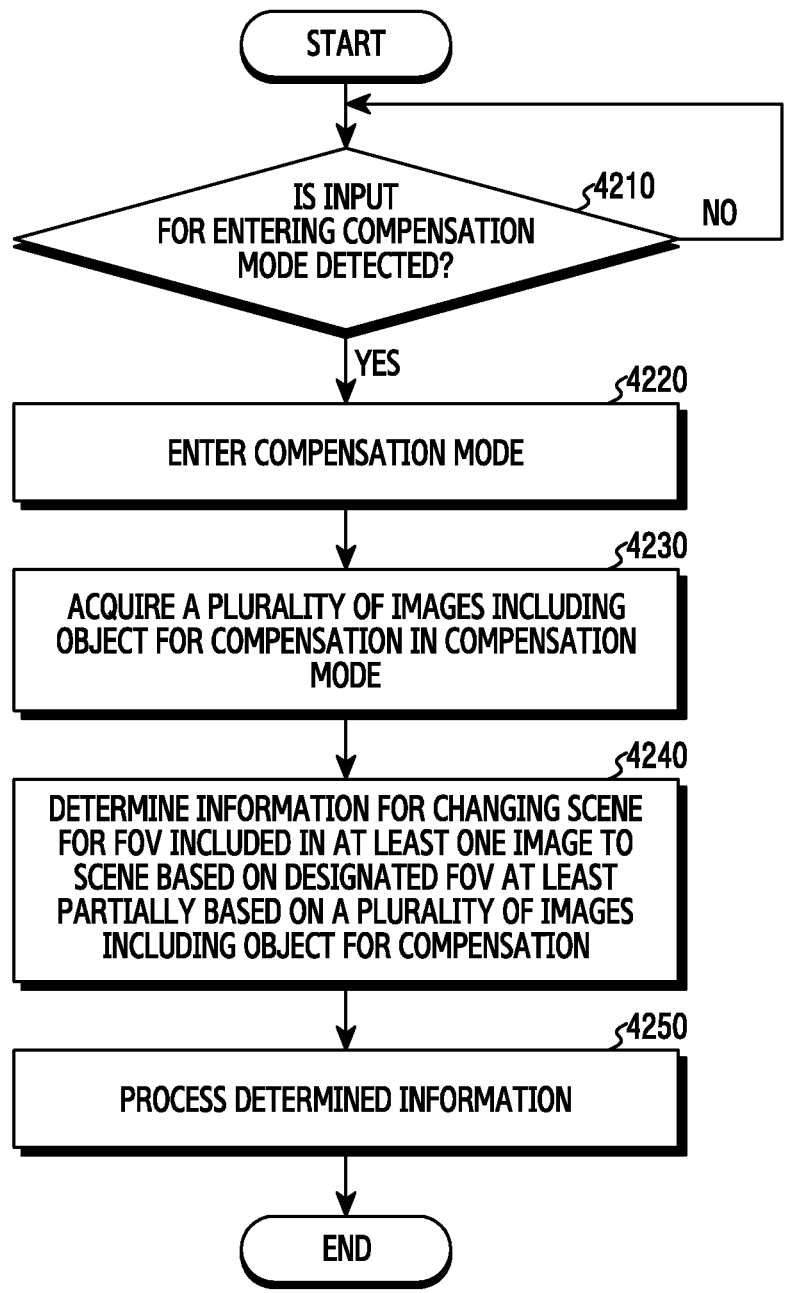
FIG. 42 illustrates an example of an operation of an apparatus that provides a distortion compensation mode according to various embodiments.

FIG. 42 illustrates an example of an operation of an apparatus that provides a compensation mode according to various embodiments. Such an operation may be performed by the apparatus 300 illustrated in FIG. 3, the apparatus 300 illustrated in FIG. 36, or the processor 310 included in the apparatus 300.

Referring to FIG. 42, in operation 4210, the processor 310 may detect an input for entering a compensation mode. The apparatus 300 may provide a compensation mode for compensating for the torsion of axis of at least one camera, or the like. The processor 310 may detect an input for entering a compensation mode through reception of designated input (e.g., a long touch input, a double tap input, a force touch input, or a drag input), or reception of an input for an object for entering a compensation mode.

In operation 4220, the processor 310 may enter the compensation mode in response to the detection of the input. For example, in the compensation mode, the processor 310 may display a UI that guides the operation described with reference to FIGS. 37 to 40 and the like.

In operation 4230, the processor 310 may acquire a plurality of images including an object for compensation in the compensation mode. The object for compensation may correspond to the reference object of FIGS. 37 to 40. The processor 310 may acquire a plurality of images including the object in order to detect and compensate for an error in the at least one camera.

In operation 4240, the processor 310 may determine information for compensating for at least one distortion based at least some of the plurality of images including the object for compensating for the distortion. For example, the processor 310 may determine information for compensating for the at least one distortion based on the method described with reference to FIGS. 37-40.

In operation 4250, the processor 310 may process the determined information. In various embodiments, the processor 310 may store the determined information. In various embodiments, the processor 310 may transmit the determined information to another apparatus. In various embodiments, the processor 310 may update information for compensating for the at least one distortion.

As described above, the apparatus 300 according to various embodiments may provide information for compensating in a digital method for a distortion due to the placement of at least one of the plurality of cameras included in the apparatus 300. Through the provision of this information, the apparatus 300 or the other apparatus that generates an image based on a plurality of images acquired through the device 300 is capable of providing a final image with quality above designated quality.

As described above, an electronic device according to various embodiments (e.g., the apparatus 300) may include: a first camera disposed in a first optical axis direction, a second camera disposed in a second optical axis direction, a third camera disposed in a third optical axis direction that is substantially perpendicular to the first optical axis direction and the second optical axis direction, a communication interface, and a processor. The processor is configured to: acquire a first image of a first object using the first camera, acquire a second image of the first object using the second camera, and acquire a third image of the first object using the third camera; determine, by comparing a position of the first object in the second image with a position of the first object in the first image based on the position of the first object in the third image, at least one of a value for correcting the first optical axis direction or a value for correcting the second optical axis direction; and transmit, to an external electronic device through the communication interface, at least one of a first corrected image and a second corrected image generated based on at least one of the value for correcting the first optical axis direction and the value for correcting the second optical axis direction, or transmit, to the external electronic device through the communication interface, information regarding at least one of the value for correcting the first optical axis direction and the value for correcting the second optical axis direction with the first image and the second image.

As described above, an apparatus according to various embodiments may include a plurality of cameras including at least one camera that has a field of view (FOV) different from a designated FOV, a communication interface, and at least one processor. The at least one processor may be configured to: acquire a plurality of images including at least one image that includes a scene based on the FOV different from the designated FOV through the plurality of cameras; and transmit, in order to enable another apparatus to generate an omnidirectional image based on the plurality of images, information on the plurality of images and information for changing the scene, based on the FOV included in the at least one image, to a scene, based on the designated FOV, to the other apparatus through the communication interface.

In various embodiments, the apparatus may further include a housing, each of the plurality of cameras may be exposed through a portion of the housing, and the at least one camera may have an FOV different from the designated FOV by a connection between the at least one camera and the housing.

In various embodiments, the at least one camera may have an FOV different from the designated FOV by a positional relationship between an image sensor included in the at least one camera and a lens included in the at least one camera.

In various embodiments, the plurality of cameras may be configured as a plurality pairs, a first camera included in each of the plurality of pairs may have a first FOV, and a second camera included in each of the plurality of pairs may have a second FOV that partially overlaps the first FOV.

In various embodiments, the apparatus may further include a housing, the first camera among the plurality of cameras may be exposed through a portion of the top face of the housing, and each of the cameras different from the first camera among the plurality of cameras is exposed through a portion of the side face of the housing. The apparatus may further include a memory, and the information for changing the scene based on the other FOV, included in the at least one image, to the scene based on the designated FOV may be stored in advance in the memory. The information for changing the scene based on the FOV, included in the at least one image, to the scene based on the designated FOV may be determined at least partially based on: a first image that includes a reference object and is acquired through the first camera in a first state in which the housing is tilted from a horizontality by a designated elevation angle; and a second image that includes the reference object and is acquired through the first camera in a second state in which the housing is rotated from the first state by a designated azimuth angle. The information for changing the scene based on the FOV, included in the at least one image, to the scene based on the designated FOV may be determined at least partially based on a difference between a position of the object in the first image and a position of the object in the second image. The information for changing the scene based on the other FOV, included in the at least one image, to the scene based on the designated FOV is determined at least partially based on the first image, the second image, a third image that includes the reference object and is acquired through a second camera among the other cameras in the first state, and a fourth image that includes the reference object and is acquired through the second camera in the second state. The information for changing the scene based on the FOV, included in the at least one image, to the scene based on the designated FOV may be determined at least partially based on a difference between a position of the object in the third image and a position of the object in the fourth image.

A method of the above-described apparatus according to various embodiments may include: acquiring, through a plurality of cameras including at least one camera that has a field of view (FOV) different from a designated FOV, a plurality of images including at least one image that includes a scene based on the FOV different from the designated FOV; and transmitting, in order to enable another apparatus to generate an omnidirectional image based on the plurality of images, information on the plurality of images and information for changing the scene, based on the FOV included in the at least one image, to a scene, based on the designated FOV, to the other apparatus through the communication interface.

In various embodiments, the apparatus may further include a housing, each of the plurality of cameras may be exposed through a portion of the housing, and the at least one camera may have an FOV different from the designated FOV by a connection between the at least one camera and the housing.

In various embodiments, the at least one camera may have an FOV different from the designated FOV by a positional relationship between an image sensor included in the at least one camera and a lens included in the at least one camera.

In various embodiments, the plurality of cameras may be configured as a plurality pairs, a first camera included in each of the plurality of pairs may have a first FOV, and a second camera included in each of the plurality of pairs may have a second FOV that partially overlaps the first FOV.

In various embodiments, the apparatus may further include a housing, the first camera among the plurality of cameras may be exposed through a portion of the top face of the housing, and each of the cameras different from the first camera among the plurality of cameras is exposed through a portion of the side face of the housing. The information for changing the scene based on the other FOV, included in the at least one image, to the scene based on the designated FOV may be stored in advance in the memory. The information for changing the scene based on the FOV, included in the at least one image, to the scene based on the designated FOV may be determined at least partially based on: a first image that includes a reference object and is acquired through the first camera in a first state in which the housing is tilted from a horizontality by a designated elevation angle; and a second image that includes the reference object and is acquired through the first camera in a second state in which the housing is rotated from the first state by a designated azimuth angle. The information for changing the scene based on the FOV, included in the at least one image, to the scene based on the designated FOV may be determined at least partially based on a difference between a position of the object in the first image and a position of the object in the second image. The information for changing the scene based on the other FOV, included in the at least one image, to the scene based on the designated FOV is determined at least partially based on the first image, the second image, a third image that includes the reference object and is acquired through a second camera among the other cameras in the first state, and a fourth image that includes the reference object and is acquired through the second camera in the second state. The information for changing the scene based on the FOV, included in the at least one image, to the scene based on the designated FOV may be determined at least partially based on a difference between a position of the object in the third image and a position of the object in the fourth image.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof

What is claimed is:

1. An apparatus comprising:
a housing;
a plurality of cameras including at least a first camera and a second camera that have another field of view (FOV) distinct from a designated FOV, the first camera is exposed through a portion of a top face of the housing and the second camera is exposed through a portion of a side face of the housing;
a wireless communication interface; and
at least one processor,
wherein the at least one processor is configured to:
obtain a plurality of images including at least one image that includes a scene based on the another FOV; and
wirelessly transmit to another apparatus, information regarding the plurality of images and information for changing the scene based on the another FOV that is included in the at least one image to the another apparatus, causing the another apparatus to generate another image of the scene based on the designated FOV via the wireless communication interface.

2. The apparatus of claim 1, further comprising:
wherein each of the plurality of cameras is exposed through a portion of the housing, and
wherein the at least one camera has the another FOV distinct from the designated FOV by a connection between the at least one camera and the housing.

3. The apparatus of claim 1, wherein the at least one camera has the other FOV distinct from the designated FOV by a location relation between an image sensor included in the at least one camera and a lens included in the at least one camera.

4. The apparatus of claim 1, wherein the plurality of cameras are configured with a plurality of pairs,
wherein the first camera included in each of the plurality of pairs has a first FOV, and
wherein the second camera included in each of the plurality of pairs has a second FOV that partially overlaps with the first FOV.

5. The apparatus of claim 1, further comprising:
wherein the first camera among the plurality of cameras has an optical axis substantially orthogonal to the optical axis of the second camera of the plurality of cameras.

6. The apparatus of claim 5, further comprising:
a memory,
wherein the information for changing the scene based on the other FOV that is included in the at least one image to the scene based on the designated FOV is pre-stored in the memory.

7. An apparatus comprising:
a plurality of cameras including at least one camera that has another field of view (FOV) distinct from a designated FOV and a first camera;
a communication interface; and
at least one processor,
wherein the at least one processor is configured to:
obtain a plurality of images including at least one image that includes a scene based on the another FOV; and
transmit, such that another apparatus generates another image based on the plurality of images, information regarding the plurality of images and information for changing the scene based on the another FOV that is included in the at least one image to the scene based on the designated FOV via the communication interface to the another apparatus,
wherein the information for changing the scene based on the another FOV that is included in the at least one image to the scene based on the designated FOV is determined based at least in part on a first image that includes a reference object and is obtained through the first camera in a first state in which athe housing is inclined from a horizontality by a designated elevation angle and a second image that includes the reference object and is obtained through the first camera in a second state in which the housing is rotated from the first state by a designated azimuth angle.

8. The apparatus of claim 7, wherein the information for changing the scene based on the another FOV that is included in the at least one image to the scene based on the designated FOV is determined based at least in part on a difference between a location of the reference object in the first image and a location of the reference object in the second image.

9. The apparatus of claim 7, wherein the information for changing the scene based on the another FOV that is included in the at least one image to the scene based on the designated FOV is determined based at least in part on the first image, the second image, a third image that includes the reference object and is obtained in the first state through a second camera among other cameras, and a fourth image that includes the reference object and is obtained in the second state through the second camera.

10. The apparatus of claim 9, wherein the information for changing the scene based on the other FOV that is included in the at least one image to the scene based on the designated FOV is determined based at least in part on a difference between a location of the reference object in the third image and a location of the reference object in the fourth image.

11. A method in an apparatus, the method comprising:
obtaining, through a plurality of cameras including at least a first camera and a second camera that have another field of view (FOV) distinct from a designated FOV, a plurality of images including at least one image that includes a scene based on the another FOV, wherein the first camera is exposed through a portion of a top face of a housing and the second camera is exposed through a portion of a side face of the housing; and
wirelessly transmitting to another apparatus, information regarding the plurality of images and information for changing the scene based on the another FOV that is included in the at least one image to the another apparatus, causing the another apparatus to generate another image of the scene based on the designated FOV via a wireless communication interface of the apparatus.

12. The method of claim 11,
wherein each of the plurality of cameras is exposed through a portion of the housing, and
wherein the at least one camera has the another FOV distinct from the designated FOV by a connection between the at least one camera and the housing.

13. A method in an apparatus, the method comprising:
obtaining, through a plurality of cameras including at least one camera that has another field of view (FOV) distinct from a designated FOV, a plurality of images including at least one image that includes a scene based on the another FOV; and
transmitting, such that another apparatus generates another image based on the plurality of images, information regarding the plurality of images and information for changing the scene based on the another FOV that is included in the at least one image to the scene based on the designated FOV via a communication interface of the apparatus to the another apparatus, and
wherein the information for changing the scene based on the another FOV that is included in the at least one image to the scene based on the designated FOV is determined based at least in part on a first image that includes a reference object and is obtained through a first camera in a first state in which a housing is inclined from a horizontality by a designated elevation angle and a second image that includes the reference object and is obtained through the first camera in a second state in which the housing is rotated from the first state by a designated azimuth angle.

14. The method of claim 13, wherein the information for changing the scene based on the another FOV that is included in the at least one image to the scene based on the designated FOV is determined based at least in part on a difference between a location of the reference object in the first image and a location of the reference object in the second image.

15. The method of claim 13, wherein the information for changing the scene based on the other FOV that is included in the at least one image to the scene based on the designated FOV is determined based at least in part on the first image, the second image, a third image that includes the reference object and is obtained in the first state through a second camera among other cameras, and a fourth image that includes the reference object and is obtained in the second state through the second camera.

* * * * *